United States Patent
Gaeta et al.

(10) Patent No.: US 10,078,917 B1
(45) Date of Patent: Sep. 18, 2018

(54) AUGMENTED REALITY SIMULATION

(71) Applicant: Lucasfilm Entertainment Company Ltd., San Francisco, CA (US)

(72) Inventors: John Gaeta, San Francisco, CA (US); Michael Koperwas, San Francisco, CA (US); Nicholas Rasmussen, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 15/289,858

(22) Filed: Oct. 10, 2016

Related U.S. Application Data

(63) Continuation-in-part of application No. 15/194,094, filed on Jun. 27, 2016.

(60) Provisional application No. 62/239,134, filed on Oct. 8, 2015, provisional application No. 62/185,422, filed on Jun. 26, 2015, provisional application No. 62/232,985, filed on Sep. 25, 2015, provisional application No. 62/291,648, filed on Feb. 5, 2016.

(51) Int. Cl.
| | |
|---|---|
| *G06T 15/00* | (2011.01) |
| *G06T 19/00* | (2011.01) |
| *G06F 3/01* | (2006.01) |
| *G02B 27/01* | (2006.01) |

(52) U.S. Cl.
CPC ........ *G06T 19/006* (2013.01); *G02B 27/0172* (2013.01); *G06F 3/012* (2013.01); *G06T 15/005* (2013.01); *G02B 2027/014* (2013.01); *G02B 2027/0134* (2013.01); *G02B 2027/0141* (2013.01); *G02B 2027/0178* (2013.01)

(58) Field of Classification Search
CPC .................................................... G06T 19/006
USPC ................................................. 345/419, 633
See application file for complete search history.

(56) References Cited

U.S. PATENT DOCUMENTS

| | | | | |
|---|---|---|---|---|
| 2008/0246694 | A1* | 10/2008 | Fischer | G02B 27/017 345/9 |
| 2010/0142928 | A1* | 6/2010 | Rohde | H04N 5/265 386/212 |
| 2011/0007069 | A1* | 1/2011 | Lee | G06Q 30/0603 345/419 |
| 2011/0187706 | A1* | 8/2011 | Vesely | G06T 15/00 345/419 |

(Continued)

OTHER PUBLICATIONS

U.S. Appl. No. 15/194,094, "Non-Final Office Action", dated Aug. 24, 2017, 23 pages.

*Primary Examiner* — Ryan R Yang
(74) *Attorney, Agent, or Firm* — Kilpatrick Townsend & Stockton LLP

(57) ABSTRACT

A method may include rendering a first view of a three-dimensional (3-D) virtual scene comprising a view of first content being displayed on a virtual display device from a location in the 3-D virtual scene. The method may also include rendering a second view comprising one or more content objects. The second view may be rendered from the location in the 3-D virtual scene, and the second scene may include a view of the display device as would be seen through a pair of augmented-reality glasses that display the one or more content objects. The method may additionally include generating a composite view by combing the first view and the second view. The method may further include causing the composite view to be displayed on a virtual-reality headset.

20 Claims, 39 Drawing Sheets

(56) References Cited

U.S. PATENT DOCUMENTS

| | | |
|---|---|---|
| 2012/0127284 A1 | 5/2012 | Bar-Zeev et al. |
| 2012/0326948 A1 | 12/2012 | Crocco et al. |
| 2013/0328762 A1 | 12/2013 | McCulloch et al. |
| 2014/0198096 A1* | 7/2014 | Mitchell ............... G06F 3/147 345/419 |
| 2014/0364212 A1* | 12/2014 | Osman ................. A63F 13/213 463/31 |
| 2015/0070391 A1* | 3/2015 | Nishimaki ........... G06K 7/1404 345/633 |
| 2015/0350628 A1* | 12/2015 | Sanders ................. G06T 15/08 345/419 |
| 2016/0035140 A1* | 2/2016 | Bickerstaff ............. A63F 13/26 345/633 |
| 2016/0182877 A1 | 6/2016 | Deluca |
| 2016/0379417 A1* | 12/2016 | Mount ............. H04N 21/41407 345/633 |

\* cited by examiner

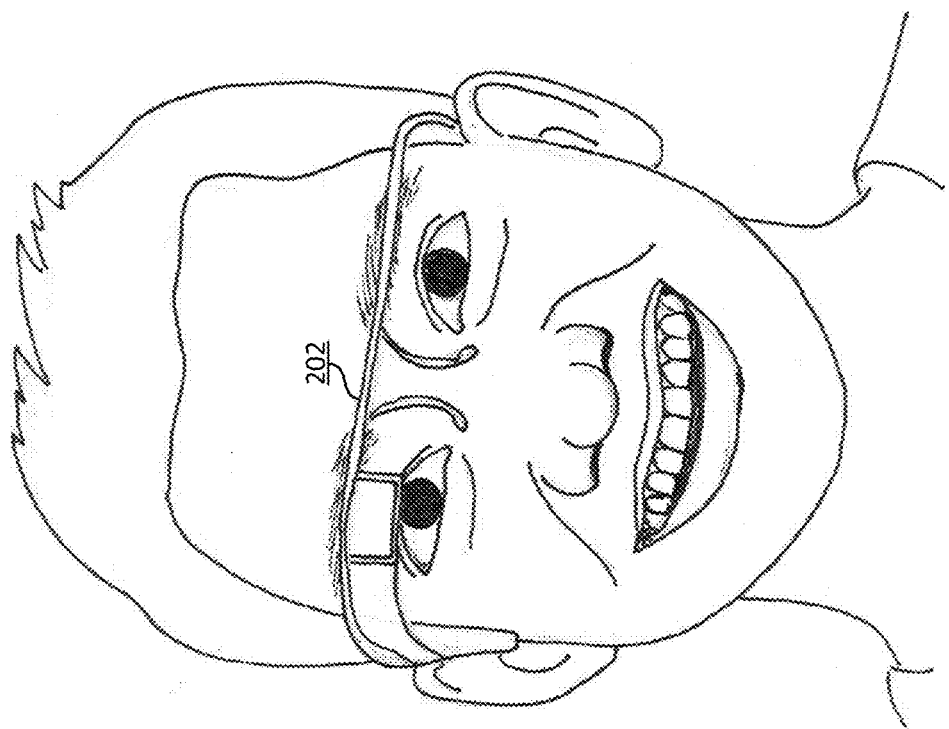
FIG. 2

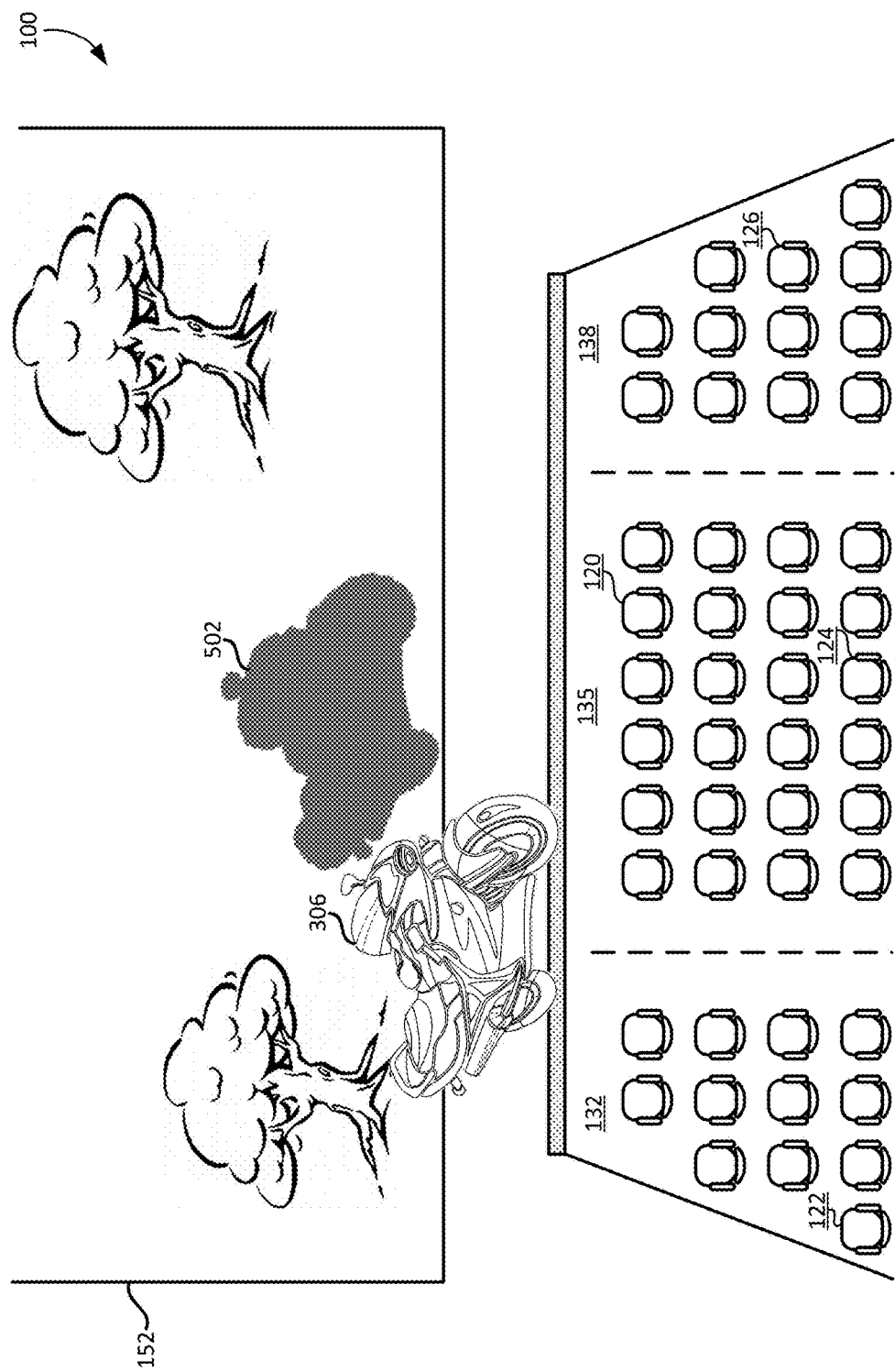

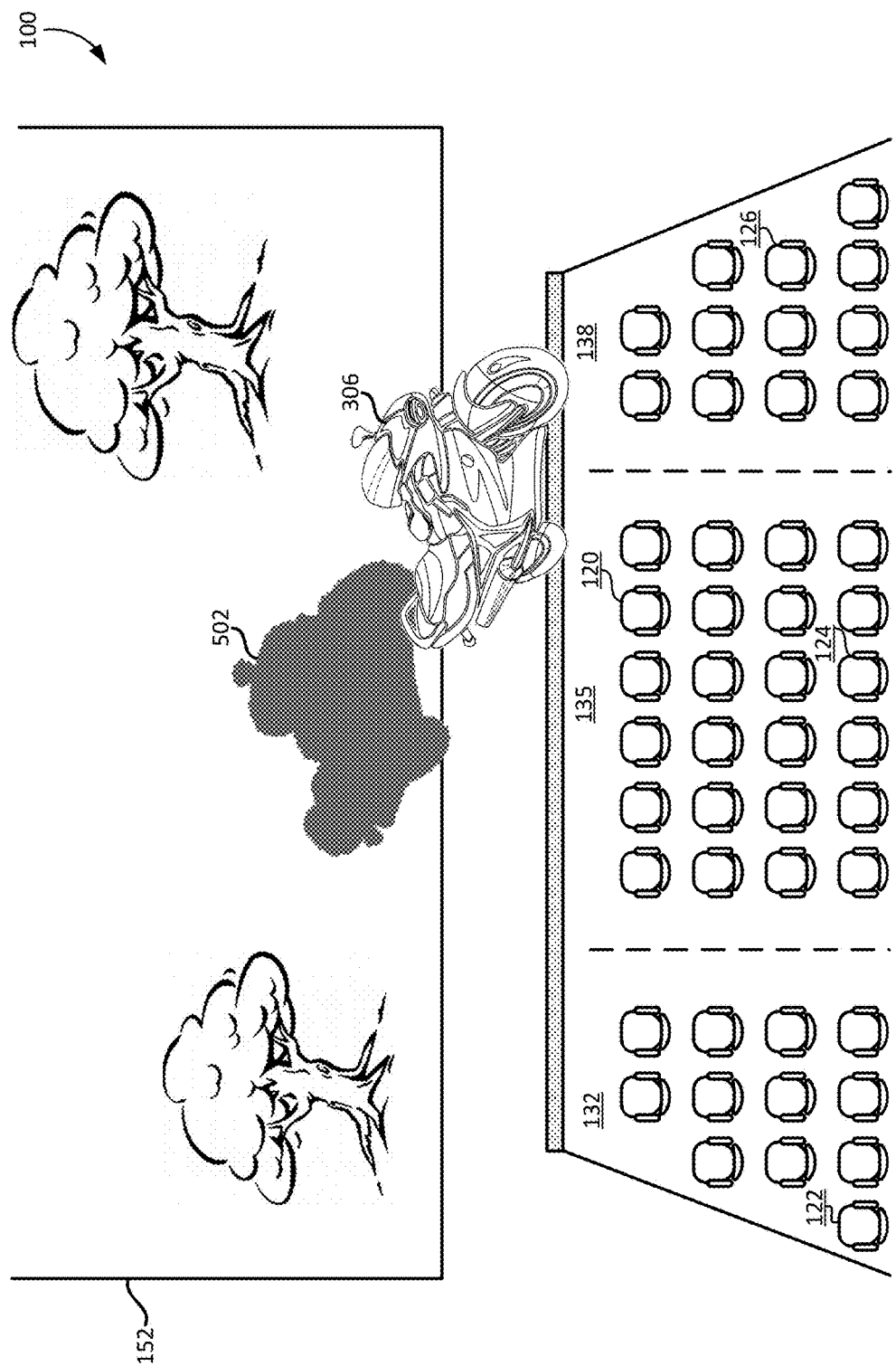

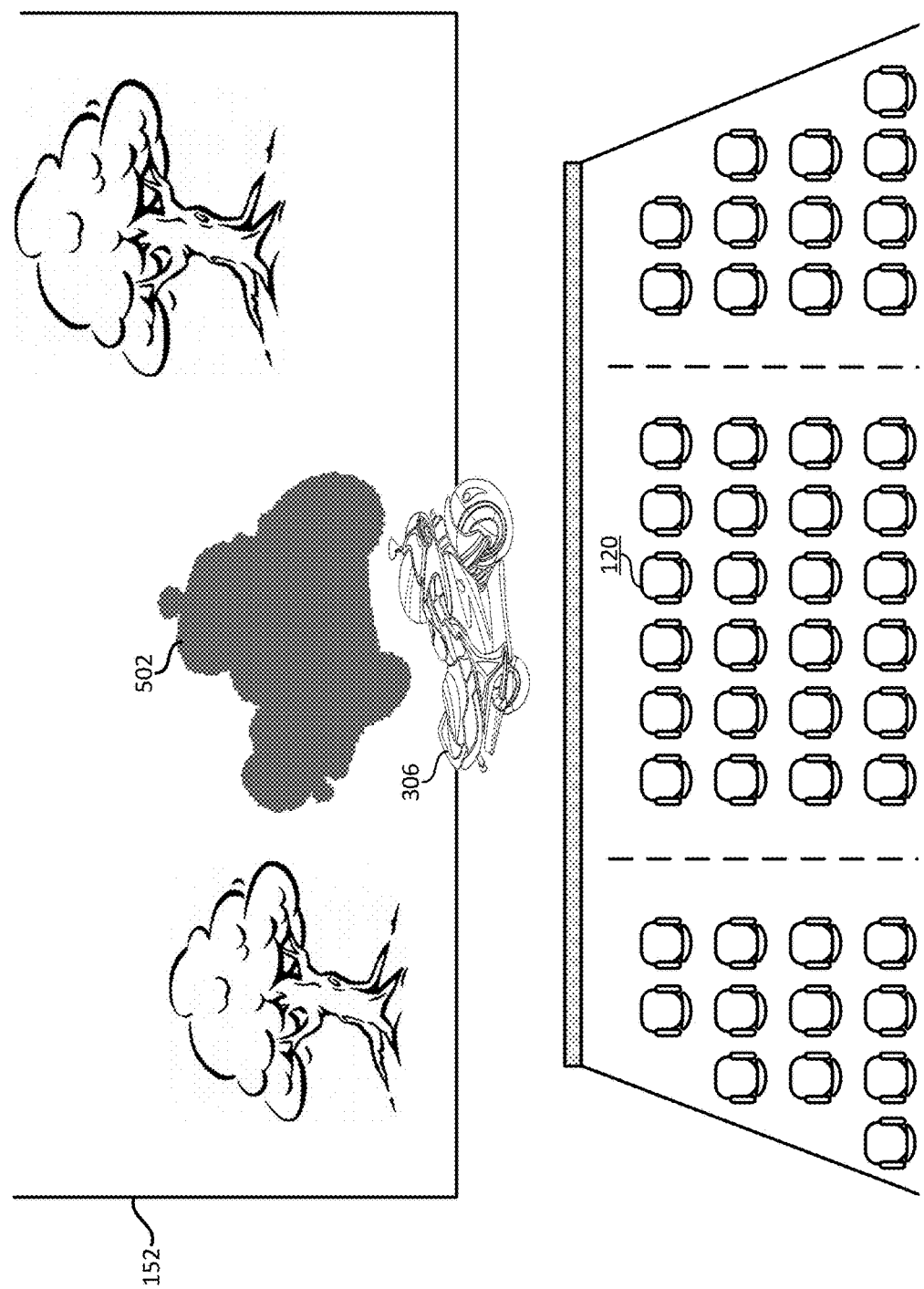

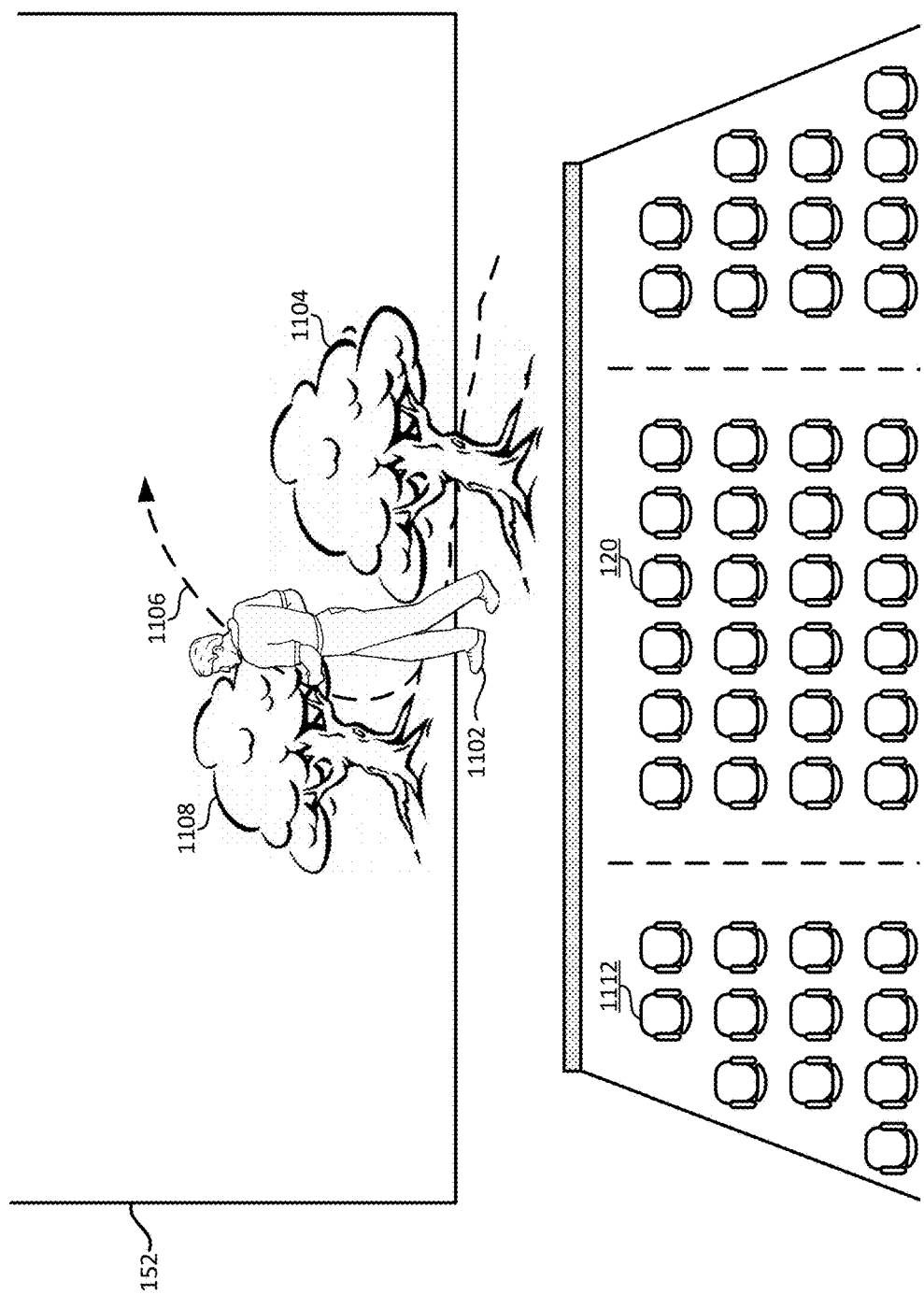

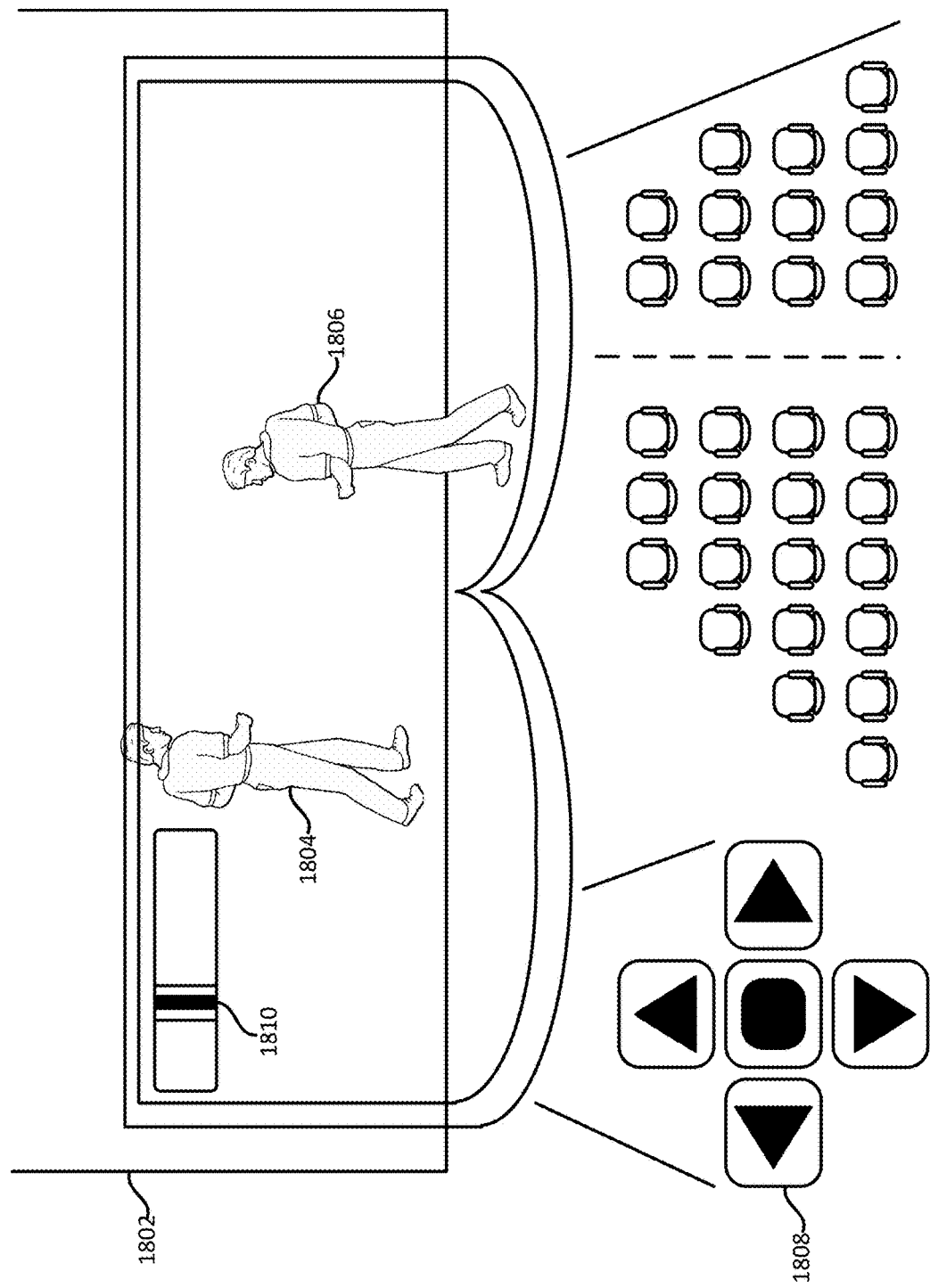

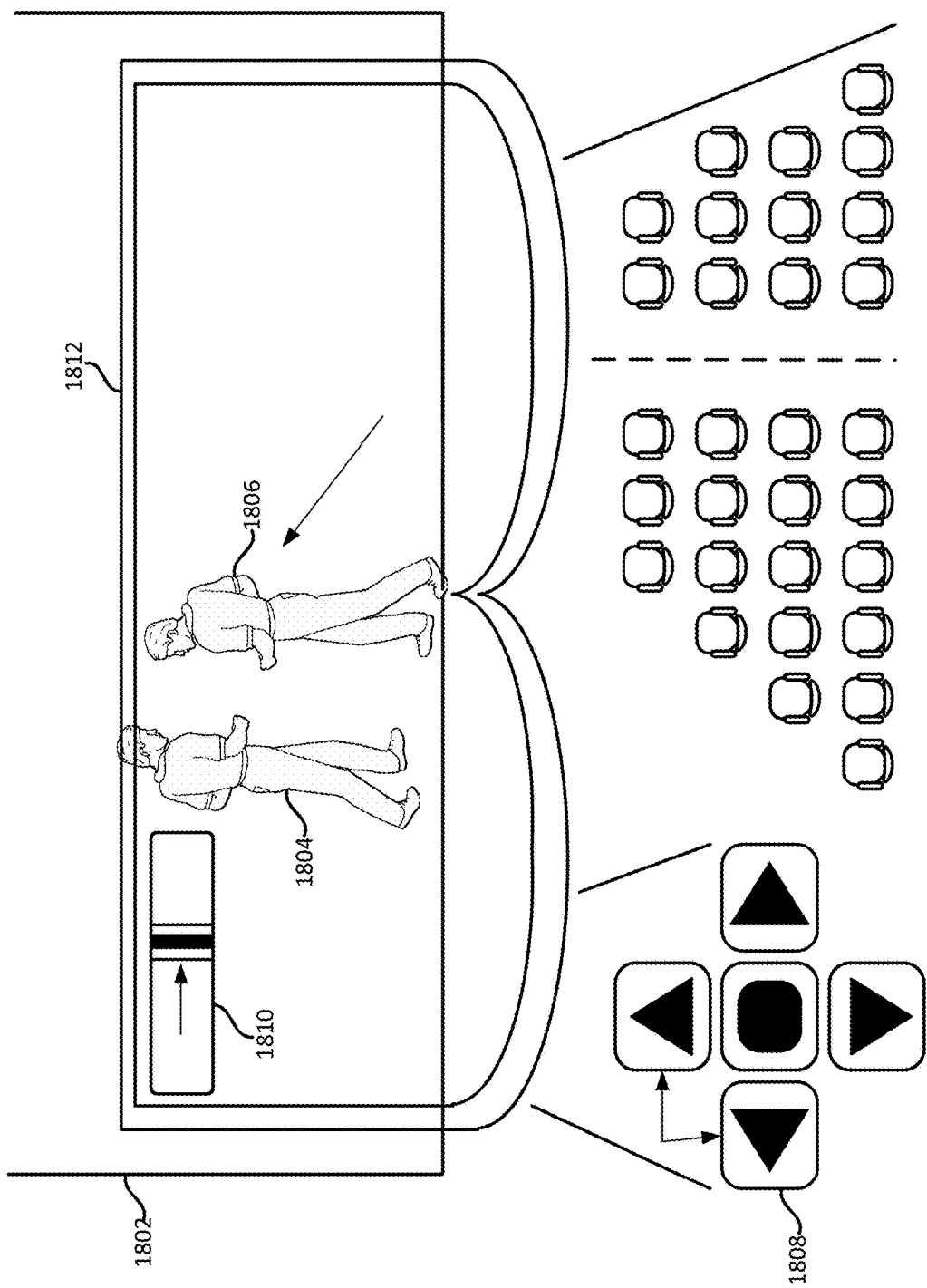

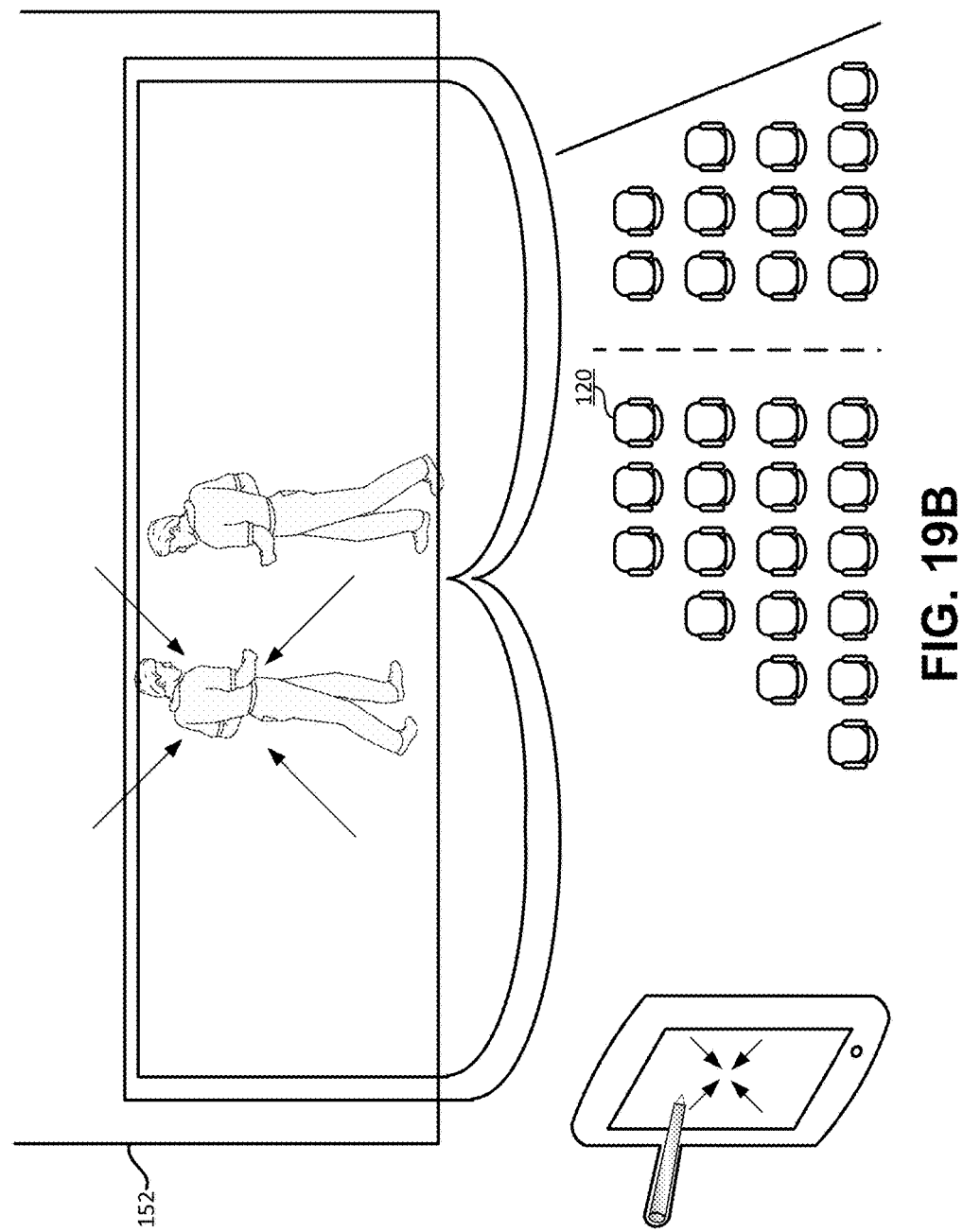

AUGMENTED REALITY SIMULATION

CROSS REFERENCES

This application claims the benefit of the following U.S. Provisional Application:

U.S. Provisional Application No. 62/239,134, filed on Oct. 8, 2015, entitled "AUGMENTED REALITY SIMULATION," by Koperwas et al, which is incorporated herein by reference.

This application is also a continuation-in-part of U.S. patent application Ser. No. 15/194,094 filed on Jun. 27, 2016, entitled "CONTENT PRESENTATION AND LAYERING ACROSS MULTIPLE DEVICES," by Gaeta et al., which is incorporated herein by reference. U.S. patent application Ser. No. 15/194,094 claims the benefit of the following U.S. Provisional Applications:

U.S. Provisional Application No. 62/185,422, filed on Jun. 26, 2015, entitled "INTERACTING WITH AN IMMERSIVE ENVIRONMENT," by Johnston et al, which is incorporated herein by reference.

U.S. Provisional Application No. 62/232,985, filed on Sep. 25, 2015, entitled "CONTENT PRESENTATION AND LAYERING ACROSS MULTIPLE DEVICES," by Koperwas et al, which is incorporated herein by reference.

U.S. Provisional Application No. 62/291,648, filed on Feb. 5, 2016, entitled "CONTENT PRESENTATION AND LAYERING ACROSS MULTIPLE DEVICES," by Koperwas et al, which is incorporated herein by reference.

BACKGROUND

Augmented reality includes a live view of a real-world environment that is augmented by computer generated sensory input(s), such as GPS graphics, video, sound, data statistics, and so forth. In contrast to virtual reality, which replaces the real-world environment with a simulated one, augmented reality elements are often displayed in real time in semantic context with elements of the real-world environment. For example, sports scores can be displayed on a television during a basketball game on a same screen. Headmounted displays can also be used to place the virtual images over a view of the physical world such that both are in the user's field of view.

BRIEF SUMMARY

In some embodiments, a computer-implemented method may include rendering a first view of a three-dimensional (3-D) virtual scene including a view of first content being displayed on a virtual display device from a location in the 3-D virtual scene. The method may also include rendering a second view comprising one or more content objects. The second view may be rendered from the location in the 3-D virtual scene. The second scene may include a view of the display device as would be seen through a pair of augmented-reality glasses that display the one or more content objects. The method may additionally include generating a composite view by combing the first view and the second view, and causing the composite view to be displayed on a virtual-reality headset.

In some embodiments, a non-transitory, computer-readable medium may include instructions that, when executed by one or more processors, cause the one or more processors to perform operations including rendering a first view of a three-dimensional (3-D) virtual scene including a view of first content being displayed on a virtual display device from a location in the 3-D virtual scene. The operations may also include rendering a second view comprising one or more content objects. The second view may be rendered from the location in the 3-D virtual scene. The second scene may include a view of the display device as would be seen through a pair of augmented-reality glasses that display the one or more content objects. The operations may also include generating a composite view by combing the first view and the second view, and causing the composite view to be displayed on a virtual-reality headset.

In some embodiments a system may include one or more processors and one or more memory devices comprising instructions that, when executed by the one or more processors, cause the one or more processors to perform operations including rendering a first view of a three-dimensional (3-D) virtual scene including a view of first content being displayed on a virtual display device from a location in the 3-D virtual scene. The operations may also include rendering a second view comprising one or more content objects. The second view may be rendered from the location in the 3-D virtual scene. The second scene may include a view of the display device as would be seen through a pair of augmented-reality glasses that display the one or more content objects. The operations may also include generating a composite view by combing the first view and the second view, and causing the composite view to be displayed on a virtual-reality headset.

In any of the embodiments described herein, one more of the following features may be included in any combination and without limitation. The 3-D virtual scene may include a virtual movie theater, the first content may include a movie generated at least in part from a rendered scene, and the virtual display device may include a virtual movie screen in the virtual movie theater displaying the movie. The virtual-reality headset may be located in a physical environment, and the 3-D virtual scene may be modeled after the physical environment. The physical environment may include a physical display device, and the virtual display device may be modeled after the physical display device. The method/operations may also include determining the movement and orientation of the virtual-reality headset, and altering the first view and the second view based on the movement and orientation of the virtual-reality headset. The second view may include a view of a virtual pair of augmented reality glasses. The one or more content objects may interact with the first content being displayed on the virtual display device in the composite view.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 2 illustrates examples of the first mobile device, according to some embodiments.

FIG. 6A illustrates an image displayed on the mobile device that is attached to a screen location with a consistent screen projection, according to some embodiments.

FIG. 6B illustrates the image displayed on the mobile device when viewed from a rightward viewing location, according to some embodiments.

FIG. 10A illustrates how content displayed on the mobile device can be compressed in depth based on a distance to the screen 152, according to some embodiments.

FIG. 11C illustrates how the character is viewed differently at the same point in time from a different location in the viewing environment, according to some embodiments.

FIGS. 18A-18B illustrates how objects can be synchronized between the first layer presented on a simulated screen and the second layer presented on the simulated augmented reality glasses, according to some embodiments.

FIGS. 19A-B illustrate how content objects and be adjusted that are displayed on the first layer corresponding to the virtual screen, according to some embodiments.

DETAILED DESCRIPTION

Figure 1A:
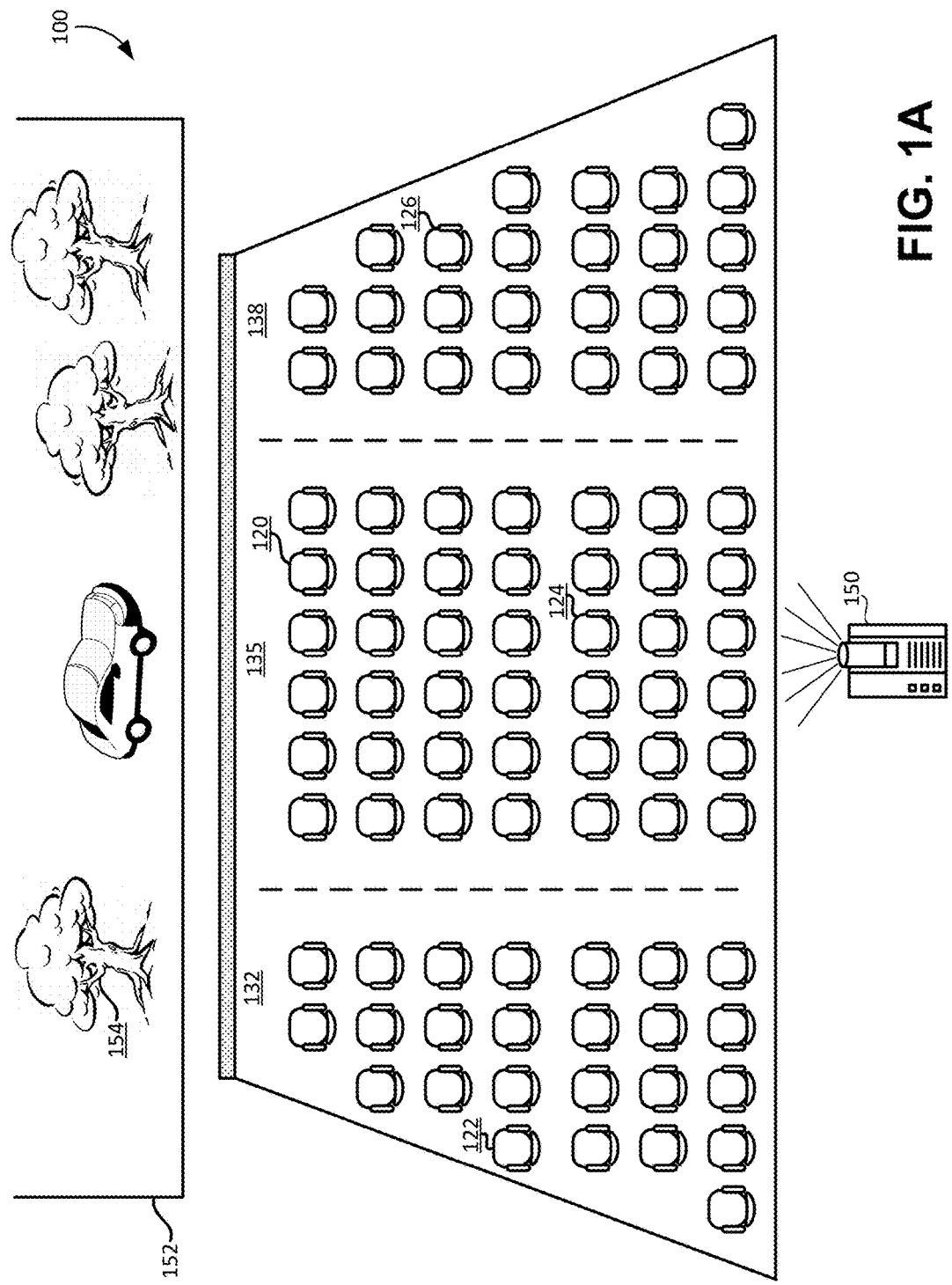
FIG. 1A illustrates an environment for presenting layered content across multiple devices, according to some embodiments.

Embodiments described herein may be directed at the integration and synchronization of content shown over a screen with additional content displayed via, for example, a pair of augmented-reality (AR) glasses. For example, a feature film may be presented over a typical movie screen. A pair of AR glasses worn by a viewer may simultaneously present additional content that augments the content presented over the screen. In this way, various visual effects and/or additional information may be conveyed to the viewer to enhance the viewer's experience. Illustratively, a pitcher may be shown as throwing a baseball in a movie presented over a screen. At some point, the baseball may "pop-out" of the screen by being transitioned for display over AR glasses worn by a viewer.

In some embodiments, a display system manages the integration and synchronization of content presented over a screen with additional content presented via a pair of AR glasses. In one aspect, the presentation system automatically determines the location of every pair of AR glasses within an viewing environment. Specifically, the AR glasses may include one or more sensors and/or communication devices, such as GPS sensors, WiFi, bluetooth, cameras, visual markers, etc. The sensors/communication devices may be used to determine the locations of each viewer within the auditorium. The presentation system and/or each pair of AR glasses may further automatically determine the real and/or viewer relative dimensions of the screen in the auditorium.

Based on the locations of each pair of AR glasses and the screen dimensions, the presentation system determines how the additional content for each individual pair of AR glasses is to be presented to a corresponding viewer. Specifically, the positioning, orientation, size, and other features of the additional content may be automatically adjusted so that the additional content can be correctly integrated with the content presented over the screen for each viewer. Other viewers wearing other AR glasses may have the additional content be adjusted differently since they may be sitting at different locations within the auditorium.

As an example, an auditorium may be divided into multiple logical zones. The presentation system may indicate to a pair of AR glasses to present the additional content based on the zone in which the AR glasses are located. For instance, if a viewer were located at a logical zone on the right side of the auditorium, the presentation system may have the additional content presented to the viewer in a manner that compensates for the fact that the viewer is at the right side of the auditorium. Illustratively, the additional content may be placed in a particular position based on the fact that the viewer is located in the logical zone on the right side of the auditorium. The additional content may be placed at a different position for viewers located in other logical zones.

As another example, the AR glasses may automatically use a built-in camera or some other sensor to determine the dimensions of the screen in an auditorium relative to the viewer wearing the AR glasses. Based on this determination, the AR glasses may present the additional content such that it is scaled based on the determined relative dimensions of the screen for the viewer. For instance, a first user in an auditorium may be presented the additional content at a scale of 90%. A second user in the auditorium who is further back (and thus the relative dimensions of the screen may be smaller) may be presented the additional content at a scale of 50%.

As still another example, the presentation system may automatically use information regarding the location of the AR glasses and the predefined real dimensions of the screen to scale the additional content, which it then provides to the AR glasses for presentation to the user. For example, based on the real dimensions of the screen and the location of the AR glasses, the presentation system can determine the dimensions of the screen relative to the viewer wearing the AR glasses. Based on this determination, the presentation system can scale the additional content so that it appears "correct" relative to the content presented over the screen.

In some aspects, the additional content may be automatically synchronized with the content presented over the screen. In some aspects, a camera or microphone built into the AR glasses may be used to trigger or signal when certain events are occurring in the feature film and cause certain portions of the additional content to be accordingly presented. In one aspect, the aforementioned triggering may be based on the matching of audio or image-based fingerprints. In other aspects, the presentation system may keep track of the run-time of the feature film. Based on the run-time, the presentation system may signal to the AR glasses when to present portions of the additional content.

Throughout the rest of this disclosure, a particular viewing environment will be used as an example. This viewing environment may be described as a traditional movie theater auditorium with a plurality of seats and a large screen at the front of the viewing area onto which a motion picture is projected. Each of the viewers seated in the auditorium may be equipped with a mobile device, such as the AR glasses described above. The mobile device can provide additional layered content that appears in an immersive and fluid fashion with the content projected on the screen. However, it will be understood that this particular viewing environment is merely used by way of example, and is not meant to be limiting. Other environments may also include a home with a television screen replacing the movie theater screen described below, and a tablet device, laptop device, mobile phone, and/or the like replacing the AR glasses described above. Therefore, throughout the remainder of this disclosure, any of the specific devices, arrangements, systems, or architectures that specifically refer to the theater environment may also be readily applied to a home viewing environment, or any other similar viewing environment, in any combination and without limitation.

FIG. 1A illustrates an environment 100 for presenting layered content across multiple devices, according to some embodiments. The environment 100 may include a display system and a mobile device. It should be appreciated that there may be additional components to the representative system. Additionally, certain components may not necessarily be required by the system. Components may also be combined. In one embodiment, each of the components in the system may be connected over a suitable connection. In certain embodiments, the components may be connected over the Internet or a local Intranet.

The display system may include devices suitable for projecting or displaying an item of content, such as a movie. The movie may include a digital animated film, a live-action film, a videogame, and/or any combination thereof. In some embodiments, the display system may include a projection device 150 and/or a screen 152. The projection device 150 may project an item of content onto the screen 152. In other embodiments, the screen 152 may include an active screen display, such as a television, an LCD television, a wall of LED screens, and/or the like. In still other embodiments, the display system may include a computer with a monitor, a tablet device, a smartphone, a watch, a portable DVD player, etc. For example, some embodiments may omit the projection device 150, and the screen 152 can actively display the item of content.

The mobile device may be a set of virtual reality or augmented reality glasses or goggles. The mobile device may also include portable screens, such as the smart phone, a tablet device, a watch, a laptop computer, and/or the like. In some embodiments, the mobile device may include a display or a mechanism for projecting images that are visible to a user. The display of the mobile device may be transparent or semi-transparent such that a user can also see through the display. The projection of images over the display of the mobile device may only obscure a portion of the field of view of the user. In this way, a user can view both the image displayed by the mobile device and at least a portion of the physical environment behind the display of the mobile device.

In some embodiments, the physical environment behind the display of the mobile device may include the screen 152. In these embodiments, the user can simultaneously view both an image displayed by the first mobile device and at least a portion of the display of the screen 152. The embodiments described herein layer content between the screen 152 and the mobile device in a seamless and interactive way, such that the user is provided with an immersive content experience that is unique based on their location in the environment 100.

In certain embodiments, the display system may load an item of content, such as a movie, and begin presenting the item of content to one or more users. Although not shown explicitly due to size constraints in FIG. 1A, each viewer sitting in the seats depicted in the environment 100 may be equipped with a mobile device. When referring to a specific viewer in a specific location in the environment 100, the mobile device used by that specific viewer may be referred to as the "first mobile device" or simply the "mobile device." For example, the environment 100 includes locations 120, 122, 124, and 126, each of which may include a user equipped with a mobile device. When referring specifically to the experience of a user sitting in location 120, the mobile device of the user in location 120 may be referred to as the "mobile device." When comparing the viewing experience of users in different locations, the respective mobile devices may be referred to as the "first mobile device" and the "second mobile device." Therefore, it will be understood that the terms "first" and "second" do not imply ordering, precedence, and/or preference. Instead, these terms are used merely to distinguish one mobile device from another mobile device.

Figure 1B:
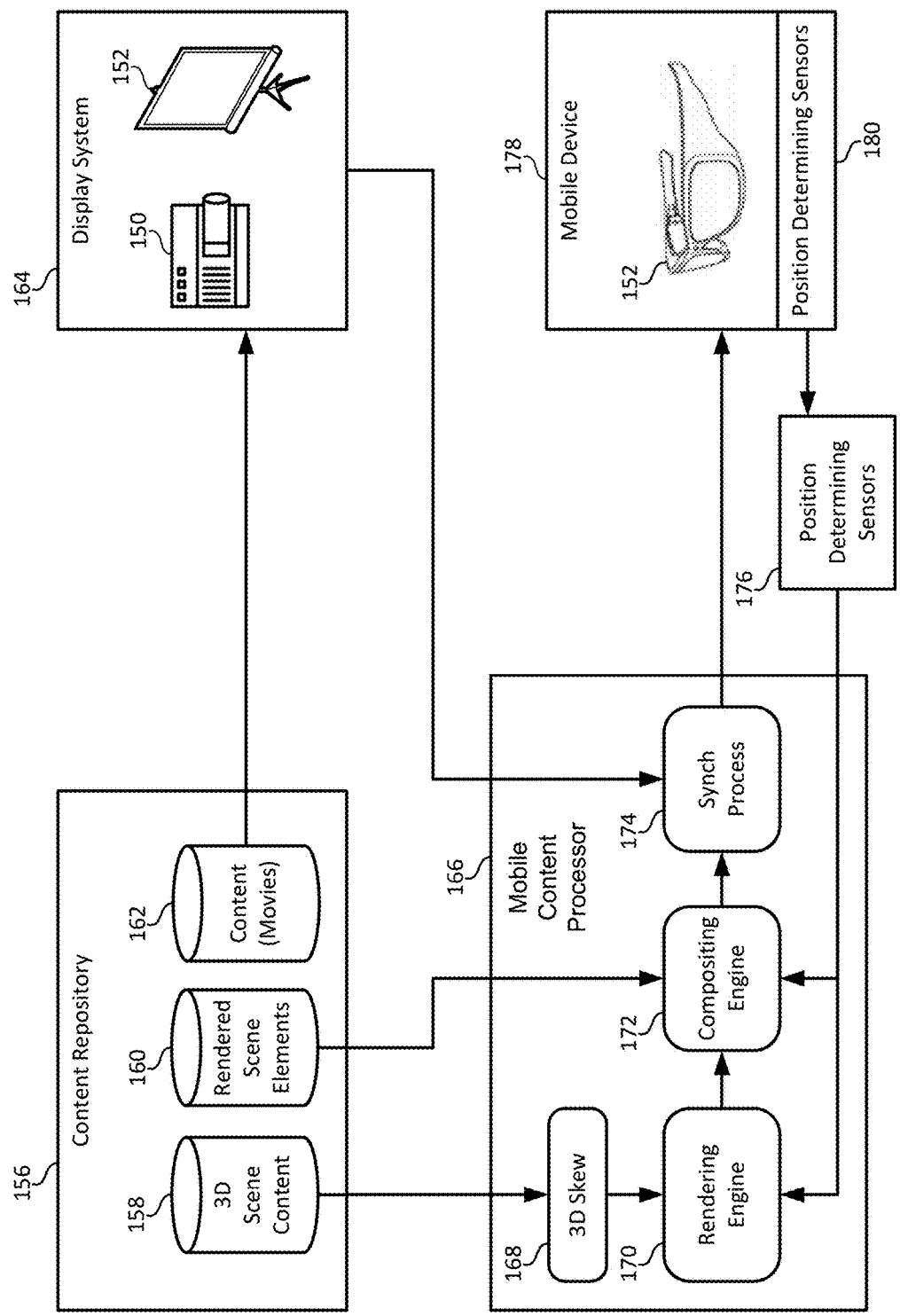
FIG. 1B illustrates a custom hardware/software system for generating and displaying layered content on multiple devices, according to some embodiments.

FIG. 1B illustrates a custom hardware/software system for generating and displaying layered content on multiple devices, according to some embodiments. The system may include a content repository 156 that includes one or more different types of content. First, the content repository 156 may include a content data store 162 that includes content to be displayed by the display system 164. In some embodiments, the content data store 162 may include full-length movies or complete media productions that can be displayed on the screen 152. The content data store 162 may include a plurality of two-dimensional (2-D) frames that can be sequentially displayed on the screen 152.

The system may also include a mobile device 178, such as a pair of augmented-reality glasses 152. The system may be configured to display additional content on the mobile device 178 during playback of the content in the content data store 162 on the screen 152. In some embodiments, a position and/or orientation of the mobile device 178 may be known and static, in that the position and orientation of the mobile device 178 is constant and unchanging during playback of the content from the content data store 162. In this case, the additional content to be displayed on the mobile device 178 can also be stored as a plurality of 2-D frames that are displayed on the mobile device 178. In these embodiments, no additional rendering or compositing may be necessary in order to display the additional content on the mobile device 178.

In some embodiments, the position and/or orientation of the mobile device 178 may be unknown and/or changing during playback of the content from the content data store 162. In these embodiments, the system can generate a sequence of 2-D frames to be displayed on the mobile device 178 that account for the position and/or orientation of the mobile device 178. In some cases, the approximate position of the mobile device 178 may be known, but the orientation of the mobile device 178 may be allowed to change dynamically. The content repository 156 may also include a rendered scene elements data store 162 that includes scene elements rendered from a particular approximate position of the mobile device 178. These rendered scene elements can be retrieved by a mobile content processor 166 and processed into a sequence of 2-D frames for display on a mobile device. The rendered scene elements can be inserted into a compositing engine 172 to be edited before being sent to the mobile device 178 for display. In some scenes, the rendered scene elements may interact with elements of the content from the content repository 162 currently being displayed on the screen 152. For example, a character or object being displayed on the mobile device 178 may pass behind an object being displayed on the screen 152. The compositing engine 172 can generate a matte or cut out that removes a portion of the rendered scene elements comprising the character or object as it passes behind the object displayed on screen 152. An example of this situation is described below in greater detail.

In the situation described above where a series of rendered, 2-D frames have been stored corresponding to a specific location in front of the screen 152, that set of 2-D frames can be used for all viewer locations position at that orientation from the screen 152, regardless of the distance from the screen (z-depth). However, while the same images may be reused, the distance from the screen can be used to scale, skew, and/or stretch each of these images based on distance from the screen. This may be done to compensate for the fact that an object displayed on the mobile device close to the screen will look very small, while the same object displayed at the same size on the mobile device far away from the screen will look very large in comparison to objects on the screen. Examples of this type of scaling are shown in greater detail in the examples given below.

The mobile content processor 166 may be co-implemented with the content repository 156, and may transmit the sequence of 2-D frames to the mobile device 178 after the sequence is generated. In other embodiments, the mobile content processor 166 may be integrated with the mobile device 178 such that each mobile device 178 in the environment 100 is able to process its own individual sequence of 2-D frames for display. In a theater with hundreds of viewers, pushing the mobile content processor 166 out to each of the individual mobile devices 178 can alleviate decentralized transmission and/or generation of 3-D images.

In some embodiments, the content to be displayed on the mobile device 178 may be generated in real time as the content from the content repository 162 is displayed on the screen 152. A 3-D scene content repository 158 can store animated sequences for a 3-D scene that can be rendered in real time for display on the mobile device 178. The mobile content processor 166 can accept an animation sequence comprising 3-D scene elements. Turning back briefly to FIG. 1A, a location where the viewer is sitting can be used as a position of a virtual camera in the 3-D virtual scene. The image plane for the rendered scene can be positioned directly in front of the 3-D virtual camera to correspond to the position of the screen/lens of the mobile device 178 in front of the viewer's eye. The content in the content repository 162 being displayed on the screen 152 may have been rendered from the same scene with the image plane positioned at the location of the screen 152 relative to the position of the mobile device 178 and the viewer. The position and/or orientation of the mobile device 178 can be determined in real time and fed into the rendering engine 170 such that the position/orientation of the virtual camera and image plane can be updated in real-time. The rendering engine 170 can use the determined position and the 3-D scene content in order to generate a rendered set of 2-D images for display a mobile device.

When the position of the mobile device 178 is directly in front of the screen 152, the rendered scene elements can be displayed without alteration on the mobile device 178. However, when the location of the mobile device 178 is to the left or right of the center of the screen 152, the rendered content may need to be skewed in order to match the apparent skew of the screen 152. For example, when the viewer is sitting in location 124 of the environment 100 of FIG. 1A, the rendered 3-D elements can be displayed on the mobile device 178 without alteration. However, when a viewer is sitting in location 126, the objects appearing on the screen 152 will appear skewed because of the viewing angle relative to the screen 152. To solve this problem, a skew operation 168 can be added to the mobile content processor 162 that uses the location of the mobile device 178 to skew the geometry of the 3-D elements before they are rendered by the rendering engine 170. Alternatively or additionally, stored 2-D images can be stretched or compressed in the direction of the required skew without performing another rendering operation. An example of this situation is described in greater detail later in this disclosure.

As the viewer is viewing the item of content while wearing the mobile device 178, the mobile device 178 may display additional content to augment the item of content displayed by the display system. This may require a synchronization process 174 to coordinate the timing of images displayed on the screen 152 and images displayed on the mobile device 178. For example, the mobile device 178 may be configured to detect when certain scenes or events are occurring within the content displayed on screen 152. In one embodiment, the mobile device 178 may detect such events by using a built in camera to match a currently displayed frame by the screen 152 with a predefined frame representative of the scene or event. In another embodiment, the mobile device 178 may detect such events by using a built in microphone to determine whether the audio currently being presented by the display system matches with a predefined audio representative of the scene or event. In yet another embodiment, a communication link between the display system and the mobile device 178 may be established. The display system may send a signal to the mobile device 178 via the communication link to indicate triggering or occurrence of a scene or event. If a match/event/scene is detected, the mobile device 178 may automatically present additional content associated with the scene or event. In some embodiments, the additional content may only be presented on a portion of the display of the mobile device 178. The remaining portion may be kept transparent so that a user can still view the content being displayed over the screen 152. In this way, the additional content presented by the mobile device 178 can appear to be layered over, overlaid, or composited with the content being displayed by the screen 152. As an illustrative example, a user may be viewing a movie showing a starship battle scene. When the particular scene is detected by the mobile device 178, the mobile device 178 may display a flying saucer that appears to interact with the content being displayed over the projection device 150. This may only be perceived by the user wearing the mobile device 178. Users who are not wearing mobile devices may not perceive the flying saucer or any additional content.

The mobile device 178 may include one or more position determining sensors 180. In some embodiments, the sensors may include accelerometers, gyroscopes, GPS receivers, gravitation sensors, and/or digital compasses. The sensors can be used to determine a position and/or orientation of the mobile device 178 by measuring displacements from an initial, known position. For example, each mobile device in FIG. 1A could be assigned to a specific seat location in the environment 100. At the beginning of the movie, the viewer may be instructed to look directly at a symbol in the middle of the screen 152 to establish a known, initial orientation. From that point, the accelerometers and gyroscopes could be sampled to measure displacements from this initial position. These sensors, along with a gravitational sensor can be used to measure a change in orientation from the initial orientation.

In some embodiments, the determining sensors 180 may include a radio transmitter and/or an RFID chip. Radio receivers can be positioned throughout the environment 100 and used to ping the RFID chip on the mobile device 178. These external radio receivers may be one of a plurality of position determining sensors 176 that are distributed throughout the environment 100. By measuring the ping time for each mobile device of each of the position determining sensors 178 of the environment 100, a position of the mobile device 178 can be triangulated. In some embodiments, the GPS receiver can be integrated into the mobile device 178 and used to determine a position of the mobile device 178. In some embodiments, the position determining sensors 178 may include a plurality of cameras. The cameras may be configured to detect fiducial markers that are installed as part of the position determining sensors 180 on the mobile device 178. For example, a graphic symbol resembling a QR code can be placed on the mobile device 178 and determined by the cameras.

FIG. 2 illustrates examples of a mobile device, according to some embodiments. In order to display content on the mobile device, the mobile device may be small enough that only a portion of the content displayed on the display system is obscured. In some embodiments, the mobile device may be transparent or semitransparent such that the content displayed by the display system is visible through the content displayed on the mobile device. In some embodiments, the mobile device may have a transparent display area that is transparent everywhere except where content is displayed by the mobile device.

In one specific example that may be used for illustrative purposes throughout this description, the mobile device may include an augmented-reality headset or virtual-reality headset (VR). A virtual-reality headset 202 may include a head-mounted device configured to provide an immersive virtual reality experience. It may include a stereoscopic head-mounted display providing separate images for each eye, along with head or motion determining sensors. The sensors may include gyroscopes, accelerometers, structured light systems, and so forth. In some embodiments, the virtual-reality headset 202 may also include headphones, eye determining sensors, and/or input controllers that may be accessed by a user.

In some embodiments, an augmented-reality (AR) headset 204 may include a head-mounted display that allows viewing of both images of the physical world and virtual objects that are projected by the augmented-reality headset into the user's field of view. In some embodiments, the augmented-reality headset may include eyeglasses, visors, goggles, or other devices resembling such. Some embodiments may include eyewear that employs cameras to intercept a real-world view that is redisplayed for the user. Embodiments that display a real-time real-world image for the viewer qualify as "transparent or semitransparent" for the purposes of this description. Other embodiments may include a heads up display, contact lenses, a virtual retina display, EyeTap® technology, and so forth. Like the virtual-reality headset 202, the augmented-reality headset 204 may include position-determining devices, such as digital cameras, optical sensors, accelerometers, GPS receivers, gyroscopes, solid-state compasses, RFID chips, wireless sensors, and so forth, that determine the location and/or orientation of a user's head. The augmented reality headset 204 may also include input devices, such as gesture recognition systems, touchpads, buttons, microphones, and/or sensors that are configured to interpret a user's body movements as inputs.

Figure 3A:
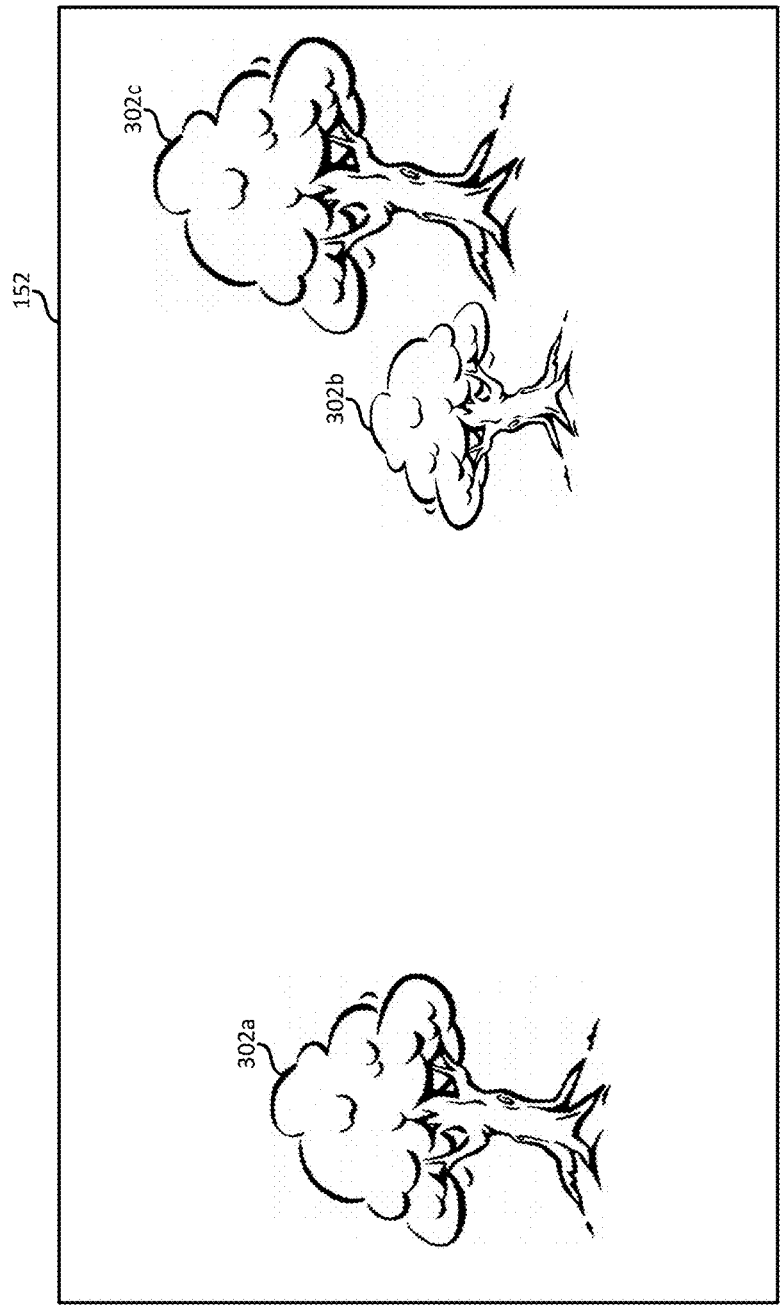
FIG. 3A illustrates a scene displayed by the display system in the absence of the first mobile device, according to some embodiments.

FIG. 3A illustrates a scene displayed by the display system in the absence of a mobile device, according to some embodiments. Specifically, a landscape is displayed by the display system as seen by a user who is not wearing a mobile device (e.g., set of VR/AR goggles). The screen 152 illustrates a plurality of trees 302 as part of the landscape. In some embodiments, it may not be readily apparent to a viewer that any object is missing from the landscape displayed by the display system. This can be used to ensure that viewers that are not equipped with a compatible mobile device are still able to enjoy the content displayed by the display system.

Figure 3B:
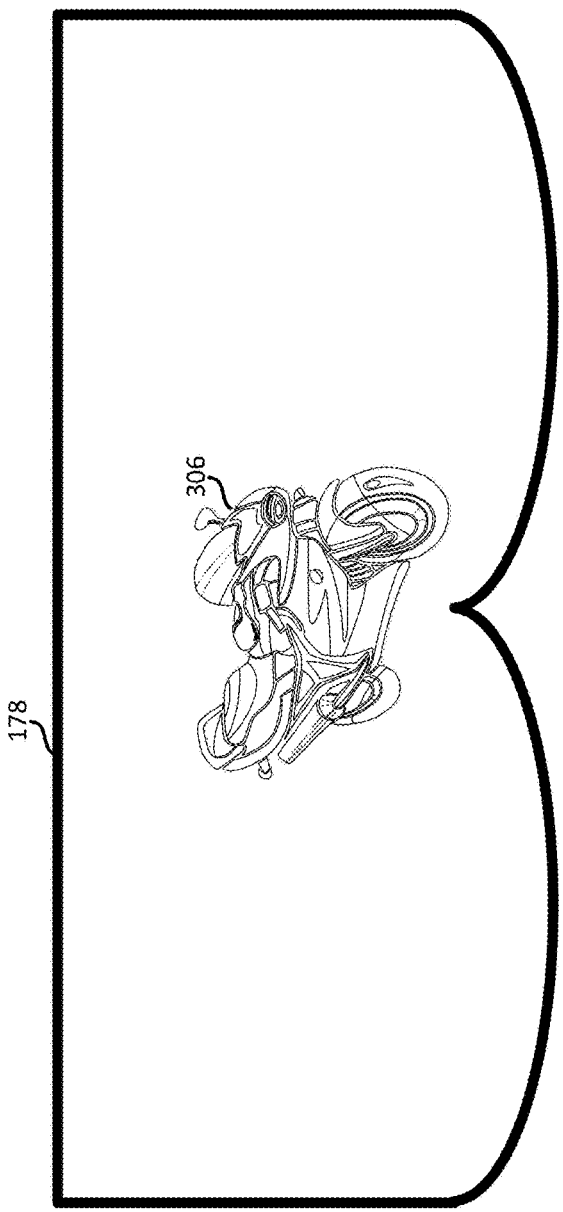
FIG. 3B illustrates the same scene displayed by the mobile device in the absence of display system, according to some embodiments.

FIG. 3B illustrates the same scene displayed by the mobile device 178 in the absence of the display system, according to some embodiments. Specifically, the same landscape displayed by the display system is viewed through the mobile device 178. The representation of the mobile device 178 in FIG. 3B represents the view of a user looking through the mobile device 178. For example, FIG. 3B may represent a user looking through the view of a pair of augmented-reality glasses. As can be seen, the mobile device 178 displays a motorcycle 306. Also, the mobile device 178 does not display any of the background scene elements, such as the plurality of trees 302 that are part of the landscape displayed by the display device in FIG. 3A. As with the display device, some embodiments can present content in such a way that the content can still be enjoyed using the mobile device 178 in the absence of the display system.

Figure 3C:
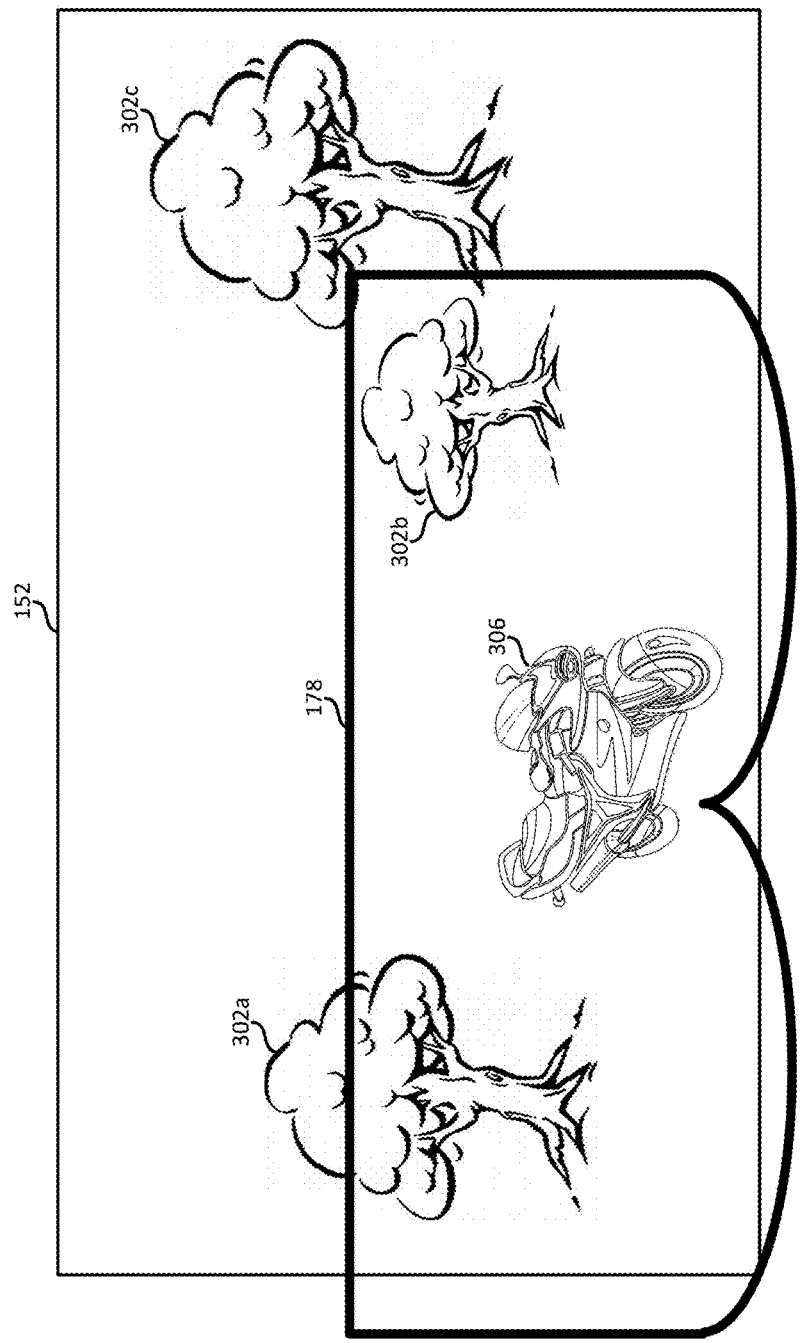
FIG. 3C illustrates the same scene displayed by the mobile device with the display system, according to some embodiments.

FIG. 3C illustrates the same scene displayed by the mobile device 178 with the display system, according to some embodiments. Specifically, the landscape, including the plurality of trees 302, continues to be displayed by the display device. The display of the mobile device 178 is transparent such that the plurality of trees 302 is still visible to a viewer who is looking through the mobile device 178. The motorcycle 306 displayed by the mobile device 178 is now layered on top of the landscape displayed by the display system. In some embodiments, the motorcycle 306 can blend seamlessly in with the other elements of the landscape displayed by the display device, such that it is indistinguishable to a user that the motorcycle 306 is not displayed by the display system. In other embodiments, the motorcycle 306 can be displayed such that it appears to "leap out" of the landscape of the display device to present a three-dimensional experience that is not constrained by the size of the screen 152.

Figure 3D:
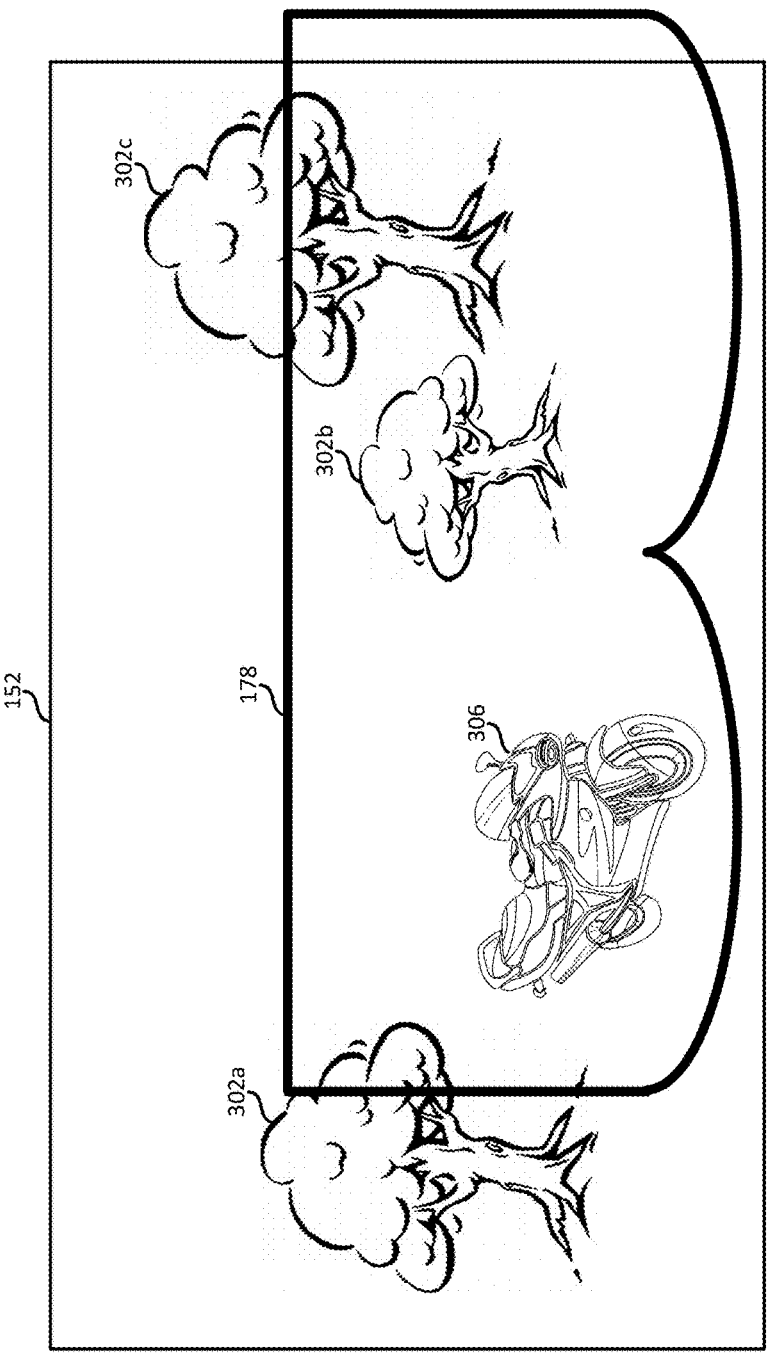
FIG. 3D illustrates the same scene after a change of position or orientation of the mobile device 178, according to some embodiments.

FIG. 3D illustrates the same scene after a change of position or orientation of the mobile device 178, according to some embodiments. The change in position of the mobile device 178 may be attributed to a user moving and/or rotating his/her head while wearing the mobile device 178. Using the position determining sensors described above (e.g., GPS, accelerometers, gyroscopes, digital compass, etc.), the mobile device 178 can detect the change in location and/or orientation of the mobile device 178 and adjust the display presented by the mobile device 178 accordingly. Specifically, the location of the motorcycle 306 in the landscape relative to the plurality of trees 302 has not changed despite the change in location/orientation of the mobile device 178. Thus, although the image displayed by the mobile device 178 may be dependent on the location of the mobile device 178 in the environment 100, movements or rotations of the mobile device 304 need not affect the presentation of the content of the mobile device 304 relative to the content displayed by the screen 152. In other words, the content displayed on the mobile device 178 can move with the viewer's head such that it appears to stay in the same place relative to the display of the screen 152.

Figure 4A:
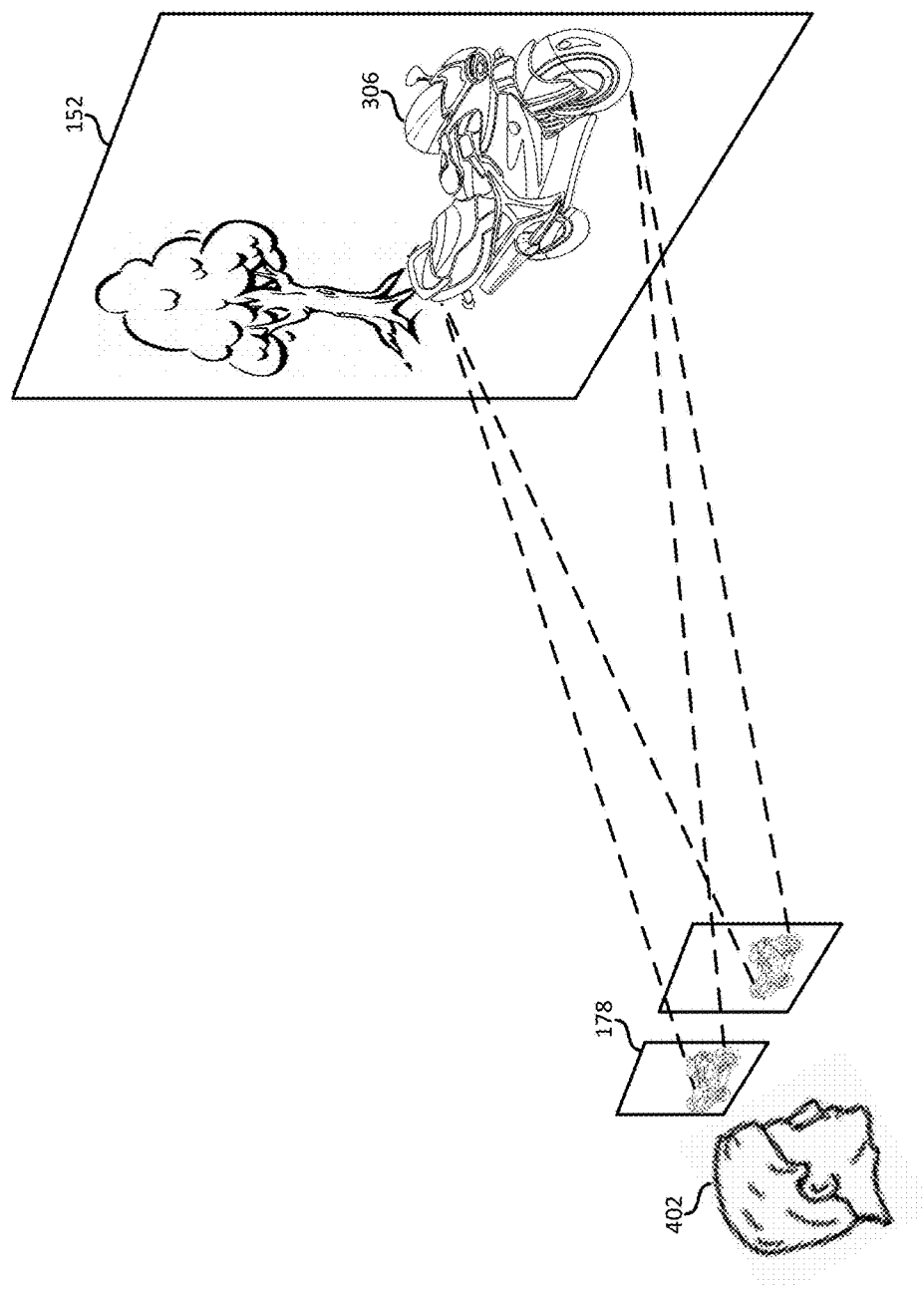
FIG. 4A illustrates the relative sizing of an image rendered for display on the mobile device as it appears layered against the screen, according to some embodiments.

FIG. 4A illustrates the relative sizing of an image rendered for display on the mobile device as it appears layered against the screen, according to some embodiments. Stereo images of the motorcycle 306 can be generated for display on the mobile device 178. FIG. 4A depicts the screens/lenses of the mobile device 178. Because the image plane corresponding to the mobile device 178 is closer to the position of the virtual camera (i.e., the eye of the viewer 402) then the image plane of the screen 152 in the virtual 3-D scene and in the environment 100, the image of the motorcycle 306 displayed on the mobile device 178 may be sized such that the motorcycle 306 appears proportionally correct when visually layered against the screen 152 according to the perception of the viewer 402.

Figure 4B:
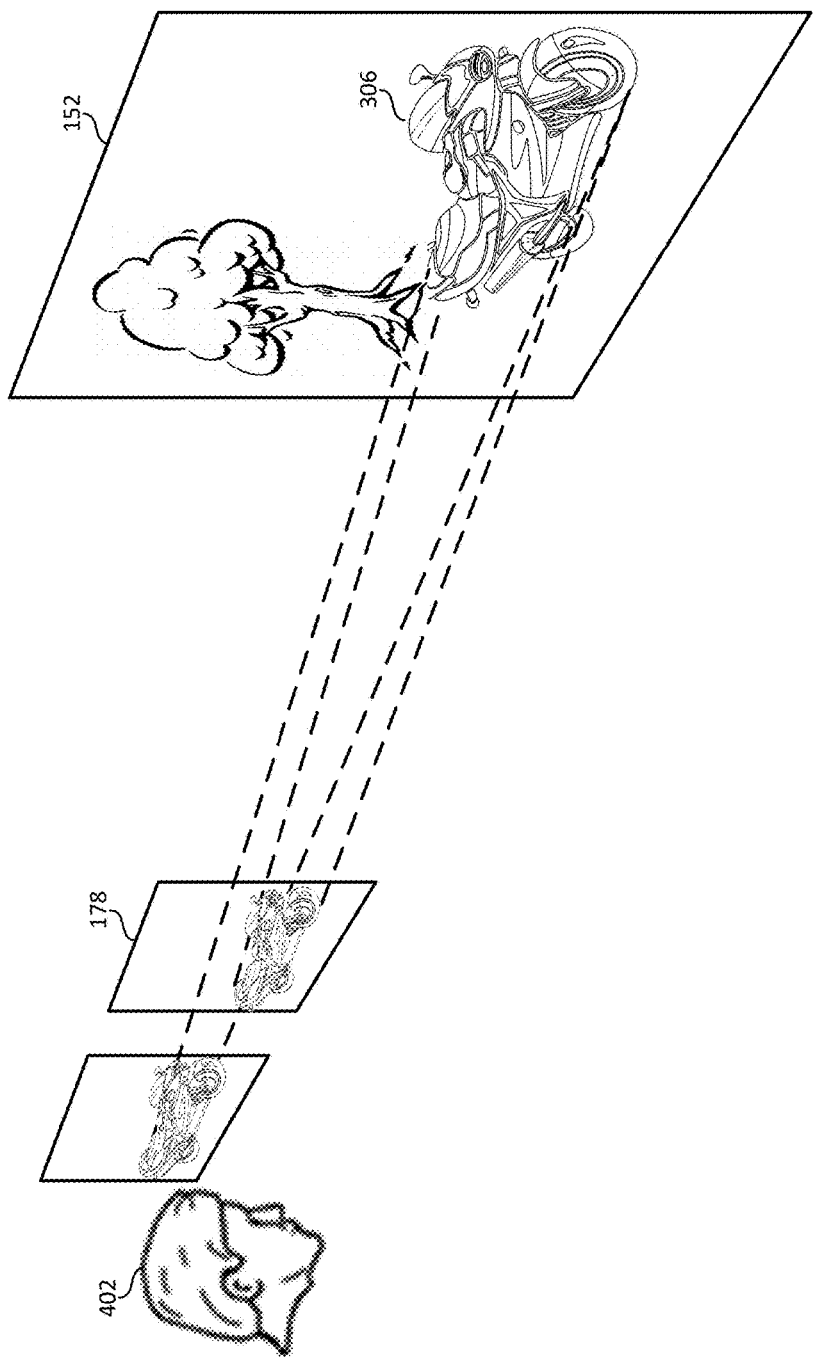
FIG. 4B illustrates the scene of FIG. 4A at a new perspective, according to some embodiments.

FIG. 4B illustrates the scene of FIG. 4A at a new perspective, according to some embodiments. As described above, some of the three-dimensional elements may need to be skewed before being rendered in order to have the image displayed on the mobile device 178 match the skew of the images displayed on the screen 152. In FIG. 4B, the user 402 is positioned to the extreme left side of the screen 152 (e.g., location 122 of FIG. 1A). Because the viewer 402 will view the screen 152 from an angle, 2-D images displayed on the screen 152 will be skewed compared to how the same images would be perceived when viewing the screen 152 from the center of the environment 100. The angle at which the viewer 402 deviates from the 90° normal of the screen 152 can be used as a factor in a skew angle to deform the 3-D object of the motorcycle 306 before his rendered for display on the mobile device 178, or to stretch/compress prerendered 2-D images for display on the mobile device 178. By doing so, skewed images of the motorcycle 306 displayed on the mobile device 178 in FIG. 4B can match the skew of the screen 152, such that the motorcycle 306 will appear to be a normal part of the scene on the screen 152.

Figure 5A:
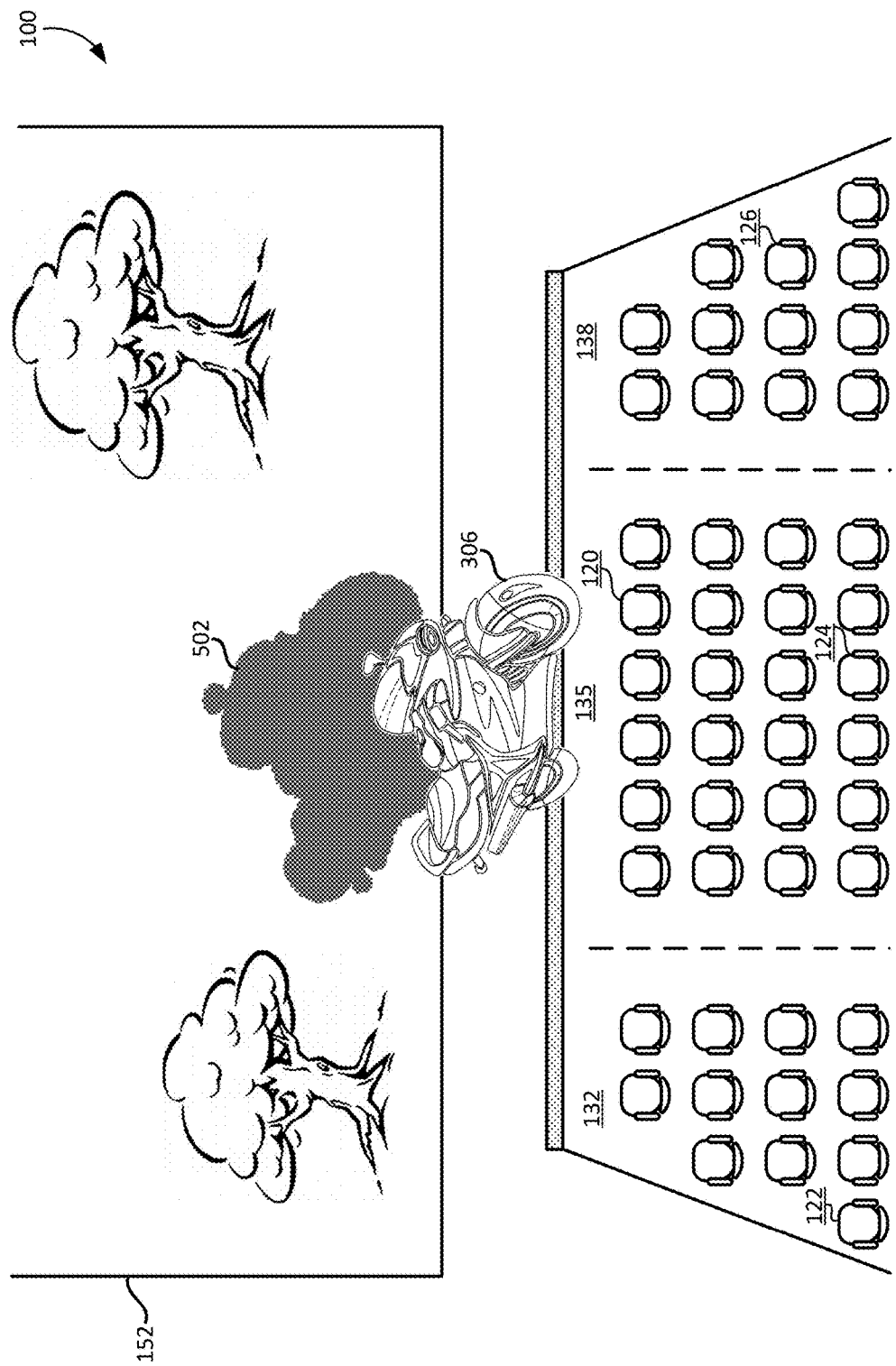
FIG. 5A illustrates an image displayed on the mobile device that is attached to the screen and consistent across viewing locations, according to some embodiments.

FIG. 5A illustrates an image displayed on the mobile device that is attached to the screen and consistent across viewing locations, according to some embodiments. In this embodiment, the motorcycle 306 is "attached" to the screen 152. In other words, the motorcycle 306 is close enough to the screen 152 that the position of the motorcycle 306 in the 3-D virtual environment from which the mobile device images are rendered does not change. This embodiment gives the appearance of a 3-D projection coming out of the screen to the viewer, but does not change location based on the location of the viewer. To illustrate, a mobile device on a viewer sitting in location 124 directly in front of the screen 152 will see the motorcycle 306 as shown in FIG. 5A. Although appearing to pop out from the screen 152, the projection 502 of the motorcycle 306 will be directly behind the motorcycle 306 on the screen 152.

Figure 5B:
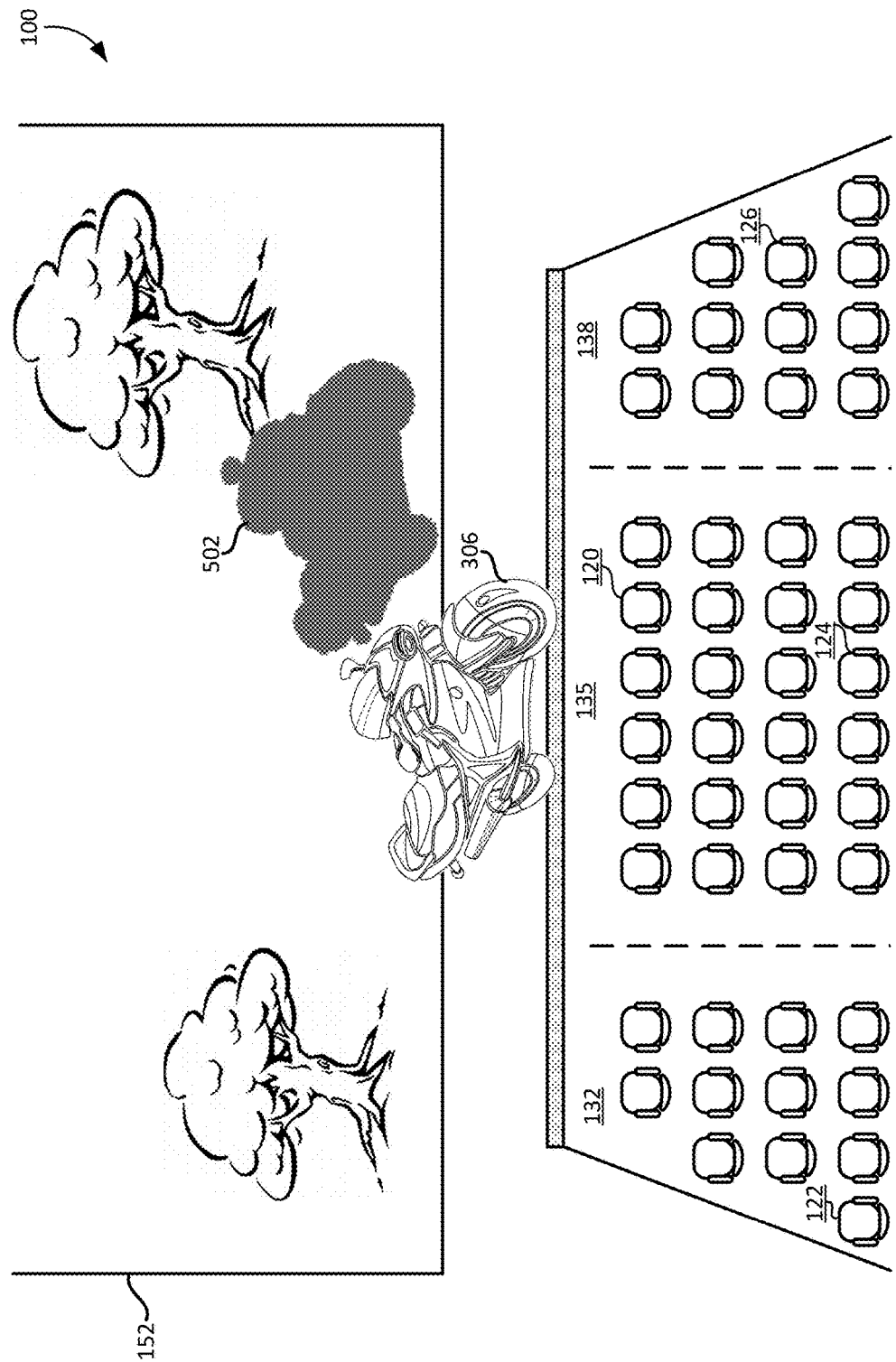
FIG. 5B illustrates an image displayed on the mobile device when viewed from a position to the left of the screen, according to some embodiments.

FIG. 5B illustrates an image displayed on the mobile device when viewed from a position to the left of the screen 152, according to some embodiments. In FIG. 5B, the motorcycle 306 is located at the same position in the 3-D virtual scene from which the mobile device content is rendered. Therefore, the motorcycle 306 will appear to a viewer location 122 to be in the same real-world position as it would to the viewer in location 124. However, the projection 502 of the motorcycle 306 onto the screen 152 would be shifted to the right. These embodiments allow viewers to all see the same image at the same location in real-world coordinates. The difference in the location of the projection 502 on the screen 152 will be minimized because the motorcycle 306 is still relatively close to the screen 152 in real-world coordinates.

FIG. 6A illustrates an image displayed on the mobile device that is attached to a screen location with a consistent screen projection, according to some embodiments. In this example, the viewer in location 122 would see the real-world position of the image of the motorcycle 306 shifted to the left such that the projection 502 of the motorcycle 306 remains in the center of the screen 152. In contrast, FIG. 6B illustrates the image displayed on the mobile device when viewed from a rightward viewing location, according to some embodiments. Specifically, when viewed from location 126, the image displayed on the mobile device will show the motorcycle 306 shifted in real-world coordinates to the right. However, the projection 502 of the motorcycle 306 will remain in the same location as the projection 502 in FIG. 6A. In other words, the projection 502 of the motorcycle 306 on the screen 152 remains consistent regardless of viewing location.

In order for these embodiments to be realized, the location of the mobile device can be determined by the system and used to shift the positioning of the 3-D elements in the virtual 3-D scene. For example, the 3-D model of the motorcycle 306 in the 3-D scene would be moved to the left such that the projection through the virtual camera (i.e., the viewer location) and the projection 502 on the image pane of the movie lines up with the 3-D model of the motorcycle 306. The projection 502 on the image pane of the screen 152 will be consistent across all viewing locations. However, the position of the 3-D model of the motorcycle 306 to be rendered will change based on viewing location.

In some embodiments, each individual mobile device may have an individually rendered image displayed for the prospective viewers. In some embodiments, the environment 100 can be subdivided into spatial zones, 132, 135, 138, with each viewer in that zone receiving the same image for display on a mobile device. Although the exact positioning of viewers with an the spatial zones 132, 135, 138 may differ, the viewing experience may be substantially the same. This may reduce the bandwidth and processing needed for generating and/or transmitting real-time scene images to viewers. Although not shown explicitly, the spatial zones 132, 135, 138 can also be formed to extend radially out from a center point of the screen 152. The same images may then be used for each of the spatial zones, with the images being stretched/skewed as described elsewhere in this disclosure.

Figure 7A:
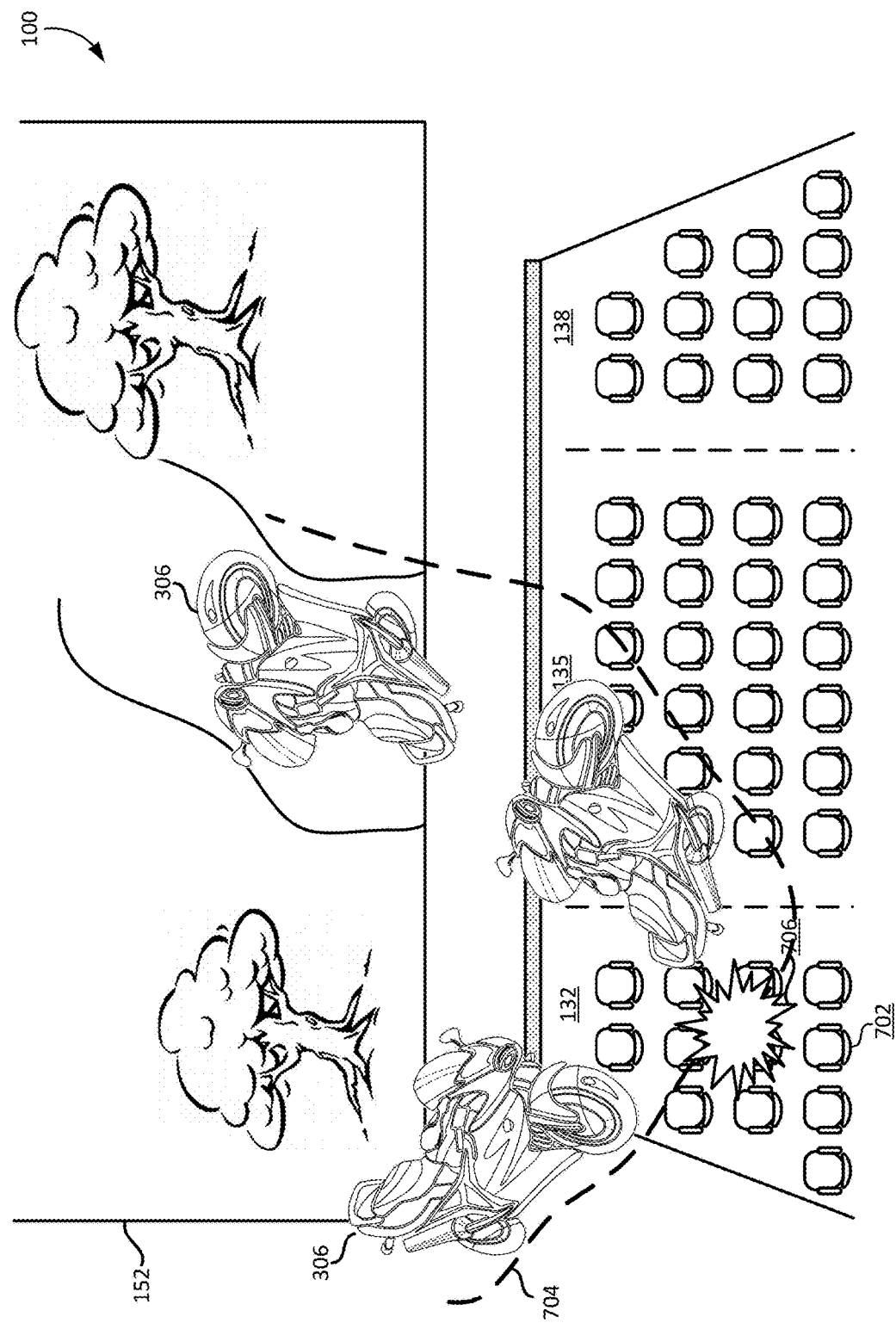
FIG. 7A illustrates an example of how a motion path traveled by an object projected on the mobile device can change according to viewing location, according to some embodiments.

FIG. 7A illustrates an example of how a motion path traveled by an object projected on the mobile device can change according to viewing location, according to some embodiments. In some motion sequences, an object may begin as being attached to the screen, then break away from the screen and move out into the audience. This can provide a 3-D effect that is not tied to the screen 152 or limited by the screen size. For example he viewer could look to the side and see a character from the movie walking down the aisle of the movie theater outside of the background of the screen 152. The motorcycle 306 could drive out over the audience and back onto the screen.

As described above, there are at least two different modes for generating images to be displayed on the mobile device. First, the object can be tied to a location on the movie screen such that the position of the object in the movie theater (i.e., real-world coordinates) does not change based on viewing location. Second, the object can be tied to individual viewing locations, where the position and/or motion path of the object is altered to generate a motion sequence that is the same from the perspective of the viewer, but different from the perspective of the screen 152.

In the example of FIG. 7A, the motorcycle 306 can follow a motion path 704 that pulls away from the screen, goes out into the audience, performs a stunt 706, and drives back onto the screen 152. The motion path 704 begins at the far left side of the screen 152. As the motorcycle 306 enters the scene from the left, it can be attached to the screen as described above. As the motorcycle 306 follows the motion path 704 out into the audience, the motorcycle 306 can break away from the screen. In order to generate the motion path 704, a separate rendering operation and/or compositing operation may be performed for each mobile device. The motion path 704 can be dynamically adjusted such that the stunt 706 can be performed right in front of each individual viewer. For example, a viewer in location 702 would have the motion path 704 generated such that the motorcycle 306 performed the stunt 706 directly in front of location 702. For example, the stunt may include a "fishtail" turn performed by the motorcycle 306.

In order to generate an individualized motion path in the 3-D virtual scene, a start and end point can be defined as the points where the motorcycle 306 detaches from the screen and reattaches to the screen (e.g., at the far left and far right of the motion path 704. A third point can be set for each individual mobile device such that the stunt occurs directly in front of the location of the mobile device. A general shape of the motion path can be defined for all viewing locations, and the general shape can be fitted using a curve fitting algorithm to the three points defined for each viewing location.

Figure 7B:
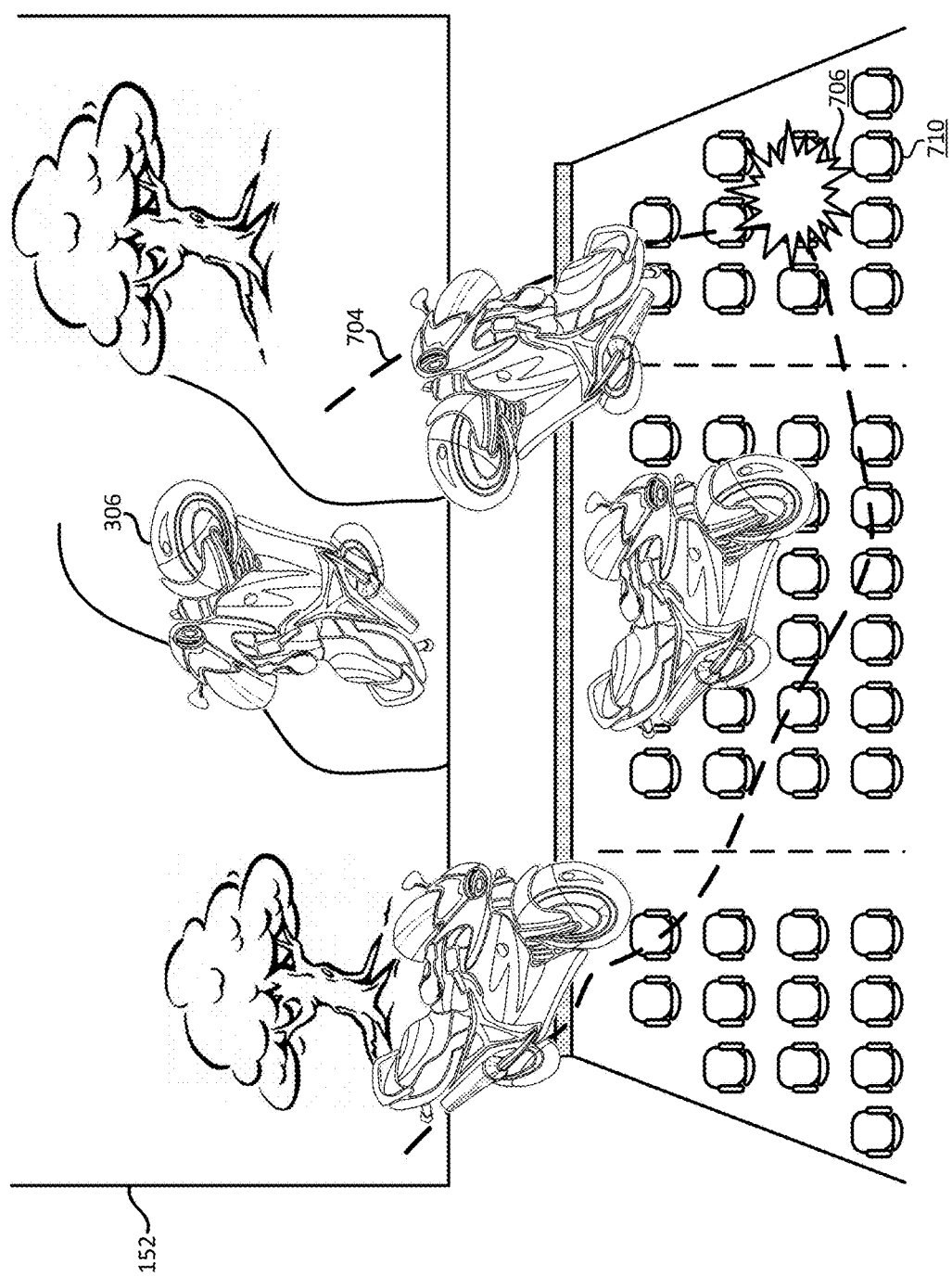
FIG. 7B illustrates a motion path that has been altered according to a different viewing location, according to some embodiments.

FIG. 7B illustrates a motion path that has been altered according to a different viewing location, according to some embodiments. Notice that the general shape of the motion path 704 in FIG. 7B is the same as the general shape of the motion path 704 in FIG. 7A. The start and end points of the motion path 704 are approximately the same, however, the position of the stunt 706 has changed to be in front of location 710. The final shape of the motion path 704 has been fitted to these three points in FIG. 7B. To generate the sequence of 2-D frames to be displayed on the mobile device, the 3-D model of the motorcycle 306 can be moved along the individualized motion paths for each mobile device in a different location. This rendering operation can be performed in real time.

Figure 8:
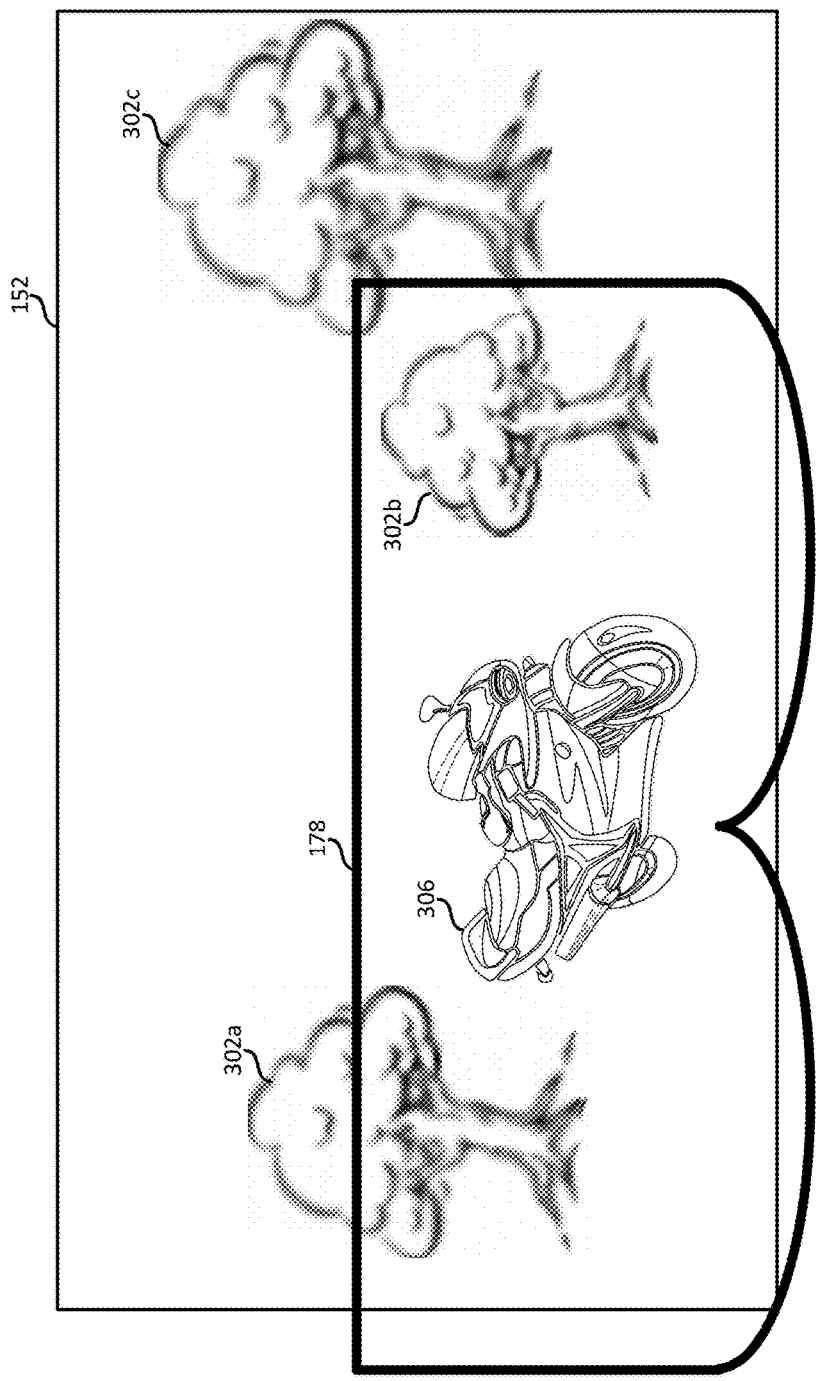
FIG. 8 illustrates a blur effect added to background landscape elements displayed on the screen, according to some embodiments.

In order to direct a viewer's attention to an object displayed on the mobile device 178 as opposed to objects displayed on the screen 152, a blur effect can be added to objects on the screen 152 in contrast to a sharpened image that can be displayed on the mobile device 178. FIG. 8 illustrates a blur effect added to background landscape elements displayed on the screen 152, according to some embodiments. As shown, the motorcycle 306 remains in focus in order to draw the viewer's attention to the motorcycle 306. In contrast, the other landscape elements displayed on screen 152 have been given a blur effect, including the trees 302. In some embodiments, the opposite effect may be executed, where objects such as the motorcycle 306 displayed on the mobile device 178 have a blur effect applied, while the landscape elements displayed on screen 152 remain in focus.

Figure 9A:
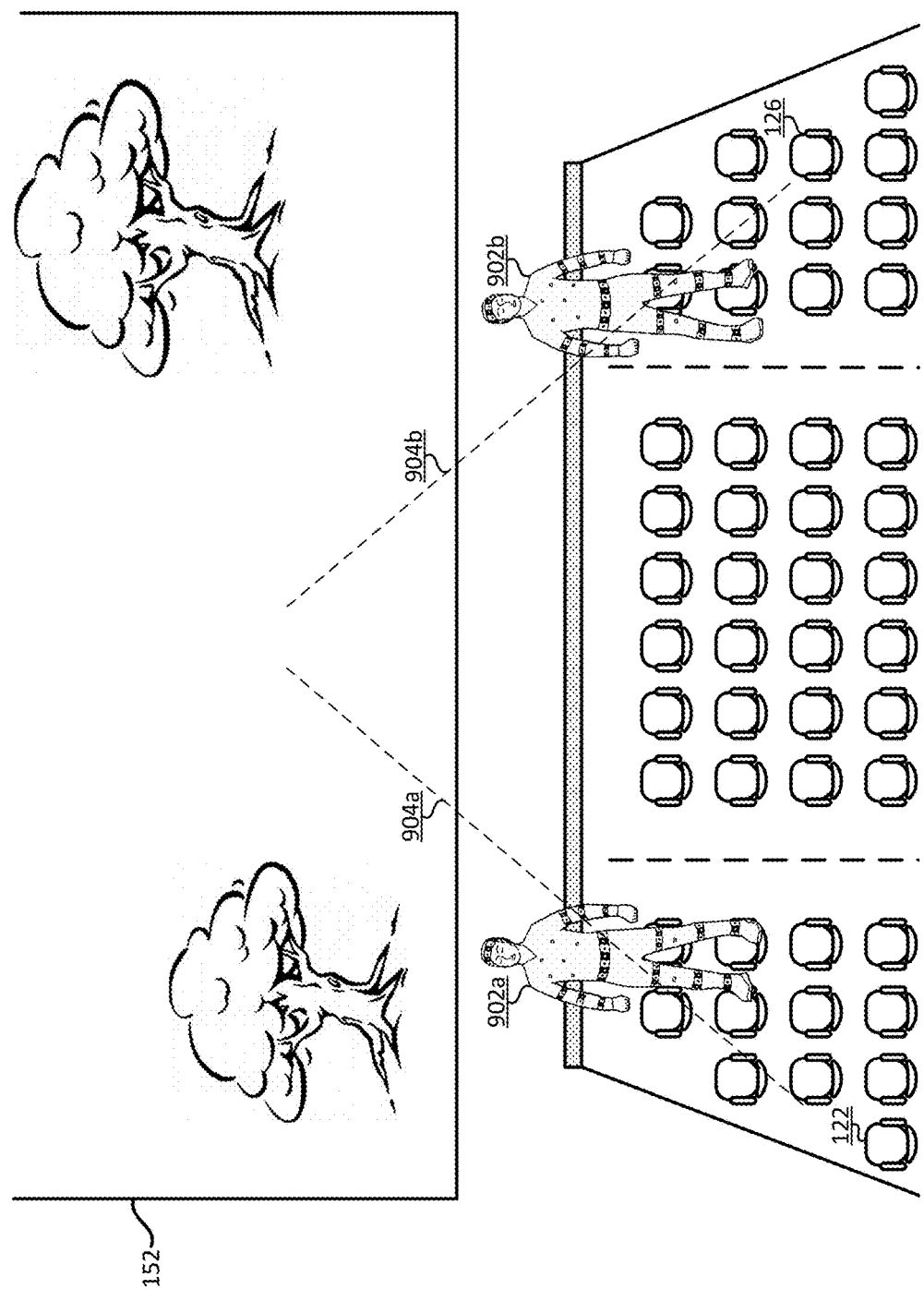
FIG. 9A illustrates individualized motion paths for interactive content at two different locations, according to some embodiments.

FIG. 9A illustrates individualized motion paths for interactive content at two different locations, according to some embodiments. In some cases, the content displayed on the mobile devices can be individualized for each viewer, as described above. Additionally, the timing and selection of content may also be individualized for each mobile device. For example, the content displayed on screen 152 can pause or loop while an interactive portion of content is played out over the mobile devices. The timing of the appearance of certain content objects can be individualized, as well as the responses generated by the content. For example, FIG. 9A illustrates a character 902 that detaches from the screen 152 and walks out into the audience. An individualized motion path 904 can be generated for each individual mobile device such that the character 902 walks to a location directly in front of each viewer. The character 902 can then express dialogue and request a response from the viewer (e.g., ask a question). The user can then provide an input via the mobile device selecting one or more options presented by the character 902. Based on the input, the behavior of the character 910 can change. Specifically, each input can be associated with a particular animated sequence and/or set of 3-D character models in the corresponding virtual scene. Based on the input, these characters and/or motion paths can be loaded into the scene and rendered in real time for viewing on a mobile device. This provides the user with a "choose your own adventure" style of enjoying a media experience.

Figure 9B:
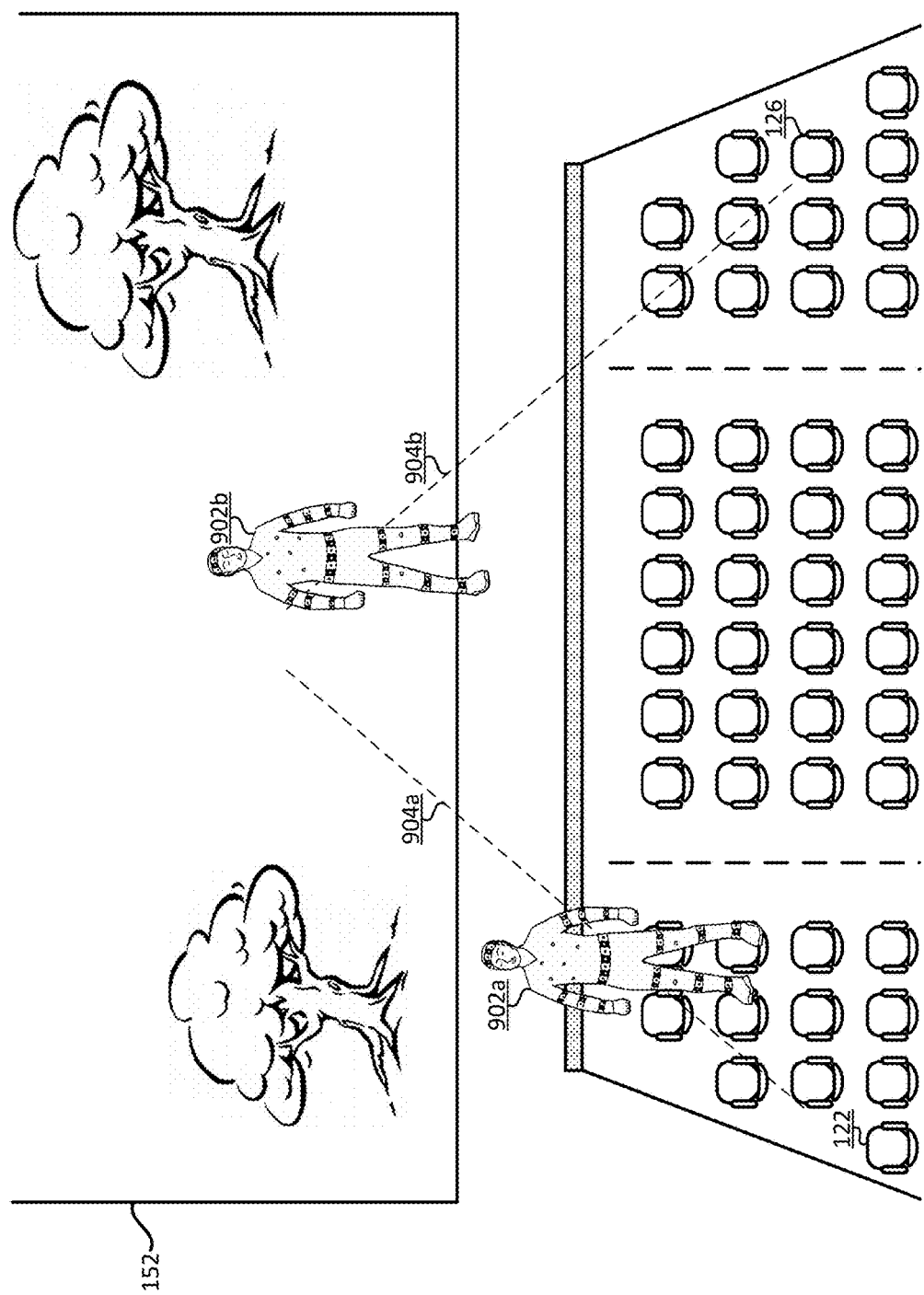
FIG. 9B illustrates how the timing of various character interactions with the audience can be individualized, according to some embodiments.

FIG. 9B illustrates how the timing of various character interactions with the audience can be individualized, according to some embodiments. The motion of character 902*a* and character 902*b* may be triggered by an input received from mobile devices of viewers at location 122 and location 126, respectively. The input may have been received from the viewer at location 122 a few seconds before input was received from the viewer at location 126. Consequently, character 902*a* may walk out of the screen on motion path 904*a* towards location 122 before character 902*b* walks out of the screen on motion path 904*b* towards location 126. Timers may also be included in the mobile content processor described above to automatically trigger the motion of character 902*b* in cases where an input is not received within a threshold time limit.

Figure 10B:
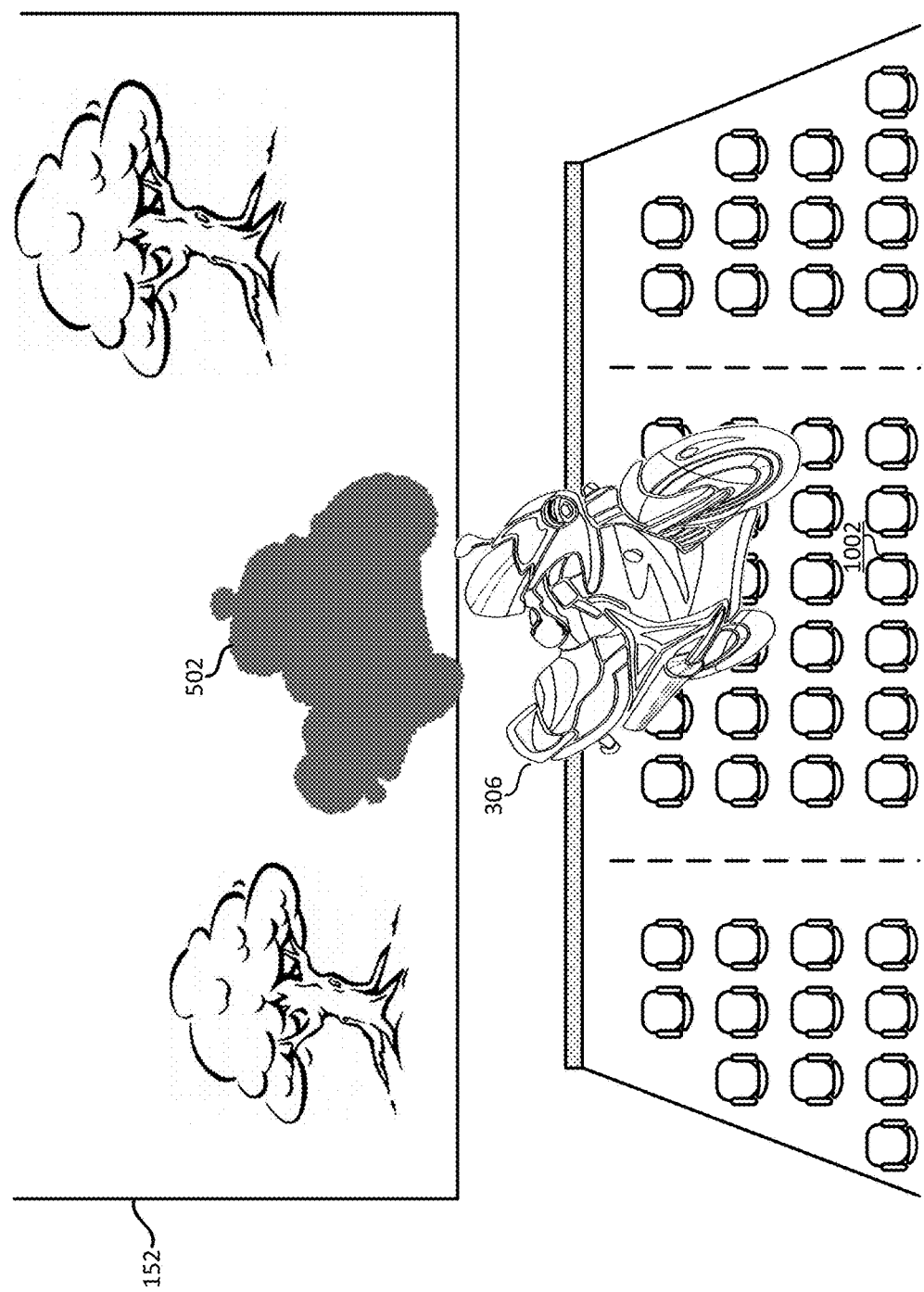
FIG. 10B illustrates an effect for viewers that are far from the screen, according to some embodiments.

FIG. 10A illustrates how content displayed on the mobile device can be compressed in depth based on a distance to the screen 152, according to some embodiments. If the viewer is sitting very close to the screen 152, such as an location 120, the image on the screen may be heavily "keystoned," or distorted in a trapezoidal fashion from bottom to top. In other words, when looking up towards the screen, the image will be larger at the top and on the bottom because the user is so close to the screen. To compensate for this effect, when the motorcycle 306 is attached to the screen 152 and meant to blend in with the landscape elements of the scene, the motorcycle 306 should also have a keystone effect applied. As illustrated by FIG. 10A, the 3-D model of the motorcycle 306 can be compressed to mimic this effect on the screen. Similarly, FIG. 10B illustrates a similar effect for viewers that are farther from the screen. As users viewers move away from the screen, the Z-depth (distance from the viewer) of objects displayed on the mobile device need not be compressed as they would need to be if they were closer to the screen. Because the relative distance from the screen changes, the Z depth of the image on the mobile device can also change such that the distances are proportional for any distance from the screen 152. For example, a viewer in location 1002 would see an uncompressed version of the motorcycle 306 that has been elongated, with the projection 502 of the motorcycle in the same location as shown in FIG. 10A.

Figure 11A:
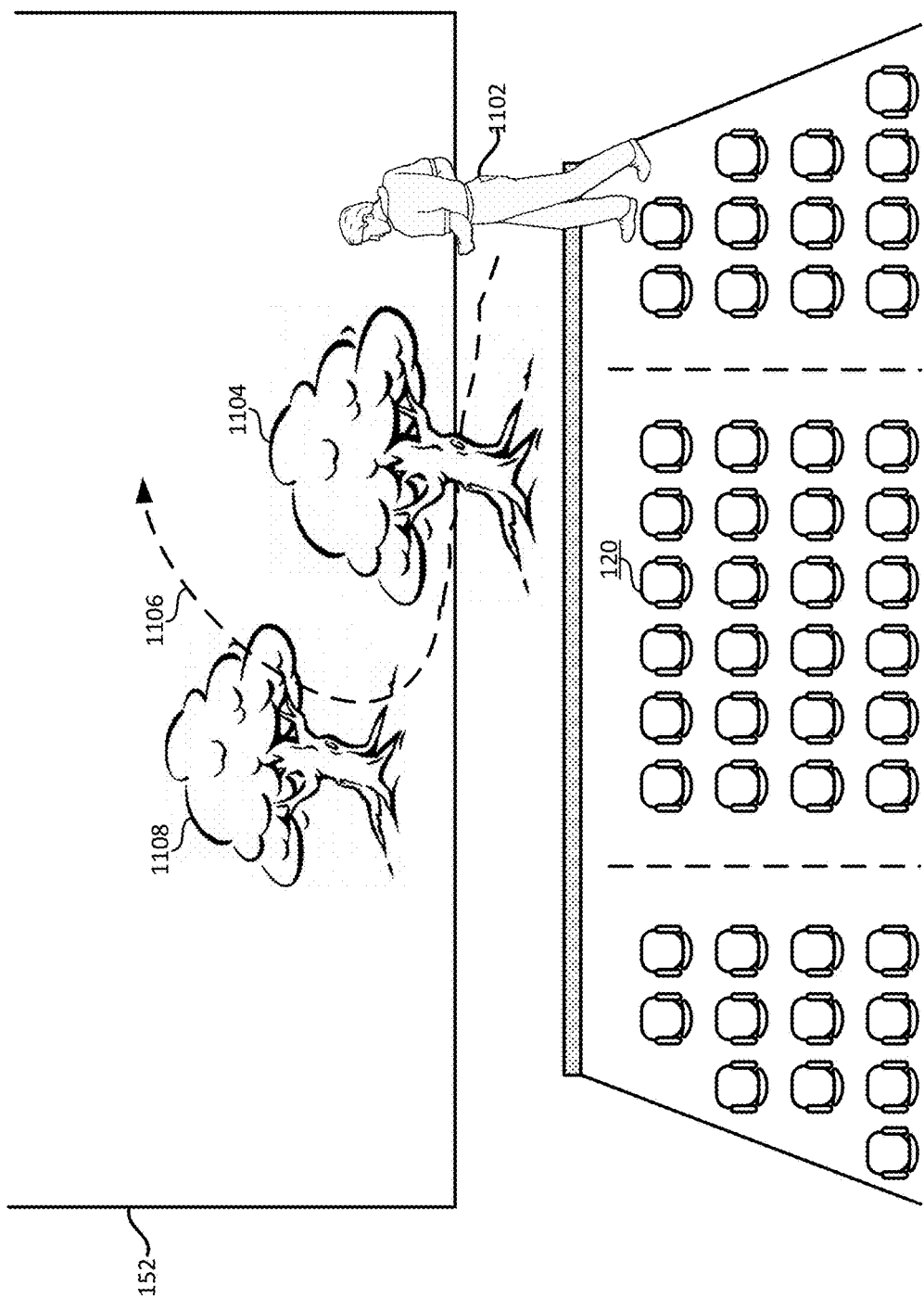
FIG. 11A illustrates how a dynamic compositing operation can be used to have objects displayed by the mobile device interact with objects displayed on the screen, according to some embodiments.

FIG. 11A illustrates how a dynamic compositing operation can be used to have objects displayed by the mobile device interact with objects displayed on the screen, according to some embodiments. In this example, a character 1102 can have a defined motion path 1106 that leads behind a first tree 1104 and in front of a second tree 1108. The character 1102 and the first tree 1104 may be displayed by the mobile device, and thus appear to "pop out" of the screen 152 and enter the area of the audience in the theater. The second tree 1108 can be displayed by the screen 152. The view illustrated by FIG. 11A will be shown from the perspective of a viewer sitting in location 120.

In order to provide dynamic motion paths that will be viewed differently based on location in the viewing environment, the real-time compositing operation and/or rendering operation described in FIG. 1B can render, composite, and/or display the character 1102 in relation to the first tree 1104 based on viewing location. In some embodiments, a 3-D virtual scene that includes a digital model of the character 1102 and a digital model of the first tree 1104 can be rendered from a position in 3-D-scene coordinates corresponding to the location 120 of the viewer.

Figure 11B:
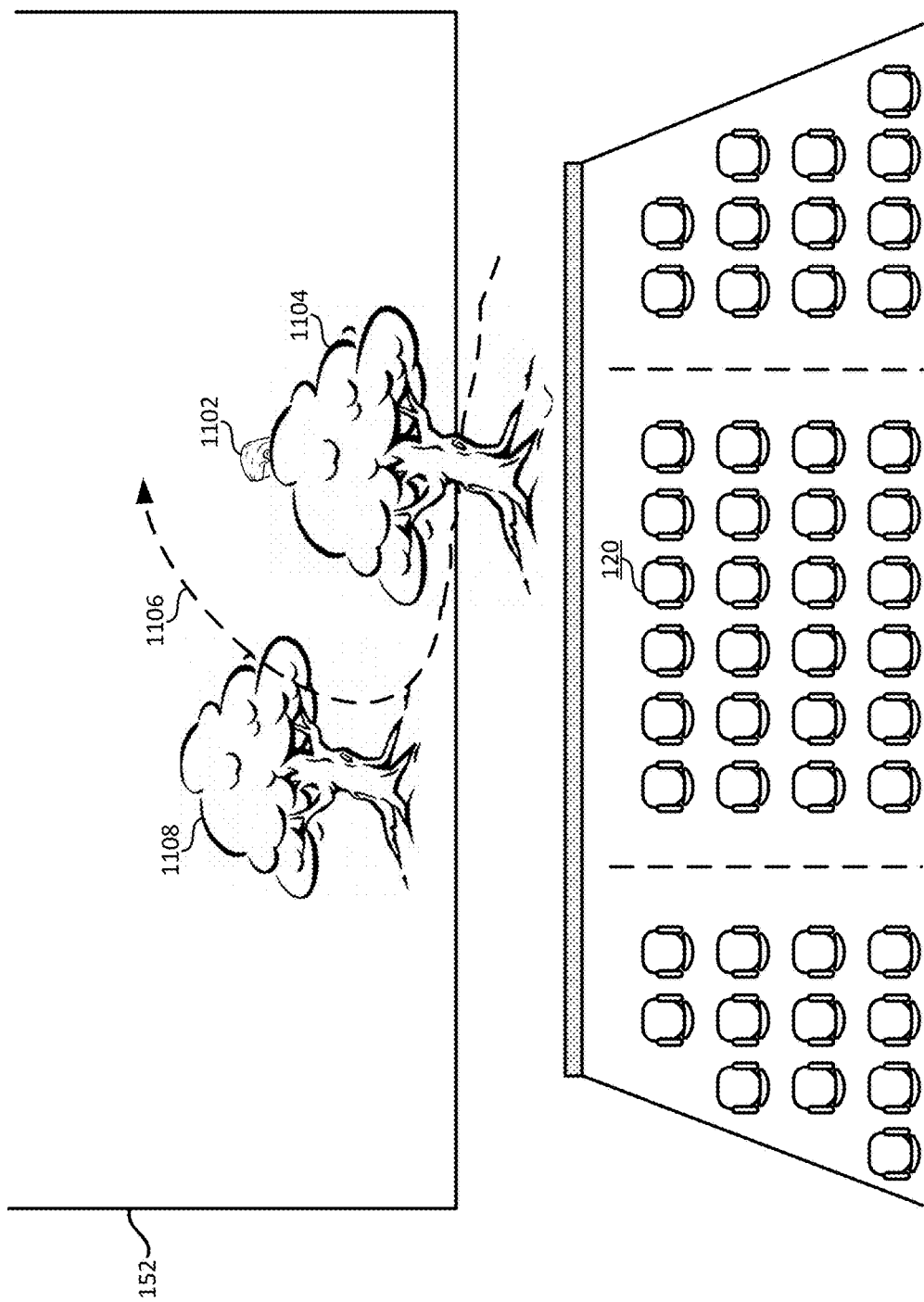
FIG. 11B illustrates how the character passes behind the first tree while moving along the motion path, according to some embodiments.

FIG. 11B illustrates how the character 1102 passes behind the first tree 1104 while moving along the motion path 1106, according to some embodiments. At this stage, the character 1102 would be behind the first tree 1104 from the perspective of a viewer in location 120. Rendering this scene in real-time from the perspective of the viewer in location 120 would obscure most of the character 1102 from view behind the first tree 1104.

In contrast, FIG. 11C illustrates how the character is viewed differently at the same point in time from a different location in the viewing environment, according to some embodiments. From the perspective of a viewer in location 1112, the character 1102 has already passed out from behind the first three 1104. This difference may occur for multiple reasons. In some cases, the perspective of the viewer in location 1112 may be such that the character 1102 is not obscured by the first tree 1104. In some cases, different timing triggers may have been activated as described in relation to FIGS. 9A-9B such that the character 1102 has already come out from behind the first tree 1104 while following the motion path 1106 according to viewer at location 1112, but the character 1102 has not yet come out from behind the first tree 1104 according to viewer at location 120.

The character 1102 is shown to be passing in front of the second tree 1108 according to the motion path 1106. In some embodiments, the character 1102 could instead pass behind the second tree 1108, even though the second tree 1108 is displayed by the screen 152 while the character 1102 is displayed by the mobile device. To show the character 1102 in front of the second tree 1108, the entire character 1102 can be rendered for display on the mobile device. Because the mobile device display will overlay the display on the screen 152, the character 1102 will appear to be in front of the second tree 1108. When the character 1102 is behind the second tree 1108, the 3-D scene rendered for display on the mobile device can include a model of the second tree 1108. During the rendering and compositing of the image, portions of the character 1102 will be occluded by the second tree 1108. However, the second tree 1108 can be removed from the rendered images displayed on the mobile device. Thus, as the character 1102 appears to walk back into the screen 152, portions of the character 1102 can be cut out of the display of the mobile device such that the character 1102 appears to be walking behind the second tree 1108.

Figure 12:
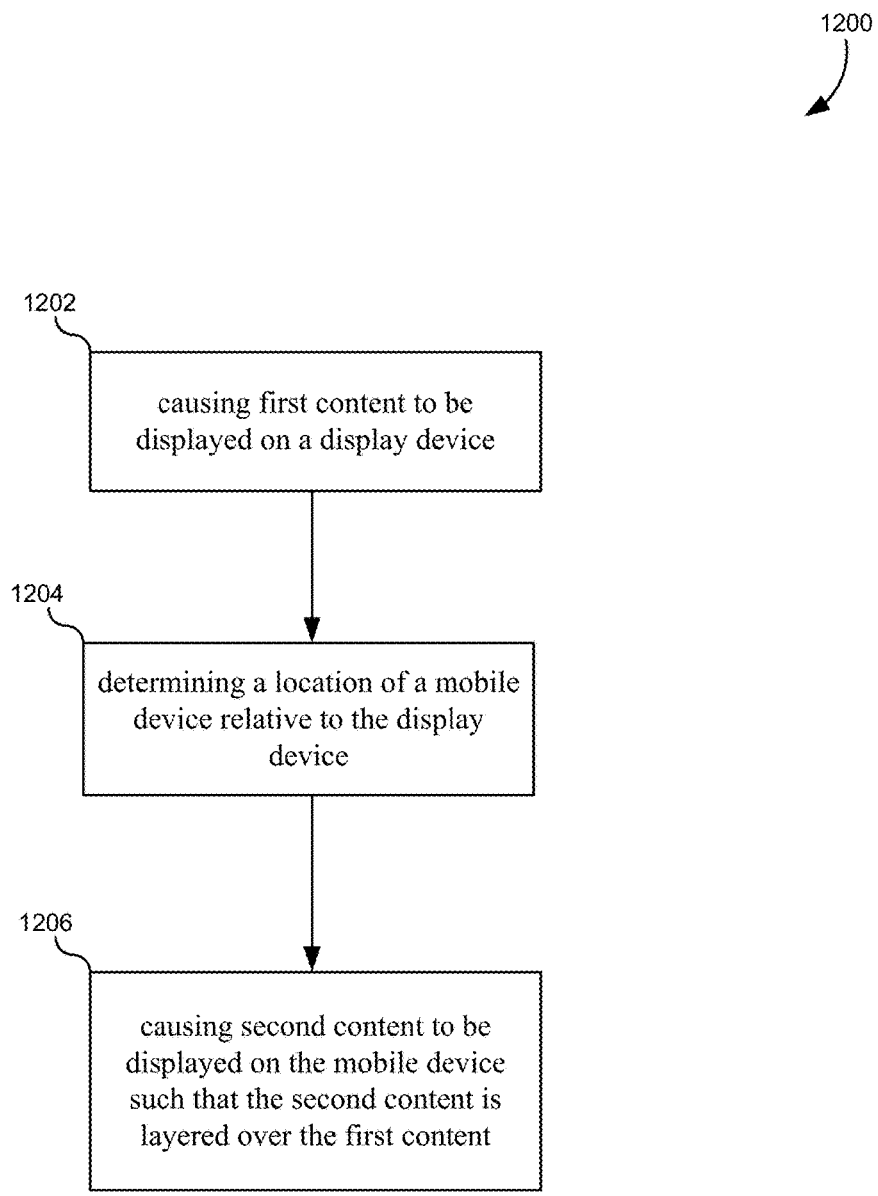
FIG. 12 illustrates a flowchart of a computer-implemented method for displaying layered content across multiple devices, according to some embodiments.

FIG. 12 illustrates a flowchart of a computer-implemented method for displaying layered content across multiple devices, according to some embodiments. The method may include causing first content to be displayed on a first display device (1202). The first display device may comprise a theater screen in a movie theater. The method may further include determining a location of a mobile device relative to the display device (1204). Additionally, an orientation of the mobile device may be determined relative to the display device. The mobile device may comprise a pair of AR glasses worn by a viewer. The mobile device may be positioned such that the first content is visible to a viewer of the mobile device. The method may further include causing second content to be displayed on the mobile device such that the second content is layered over the first content as viewed by a viewer of the mobile device (1206). In some embodiments, the second content may be generated and/or altered based on a determined dimension of the display device.

In some embodiments, the mobile device may be associated with one or more input buttons that allows the user to turn off or remove the additional content from the first mobile device's display. In this way, a user can choose whether to continue viewing the additional content layered over the item of content or to simply view just the item of content alone. In some embodiments, the additional content may be customized for the individual user. For example, if the user's favorite color was previously input as being blue, then the flying saucers may be presented in a blue color. If the user has a preference for a particular model of a starship, the first mobile device may present the preferred starship rather than the flying saucer. In some embodiments, the user may have previously input the preferences directly into the first mobile device. In other embodiments, the first mobile device may download the preference information from a customer account of the user after receiving explicit authorization from the user to access the customer account.

In one embodiment, the mobile device may use a built-in camera or some other sensor (depth sensor, GPS, accelerometer, wifi, etc.) to determine (e.g., automatically measure) the size of, distance from, format, and/or other attributes of the display system. Based on this determination, the mobile device may automatically scale the additional content that it displays. In this way, the size of the additional content can be made consistent with the size of the content being presented via the display system. For example, if a user is sitting relatively far from the screen 152 of the display system, the mobile device may automatically determine that objects it presents should be made accordingly smaller. As another example, if the mobile device is used with a display system having a screen of 20 feet across and a user of the mobile device is sitting 5 feet away from the screen, then the mobile device may present additional content with a scale based on the aforementioned screen size and user distance from the screen 152. If the mobile device is thereafter used with another display system having a screen of 10 feet across and the user is sitting 10 feet away from the screen, then the first mobile device may present additional content at a different scale based on the aforementioned subsequent screen size and user distance from the screen.

In another embodiment, the first mobile device may automatically determine the position of the user relative to the display system based on a built-in camera or some other sensor (depth sensor, GPS, accelerometer, Wi-Fi, etc.). Based on the position of the user, the first mobile device may place the additional content at different locations on its display. For example, if a user is sitting at the extreme right side of a movie theater (the display system), the first mobile device may place its additional content based on the user's location.

Content Generation System

Some embodiments of the present invention are directed at a system, method, and techniques for generating content (e.g., a feature film). In one embodiment, a representative system includes a rendering system, a first mobile device, a second mobile device, a content creation system, a motion capture system, and a third mobile device. It should be appreciated that there may be additional components to the representative system. Additionally, certain components (e.g., the motion capture system) may not necessarily be required by the system. Components may also be combined. In one embodiment, each of the components in the system may be connected over a suitable connection. In one embodiment, the components may be connected over the Internet or a local Intranet.

The rendering system may include one or more computers capable of rendering a 3D virtual environment in real-time and/or at interactive frame rates. The first mobile device may be any suitable mobile device, such as a tablet, smartphone, virtual reality/augmented reality glasses/goggles, watch, laptop, etc. The second mobile device, likewise, can be any suitable device, such as a tablet, smartphone, virtual reality/augmented reality glasses/goggles, watch, laptop, etc. The third mobile device may also be any suitable mobile device, such as a tablet, smartphone, virtual reality/augmented reality glasses/goggles, watch, laptop, etc. The content creation system may include one or more computers capable of editing and/or generating highly detailed, high fidelity and/or film production grade content. The motion capture system may be a system that includes one or more sensors usable for determining the performance of a person (e.g., an actor) in a performance space. The sensors may determine the performance of a person using one or more physical markers, wireless transmitters, actor-related depth information, actor-related GPS information, etc.

In one embodiment, the content creation system may be used to create and/or generate a 3D virtual environment. The 3D virtual environment may be a virtual set in which one or more scenes of an item of content (e.g., a movie) will take place. For example, the 3D virtual environment may be a virtual desert. As another example, the 3D virtual environment may be a digital replica of the city of San Francisco. The 3D virtual environment may also include one or more objects such as buildings, rock formations, clouds, the sun, the moon, bridges, water, foliage, vehicles, animals, tools, characters, and/or the like.

In one embodiment, the 3D virtual environment is loaded into the rendering system such that the rendering system renders image frames of the 3D virtual environment from the perspective of a virtual camera and transmits the image frames to the first mobile device. The first mobile device may, in turn, present the image frames generated and transmitted from the rendering system over a built in display of the first mobile device. The image frames may be presented to a user at or above a particular frame rate (e.g., 15 frames per second, 30 frames per second, 60 frames per second, 120 frames per second, etc.).

In one aspect, the first mobile device may be a tablet or similar device. A user of the first mobile device may interact with the first mobile device to move a virtual camera around the 3D virtual environment. In one aspect, the virtual camera may be controlled by using one or more gestures input directly to a touchscreen of the first mobile device. For example, the user may input a swipe gesture with a single finger to pan or tilt the virtual camera according to the direction of the swipe. The user may furthermore input a swipe gesture with two fingers to move the camera according to the direction of the swipe. The user may moreover input a pinch gesture to "dolly" the virtual camera. In another aspect, the virtual camera may be controlled by physically changing the position of the first mobile device and/or changing the orientation of the first mobile device. For example, a user may move forward 2 feet from his or her current location while holding the first mobile device. The first mobile device may detect such movement based one or more sensors of the first mobile device (e.g., an accelerometer, gyroscope, GPS, depth sensor, camera, wireless radio, etc.). The information regarding the detected movement may be transmitted to the rendering system which may in response shift the virtual camera and transmit image frames to the first mobile device with the virtual camera having moved forward 2 virtual feet in the virtual environment.

In one aspect, a user interface displayed on the first mobile device may include indicators (e.g. text, icons or buttons) regarding various settings for the virtual camera. For example, the user interface may display the current height, location, and orientation of the virtual camera. The user interface may also display information regarding the focus, crop-factor/aspect ratio, f-stop, and/or lens type of the virtual camera. In some embodiments, the user may interact with the indicators and/or the first mobile device in order to change various settings associated with the virtual camera. For example, the indicators may enable the user to change the focus, crop-factor, f-stop, and/or lens type of the virtual camera. Illustratively, a user may select an icon to change the lens of the virtual camera from 50 mm to 120 mm. As such, the image frames displayed to the user may exhibit the features of a 120 mm lens, including any lens distortion effects, zoom, etc. As another example, the user may select a focus indicator. Upon selecting the focus indicator, the user may select various objects or parts of the 3D virtual environment by contacting his or her finger to the location of the object or part as displayed on the screen of the first mobile device. The position information for the user's finger may be transmitted by the first mobile device to the rendering system. The rendering system, in turn, may generate or "shoot" one or more virtual, invisible rays from the current position of the virtual camera into the 3D virtual environment based on the position information. Upon detecting an intersection of the one or more rays with a virtual object or part of the 3D virtual environment, the rendering system determines that the intersecting object and/or part should be placed in focus. Accordingly, the 3D virtual environment is rendered with the object/part placed in focus. Furthermore, depending on the virtual distance of other objects in the 3D virtual environment relative to the in-focus object (and the selected lens type/f-stop), the rendering system applies varying degrees of focus to the other objects. For example, an object far away from the selected in-focus object in the 3D virtual environment may be rendered with a slight blur. In some instances, the amount of blur applied to an object may increase as the object is further away from the in-focus object in the 3D virtual environment.

The user may interact with the displayed indicators in any suitable manner in order to perform a change to the settings of the virtual camera. In some embodiments, the user may first select the indicator associated with the setting to be changed by tapping on the indicator. Thereafter, the user may perform one or more gestures to change the settings associated with the selected indicator. For example, after selecting the f-stop indicator, the user may increase the f-stop by performing a swipe gesture to the right. The user may decrease the f-stop by performing a swipe gesture to left. Additionally, after selecting the lens type indicator, the user may select lens with progressively higher zoom by performing swipe gestures to the right. The user may select lens with progressively less zoom (or wider angle) by performing swipe gestures to the left.

In some embodiments, rather than specifically selecting an indicator, the user may use different gestures to determine which lens setting/parameter to change. For example, swiping horizontally with a three fingers on the touchscreen of the first mobile device may change the f-stop. Swiping horizontally on the screen with four fingers may cause a change in the lens type. Double tapping on the location of an object on the touchscreen of the first mobile device may focus the virtual camera on the object.

In another aspect, the user interface of the first mobile device may enable the user to select a particular "crop factor" or "aspect ratio" to be applied to the image frames shown to the user to simulate different movie or cinematic formats. In one embodiment, the cropped out area may be completely opaque. In other embodiments, the cropped out area may be semi-translucent such that the portions of the 3D virtual environment in the cropped out area can be partially seen. In certain embodiments, the degree of transparency of the cropped out area may be changed by the user. For example, the user may indicate a 25%, 50%, or 75% degree of transparency. In this way, a director can understand what parts of the 3D virtual environment may be left out in a finally completed item of content.

In one aspect, as the user is moving the virtual camera around the 3D virtual environment, he or she may indicate to the first mobile device to save a "bookmark" of the virtual camera's current location, orientation, and any associated parameters. In effect, the bookmark saves a shot taken from the virtual camera using specific camera parameters. In some embodiments, the user interface provided by the first mobile device may additionally enable the user to annotate or include notes for the bookmark. For example, the user can provide an overall annotation or annotations for the bookmark. As another example, the user can select different areas of the bookmarked shot and place separate annotations at those areas. In some embodiments, the user may also attach a rating to the bookmark. The bookmarks may be sorted according to the rating when later accessed as described below.

In one aspect, the generated bookmarks and any annotations may later be used to re-load the 3D virtual environment from the perspective of the virtual camera with the associated parameters by the rendering system and/or content creation system. When re-loaded by the rendering system, the virtual camera is placed at the position and orientation indicated by the bookmark with any associated camera parameters. Thereafter, the user can begin moving and/or interacting with the virtual camera from the position in the 3D virtual environment. Discussion of re-loading the bookmark into the content creation system is discussed below. In some embodiments, any previously generated bookmarks may be presented in a list sorted by rating and/or by most recent modification. In certain embodiments, the bookmarks presented to a user may have been created by several different other users across several different 3D virtual environments. The user may organize such bookmarks into a playlist in which each shot is present to the user in the order of the playlist.

In some embodiments, the representative system may include a selection device. The selection device may be, for example, a smartphone, tablet, or any other device configured to include sensors or sensing mechanisms (e.g., infrared reflective targets). For example, the selection device may be a device that includes one or more buttons and a set of infrared reflective targets. The buttons may allow the selection device to send command signals to the rendering system in order to perform various functions. The infrared reflective targets may allow sensors of the motion capture system to determine the position of the selection device at any given time. In some embodiments, the selection device may be a different device from the first mobile device. In other embodiments, the first mobile device may also act as or be the selection device.

In one aspect, the rendering system may map the physical orientation/position of the selection device with a physical orientation/position of a virtual selection element in the virtual environment. Such mapping can be performed in any suitable manner. For example, the rendering system may map the initial GPS coordinates, accelerometer information, and other sensor information received from the selection device to an initial virtual position or orientation of the virtual selection element. As another example, the sensors of the motion capture system may determine the initial location of the selection device by detecting the infrared reflective markers on the selection device. The initial location may be mapped to an initial virtual position or orientation of the virtual selection element. As will be described below, any change in the initial physical orientation/position of the selection device may cause movement of the virtual selection element in the virtual environment.

In one embodiment, the virtual selection element may be represented by one or more visible rays or beams cast or emanating from the position of a virtual camera of the virtual environment. In some instances, the one or more rays may terminate or end once intersecting with or "hitting" the surface of an object in the virtual environment. The intersecting object may be considered to be currently "selected" by the representative system. In certain embodiments, the end or terminus of the virtual selection element may be represented by and/or include a target or "bulls-eye." The virtual selection element may also be associated with one or more displayed attributes for the surface with which it currently intersects. The attribute information may include information regarding the material of the surface, the density of the surface, the texture of the surface, the color of the surface, the virtual distance of the surface from the virtual camera of the virtual environment, etc. In some instances, a user may interact with the selection device to change the attributes of the surface in real-time or at interactive frame rates. For example, a user may interact with the selection device to change the attribute of the intersecting/selected virtual surface from a "wood" material to a "metal" material. Upon changing a surface from a wood material to a metal material, images of the virtual surface displayed to the user may be updated at interactive frames rates (e.g., 30, 60, 90, or 120 frames per second) accordingly to include a silver, shiny surface.

In some instances, the user may interact with the selection device to choose a virtual object to be placed on a selected surface. For example, a user may enter into an object placement menu or use predefined hotkeys to select and place a virtual tree or building on a surface currently selected by the virtual selection element. In some instances, the user may move or remove a virtual object from the virtual environment. For example, a user may select a virtual tree using the virtual section element and move the virtual tree to another location in the virtual environment by physically moving the selection device (as will be discussed below).

In some instances the virtual objects of the virtual environment may move or interact with other objects over time. In one aspect, the movement or interaction of the virtual objects may have been pre-rendered and/or pre-defined such that the virtual objects can be presented in very high fidelity. In other aspects, the movement and/or interactions of the virtual objects may be rendered in real-time.

In some instances, a user may move the virtual selection element by physically moving the selection device in the real world environment. As mentioned, the physical orientation of the selection device may be mapped to the orientation of the virtual selection element in the virtual environment. Thus, if the selection device moves three feet to the right in the physical world, the virtual selection element may also move three virtual feet to the right in the virtual world. In this way, a user can quickly select different objects within the virtual environment and determine the attributes of the objects. A user can also quickly add, remove, or move objects around the virtual environment.

In some embodiments, upon selecting an object as described herein, a user can interact with the selection device to "teleport" or be moved within a threshold vicinity of a selected object. For example, a user may interact with the selection device to select an object that is 40 virtual feet away from the current location of the virtual camera. The user may then indicate via the selection device (e.g., by pressing on a button of the selection device) to move to the location of the selected object. In response, the rendering system may move the virtual camera to the location of the object or a certain threshold distance away from the object (e.g., 2 feet away). In this way, a user can quickly move around a virtual environment.

Figure 13A:
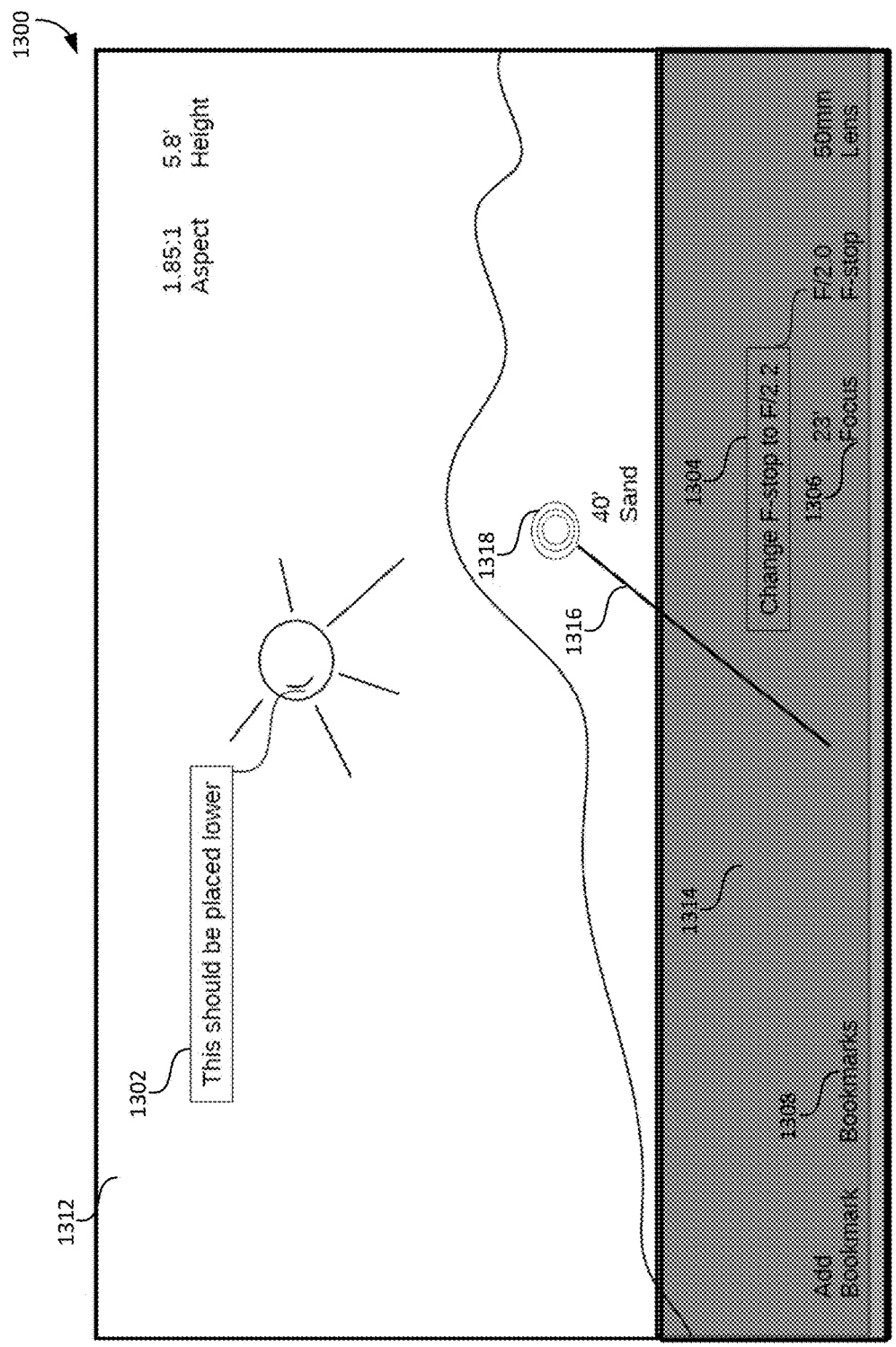
FIG. 13A illustrates an example user interface, according to some embodiments.

FIG. 13A illustrates an example user interface 1300. In particular, FIG. 13A includes the indicator 106 showing the current focus distance value. FIG. 13A also includes the indicator 1308 with which a user can interact in order to access any previously saved bookmarks. FIG. 13A further shows the annotations 1304 and 1302 that are associated with the particular shot. It should also be appreciated that the image frames presented to the user include cropped out areas 1312 and 1314. FIG. 13A further shows a virtual selection element 1316. The virtual selection element 1316 includes a ray portion that is cast out from the virtual camera and a target element 1318 indicating the surface with which the virtual selection element first intersects. In some embodiments, the virtual selection element may only terminate at a surface that is of a particular type. For example, the virtual selection element may not end (or be considered to intersect) with surfaces that have a less than a threshold density or are defined as having a gaseous or liquid type. For instance, the virtual selection element may not end (or be considered to intersect) a virtual cloud since the virtual cloud may not meet a predefined threshold density. Referring again to FIG. 13A, the virtual selection element 1316 is further associated with attribute information for a currently selected surface. In particular, the attribute information indicates that the selected surface (the surface of a dune) is 40 feet away and has a "sand" material type.

Figure 13B:
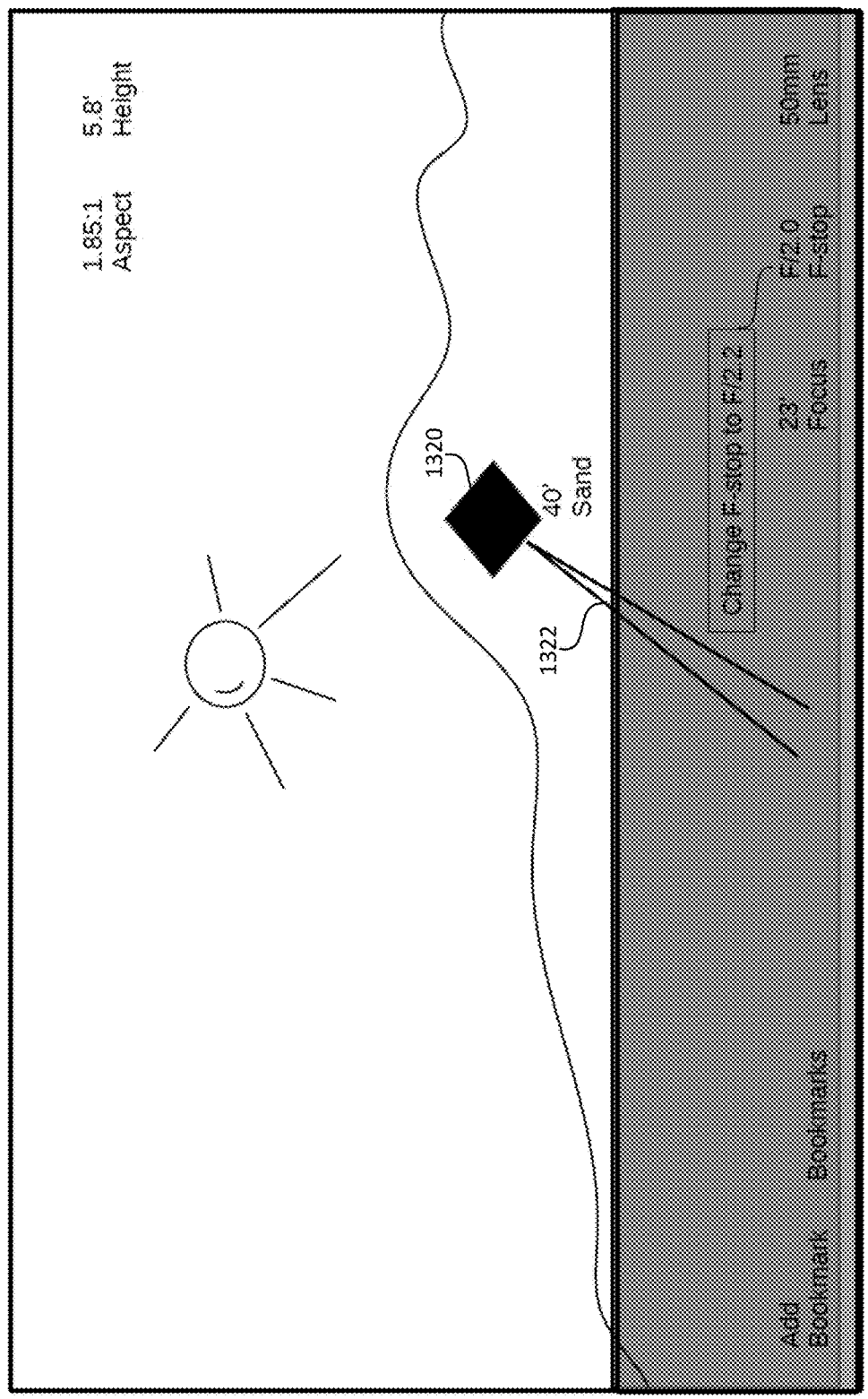
FIG. 13B illustrates an example user interface similar to that shown in FIG. 13A, according to some embodiments.

FIG. 13B illustrates an example user interface 1324 similar to that shown in FIG. 13A. FIG. 13B shows a virtual selection element 1322 with multiple rays. At the end of the rays is an object 1320 that will be placed on the surface that currently intersects with the virtual selection element 1322.

In some embodiments, the user can use the selection device to change the scale of the virtual camera. For example, the user can change the scale of the virtual camera such that the virtual environment can appear very large. Put another way, the user can shrink the virtual camera such that it appears the user is an insect within the virtual environment. In this way, the user can examine detailed aspects of the environment. As another example, the user can change the scale of the virtual camera such that the virtual environment appears very small. Put another way, the user can enlarge the virtual camera such that it appears that the user is a giant within the virtual environment. In this way, the user can easily examine the entirety of the virtual environment. In one embodiment, the user can navigate the virtual environment according to or based on the camera's virtual size. For example, "smaller" virtual cameras may move slower or have smaller "steps" across the virtual environment. "Larger" virtual camera may move faster or have "larger steps" across the same virtual environment.

In another embodiment, the virtual environment may be presented to a user in an immersive system. The user may have a selection device (e.g., smartphone, tablet, device with infrared reflective markers, etc.) that is determined by the immersive system after an initial mapping. The determining of the selection device may enable a user to select various objects within the virtual environment by pointing the selection device at various points of the projection device(s) displaying the virtual environment. The user may further use the selection device to place various objects within the virtual environment.

In one aspect, the second mobile device may be a set of virtual reality goggles. In the aspect, the user may switch to an "immersive" mode during a session. As such, the rendering system may begin sending rendered image frames of the 3D virtual environment to the second mobile device and cease sending rendered image frames to the first mobile device. The rendering system may also change the format of the image frames that it renders so that it can be properly displayed by the second mobile device. In one aspect, the first mobile device may still be used to control the virtual camera. For example, the user may use any number of gestures to move the virtual camera via the first mobile device while viewing the image frames of the 3D virtual environment from the second mobile device. Note that no images may be presented over the display (e.g., touchscreen) of the first mobile device. In some embodiments, the user may briefly tap on the input device (e.g., touchscreen) of the first mobile device. In response to the tap, an indicator may be quickly presented or "flashed" in the image frames of the 3D virtual environment presented via the display of the second mobile device. The indicator or "flash" may indicate the portion of the 3D virtual environment corresponding to the portion of the input device of the first mobile device tapped by the user. In this way, the user is able to quickly determine the mapping between the first mobile device's input device and the second mobile device's display. In some instances, the first mobile device may act as the selection device for selecting objects within the virtual environment.

In yet another aspect, a third mobile device of an assisting operator may be used to control the virtual camera shown via the second mobile device (or first mobile device) to the user. For example, the third mobile device may display an overhead or map view of the 3D virtual environment. The assisting operator may interact with the third mobile device to move the virtual camera of the second or first mobile device to different locations within the 3D virtual environment. As such, the perspective of the 3D virtual environment shown to the user may be changed based on the input provided through the third mobile device.

In one aspect, the assisting operator may move the virtual camera of the user by tapping on different portions of the display of the third mobile device representative of different parts of the 3D virtual environment. As a result of the tapping, the virtual camera of the user may be "teleported" to the selected portions of the 3D virtual environment. As a result, the perspective of the virtual camera shown to the user over the first or second mobile device may be immediately changed from one portion of the 3D virtual environment to another. For example, the user may first view a mountain in the northwest part of the 3D virtual environment at a first time. Based on the interaction of the assisting operator with the third mobile device, the user may then view a lake in the southwest part of the 3D virtual environment at a second time. In another embodiment, the virtual camera of the first or second mobile device may be moved by the assisting operator based on the assisting operator's gestures input to the third mobile device. In one aspect, the speed at which the virtual camera of the user is moved from one part of the 3D virtual environment to another part of the 3D virtual environment may be based on the speed at which the finger of the assisting operator is moved over the input device (e.g., touchscreen) of the third mobile device. For example, the faster the assisting operator's finger is moved across a touchscreen of the third mobile device, the quicker the virtual camera of the second or first mobile device is moved across the 3D virtual environment. In this way, the user can be provided with a sense of actually moving through the 3D virtual environment rather than being teleported from location to location.

In yet another embodiment, a digital model within the 3D virtual environment may be mapped to the performance of an actor being captured by the motion capture system in a performance area. In particular, a set of sensors of the motion capture system may determine the actor based on, for example, a motion capture suit worn by the actor. The actor's performance may then be used to move the digital model in the 3D virtual environment in real-time or at interactive frame rates. The digital model may move while the user of the first mobile device/second mobile device is viewing and/or moving the virtual camera within the 3D virtual environment.

In one embodiment, the bookmarks created by the user may be exported or otherwise provided to the content creation system. An artist operating the content creation system may select the bookmarks (which may be sorted by rating) in order to load a virtual camera in the 3D virtual environment from a position and orientation indicated by the bookmark. The virtual camera may also be loaded with a lens type, focus, crop-factor, and/or f-stop indicated by the bookmark. In this way, the artist can easily begin processing a scene in order to generate an item of content.

In one embodiment, the second mobile device (if it is a pair of VR glasses or goggles, for example), may present a split screen to a user. One side of the screen may display video of the physical environment as captured by a front facing camera associated with the second mobile device. The other side may show the virtual environment. In this way, the user can simultaneously view the virtual environment while being able to also avoid obstacles in the physical environment as the user moves. In another embodiment, a picture-in-picture organization may be used rather than a split screen. For example, the primary screen may display the virtual environment. A smaller secondary screen may be overlaid on the primary screen and show the physical environment as captured by the front-facing camera associated with the second mobile device.

Augmented Reality Simulation

The layering of content for use in an augmented reality ("AR") immersive environment described above can be very difficult to design in such a way that it provides a seamless user experience. Perspectives between the mobile device in the projected content on the movie screen have to be synchronized a both in space and time. Because the experience of each viewer will be unique based on their location in the immersive environment, the design of interactive content in an augmented reality paradigm may require verifying not only that the top-level content is complete, but also that the individual experiences viewed by the many different participants are correctly presented.

Some embodiments described herein enable the novel simulation of augmented reality using virtual reality goggles. Such a simulation may be useful in the creation, generation, and/or testing of augmented reality-related content by allowing a creator of the content (e.g., a director) to understand and visualize how the augmented reality content interacts and/or blends with an environment. Moreover, this visualization can take place for any user perspective in the immersive environment. For example, a director can test how the augmented reality content interacts with the background environment from the perspective of a user sitting in a front left portion of a theater, as well as from the perspective of a user sitting in a back right portion of the theater. Referring back briefly to the discussion of FIG. 2 above, augmented reality may refer to the projection of images to the eyes of a user from a projection device worn by the user in order to expand or augment the user's experience in an environment. The projected images may be objects and/or information. The projection device may be built into, for example, a pair of glasses. In some aspects, the projected images may appear to be overlaid or layered on top of the physical world viewed by the user through the transparent portions of the augmented reality glasses.

During the augmented reality experience in an immersive environment, a first set of content items (e.g., a motion picture) can be displayed in the environment (e.g., on a movie theater screen) that is generally visible to all viewers in the immersive environment. Each individual viewer can wear a set of augmented reality glasses, or another augmented reality-enabled mobile device, that can display additional content to augment the first set of content items displayed in the environment. A second set of content items displayed on the augmented reality device can both supplement and interact with the first set of content items in the immersive environment. The content that is displayed on the augmented reality device can be individually rendered and presented to users based on their location relative to the first set of content items in the immersive environment. For example, as described in detail above, content items displayed on the augmented reality glasses can be based on the location of users in a movie theater.

Figure 14:
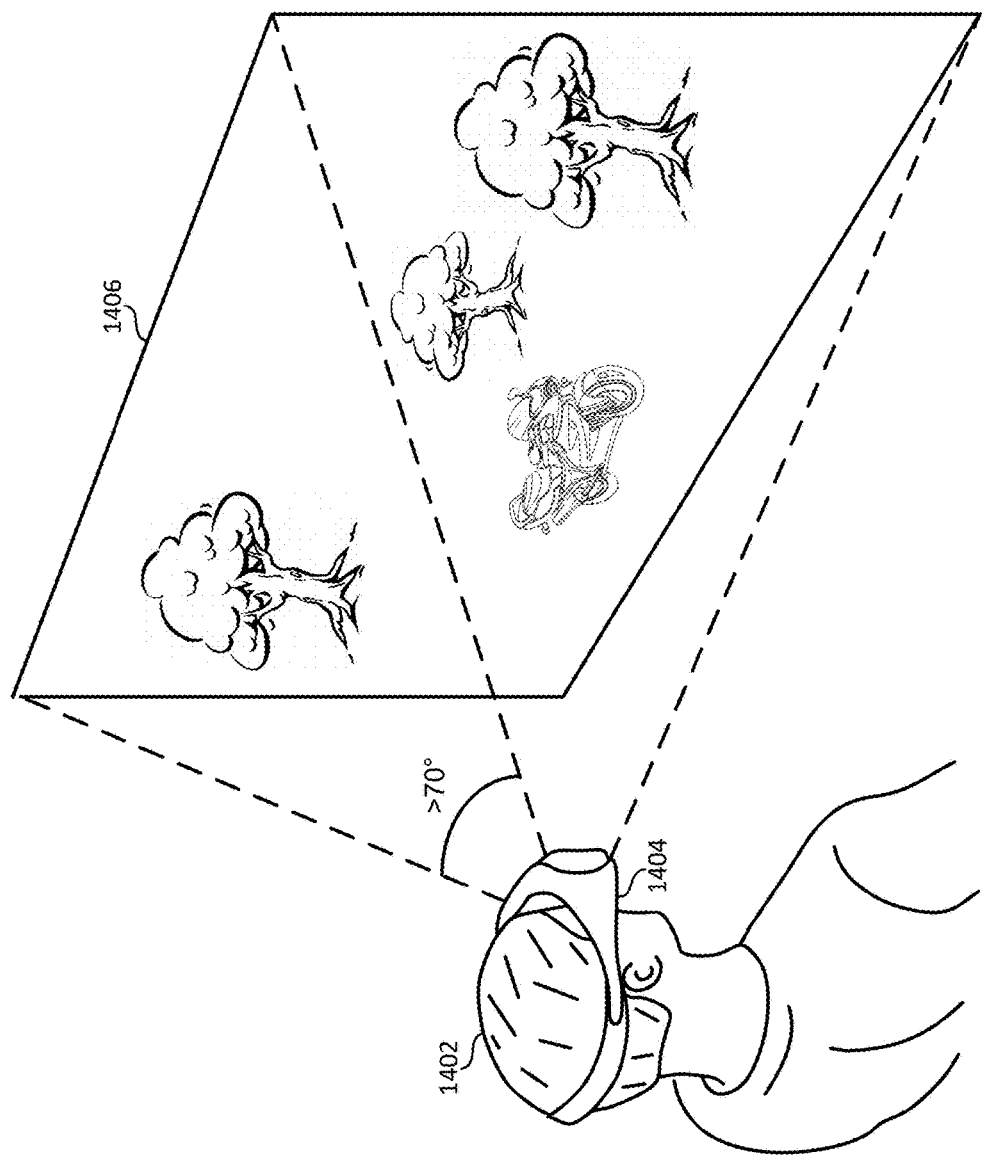
FIG. 14 illustrates a user wearing a pair of virtual reality goggles to view a virtual environment.

The embodiments described herein simulate an augmented reality experience in an immersive environment in order to allow a content creator to more effectively develop an item of augmented reality-related content. In particular, some embodiments may include a pair of virtual reality goggles, a remote rendering system, and a motion capture system. The virtual reality goggles may be any suitable device for providing an immersive virtual reality experience to a user. FIG. 14 illustrates a user 1402 wearing a pair of virtual reality goggles 1404 to view a virtual environment 1406. The virtual reality goggles 1404 may cover the entire or a large part of the field of view (e.g., a 70 degree field of view or greater) of the user such that the user feels immersed in a virtual environment displayed by the virtual reality goggles 1404. The virtual reality goggles 1404 may also present or display stereo images of the virtual environment 1406 in order to provide a user with a 3D visual impression (i.e., slightly different images are displayed to each eye of the user in order to provide a sense of depth to the user).

In contrast to the augmented reality system described above, the virtual-reality system of FIG. 14 does not include an actual physical screen in the immersive environment corresponding to the virtual environment 1406. Instead, the virtual environment 1406 is displayed on the virtual-reality goggles 1404 and visible only to the user 1402. In some embodiments, the virtual environment 1406 may be displayed such that the user 1402 feels as though he/she is actually in the virtual environment 1406. In other embodiments, the virtual environment 1406 may be displayed in the virtual-reality goggles 1404 as though the user 1402 was looking at a physical screen in a theater environment. In other words, the virtual-reality goggles 1404 can be used to simulate a user watching a movie in a theater environment. For example, the display of the virtual environment 1406 on the virtual-reality goggles 1404 may include a rendering of screen borders and a theater environment, possibly including seats, other viewers, theater lighting, entrances and exits, and so forth.

Figure 15:
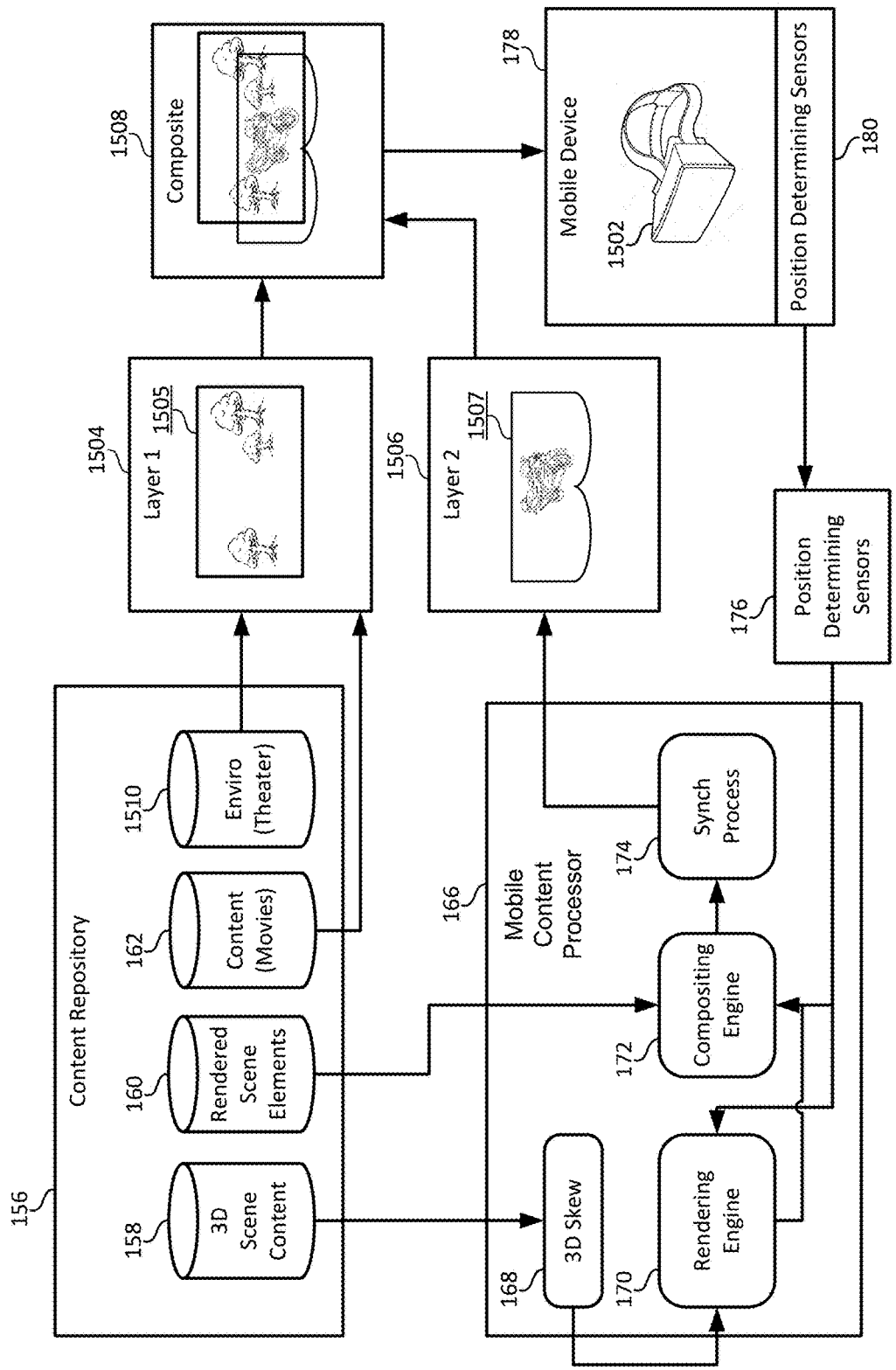
FIG. 15 illustrates a block diagram of a system for simulating an augmented reality environment using a virtual-reality device, according to some embodiments.

FIG. 15 illustrates a block diagram of a system for simulating an augmented reality environment using a virtual-reality device, according to some embodiments. The system may be similar to the system described in FIG. 1B above, with changes to accommodate the simulation of the AR environment on a pair of virtual-reality goggles 1502. The system may include a content repository 156 that includes one or more different types of content. First, the content repository 156 may include a content data store 162 that includes content to be displayed by the display system. In some embodiments, the content data store 162 may include full-length movies or complete media productions that can be displayed on a screen in a theater or home theater environment. The content data store 162 may include a plurality of two-dimensional (2-D) frames that can be sequentially displayed on the screen 152.

The system may also include a mobile device 178, such as a pair of virtual-reality goggles 1502. The system may be configured to simulate the display of additional content on a pair of augmented reality goggles against the background of the content from the content data store 162. As described above, a position and/or orientation of the mobile device 178 may be known and static, in that the position and orientation of the mobile device 178 is constant and unchanging during playback of the content from the content data store 162. In this case, the additional content to be displayed on the mobile device 178 can also be stored as a plurality of 2-D frames that are displayed on the mobile device 178. In these embodiments, no additional rendering or compositing may be necessary in order to display the additional content on the mobile device 178.

In order to simulate the augmented reality experience, the movie content cannot simply be displayed in the virtual-reality goggles 1502. Instead, additional rendering should take place to generate a first layer 1504 to be displayed on the virtual-reality goggles 1502. The first layer 1504 may include a series of 2-D images from the content data store 162. However, the series of 2-D images will be rendered as appearing on a screen based on a location of a user wearing the virtual-reality goggles 1502 in a particular environment.

In some cases, the user may actually be sitting in a theater environment, and the same determining system described above to locate a position/orientation of augmented reality glasses can be used to determine the position/orientation of the virtual-reality goggles 1502. Then, a rendering operation can design a virtual 3-D scene that includes a movie theater screen projecting images from the content data store 162 with a virtual camera at the position of the actual user wearing the virtual-reality goggles 1502 in the physical theater environment. Thus, the first layer 1504 can be rendered to display a theater scene 1505 on the virtual-reality goggles 1502. The scene may include a virtual representation of a movie screen, along with other elements that would be included in the theater environment, such as other viewers, walls/floors, seats, and so forth.

Alternatively, some embodiments need not actually determine a physical location of the virtual-reality goggles 1502 in order to initially render the first layer 1504. Instead, a virtual camera position in the virtual 3-D scene of the theater environment can be set by a user prior to rendering. For example, a director can set his location to the middle of the theater and watch the virtual theater experience on the virtual-reality goggles 1502 without physically being in a theater environment. This allows a director to experience the scene from any location in the virtual theater environment without needing to physically move around a corresponding physical theater environment.

In order to simulate the experience of wearing augmented reality goggles in the virtual theater environment, a second layer 1506 can be generated by the mobile content processor 166 and combined with the first layer 1504 for display on the virtual-reality goggles 1502. Generation of the second layer 1506 can proceed generally as described above in relation to FIG. 1B. First, the position/orientation of the mobile device 178 (e.g., virtual-reality goggles 1502) may be determined by the system. In cases where the user is actually located in a physical theater environment, the position/orientation of the mobile device 178 may be unknown and/or changing during playback of the content from the content data store 162. In these embodiments, the system can generate a sequence of 2-D frames for the second layer 1506 that account for the position and/or orientation of the mobile device 178. In some cases, the approximate position of the mobile device 178 may be known, but the orientation of the mobile device 178 may be allowed to change dynamically. The content repository 156 may also include a rendered scene elements data store 162 that includes scene elements rendered from a particular approximate position of the mobile device 178. These rendered scene elements can be retrieved by a mobile content processor 166 and processed into a sequence of 2-D frames inclusion in the second layer 1506. The rendered scene elements can be inserted into a compositing engine 172 to be edited before being sent to the second layer 1506. In some scenes, the rendered scene elements may interact with elements of the content from the content repository 162 in the first layer 1504. For example, a character or object being displayed on the second layer 1506 may pass behind an object in the first layer 1504. The compositing engine 172 can generate a matte or cut out that removes a portion of the rendered scene elements comprising the character or object as it passes behind the object displayed on screen 152.

In the situation described above where a series of rendered, 2-D frames have been stored corresponding to a specific location in front of the screen 152, either in the virtual theater environment or in a physical theater environment, that set of 2-D frames can be used for all viewer locations position at that orientation from the screen 152, regardless of the distance from the screen (z-depth). However, while the same images may be reused, the distance from the screen can be used to scale, skew, and/or stretch each of these images based on distance from the physical/virtual screen. This may be done to compensate for the fact that an object displayed on the mobile device close to the screen will look very small, while the same object displayed at the same size on the mobile device far away from the screen will look very large in comparison to objects on the screen. Examples of this type of scaling are shown in greater detail in the discussion above.

The mobile content processor 166 may be co-implemented with the content repository 156, and may transmit the sequence of 2-D frames to the mobile device 178 after the sequence is generated. In other embodiments, the mobile content processor 166 may be integrated with the mobile device 178 such that each mobile device 178 in the environment 100 is able to process its own individual sequence of 2-D frames for display. In a theater with hundreds of viewers, pushing the mobile content processor 166 out to each of the individual mobile devices 178 can alleviate decentralized transmission and/or generation of 3-D images.

In some embodiments, the content to be displayed on the mobile device 178 may be generated in real time to flow linearly with the content from the content repository 162. A 3-D scene content repository 158 can store animated sequences for a 3-D scene that can be rendered in real time for the second layer 1506. The mobile content processor 166 can accept an animation sequence comprising 3-D scene elements. Turning back briefly to FIG. 1A, a location where the viewer is sitting can be used as a position of a virtual camera in the 3-D virtual scene. The image plane for the rendered scene can be positioned directly in front of the 3-D virtual camera to correspond to the position of the screen/lens of the mobile device 178 in front of the viewer's eye. The content in the content repository 162 being displayed in the first layer 1504 may have been rendered from the same scene with the image plane positioned at the location of the screen 152 relative to the position of the mobile device 178 and the viewer. The position and/or orientation of the mobile device 178 can be determined in real time and fed into the rendering engine 170 such that the position/orientation of the virtual camera and image plane can be updated in real-time. The rendering engine 170 can use the determined position and the 3-D scene content in order to generate a rendered set of 2-D images for display a mobile device.

When the position of the mobile device 178 is directly in front of the screen in the first layer 1504, the rendered scene elements can be displayed without alteration on the mobile device 178. However, when the location of the mobile device 178 is to the left or right of the center of the screen in the first layer 1504, the rendered content may need to be skewed in order to match the apparent skew of the screen 152. For example, when the viewer is sitting in location 124 of the environment 100 of FIG. 1A, the rendered 3-D elements can be displayed on the mobile device 178 without alteration. However, when a viewer is sitting in location 126, the objects appearing on the screen 152 will appear skewed because of the viewing angle relative to the screen 152. To solve this problem, a skew operation 168 can be added to the mobile content processor 162 that uses the location of the mobile device 178 to skew the geometry of the 3-D elements before they are rendered by the rendering engine 170. Alternatively or additionally, stored 2-D images can be stretched or compressed in the direction of the required skew without performing another rendering operation. An example of this situation is described in greater detail above in this disclosure.

In order to provide a simulation of the augmented reality experience, the rendered image of the first layer 1504 can be combined with the rendered image of the second layer 1506 to generate a combined image 1508 to be displayed on the virtual-reality goggles 1502. In some embodiments, the image from the second layer 1506 may include a display of the frame 1506 of a pair of augmented reality glasses. Similarly, the image from the first layer 1504 may include a frame 1505 of a movie screen. Thus, in the combined image 1508, the user will see the actual representation of what it would look like to be wearing a pair of augmented reality glasses to display additional content while watching a movie on the screen in the physical theater environment. In other embodiments, the frame 1505 of the movie screen and/or the frame 1507 of the augmented reality glasses can be removed to provide a more seamless experience for the user.

The virtual reality goggles 1502 may be simultaneously displaying the first layer 1504 and the second layer 1506 at the same time. In order to synchronize these two video streams, a synchronization process 174 may be used to coordinate the timing of images on the first layer 1504 and images on the second layer 1506. For example, the augmented reality glasses may be configured to detect when certain scenes or events are occurring within the content displayed on screen in the simulated environment. In one embodiment, the first layer 1504 may detect such events by analyzing in real-time the images displayed in the second layer 1506 to match a currently displayed frame in the first layer 1504 with a predefined frame representative of the scene or event. In another embodiment, the first layer 1504 may detect such events by analyzing a sound stream from the second layer 1506 to determine whether the audio currently being presented by the display system matches with a predefined audio representative of the scene or event. In yet another embodiment, a communication link between mobile content processor 166 and the system presenting the first layer 1504 may be established. Signals may be sent back and forth via the communication link to indicate triggering or occurrence of a scene or event. If a match/event/scene is detected, the first layer 1504 may automatically present additional content associated with the scene or event. In some embodiments, a portion of the second layer 1506 may be populated. The remaining portion (e.g., background) may be kept transparent so that a user can still view the content being displayed over the first layer 1504. In this way, the additional content presented by the second layer 1506 can appear to be layered over, overlaid, or composited with the content being displayed first layer 1504. As an illustrative example, a user may be viewing a movie showing a starship battle scene. When the particular scene is detected by first layer 1504, a flying saucer may be displayed that appears to interact with the content being displayed on the second layer 1506.

The virtual-reality goggles 1502 may include one or more position determining sensors 180. In some embodiments, the sensors may include accelerometers, gyroscopes, GPS receivers, gravitation sensors, and/or digital compasses. The sensors can be used to determine a position and/or orientation of the mobile device 178 by measuring displacements from an initial, known position. For example, each mobile device in FIG. 15 may be assigned to a specific seat location in the physical environment. At the beginning of the movie, the viewer may be instructed to look directly at a symbol in the middle of the screen area displayed on the virtual-reality goggles 1502 to establish a known, initial orientation. From that point, the accelerometers and gyroscopes could be sampled to measure displacements from this initial position. These sensors, along with a gravitational sensor can be used to measure a change in orientation from the initial orientation.

In some embodiments, the determining sensors 180 may include a radio transmitter and/or an RFID chip. Radio receivers can be positioned throughout the environment 100 and used to ping the RFID chip on the virtual-reality goggles 1502. These external radio receivers may be one of a plurality of position determining sensors 176 that are distributed throughout the environment. By measuring the ping time for each mobile device of each of the position determining sensors 178 of the environment, a position of the virtual-reality goggles 1502 can be triangulated. In some embodiments, the GPS receiver can be integrated into the virtual-reality goggles 1502 and used to determine a position of the virtual-reality goggles 1502. In some embodiments, the position determining sensors 176 may include a plurality of cameras. The cameras may be configured to detect fiducial markers that are installed as part of the position determining sensors 180 on the virtual-reality goggles 1502. For example, a graphic symbol resembling a QR code can be placed on the virtual-reality goggles 1502 and determined by the cameras.

A motion capture system may be a system that determines the location and/or orientation of the virtual reality goggles, the content creator, an actor, and so forth. For example, the motion capture system may determine markers associated with the virtual reality goggles to determine the location of the goggles at any given time. The location and/or orientation information may be provided to the rendering system of the mobile content processor 166 such that the virtual environment can be rendered according to the location and/or orientation of the virtual reality goggles.

In some embodiments, the simulation system renders or generates the images of the virtual environment for display over the virtual reality goggles. Specifically, the simulation system may take 3-D data regarding the virtual environment (including data regarding virtual objects within the environment) and generate viewable images of the virtual environment that can be displayed over the virtual reality goggles. In some embodiments, the rendering system may render images in real-time or at interactive frame rates (e.g., 15, 30, 60, 120, or 240 frames per second). The images may be sent to the virtual reality goggles over a suitable connection, such as a WiFi connection, Bluetooth connection, a cable, etc. The images may also be sent to the virtual reality goggles over a suitable network, such as the Internet, a local intranet, etc.

In some embodiments, the system of FIG. 15 may enable simulation of a physical or real-life AR experience. In particular, the remote rendering system may load a virtual duplicate of a physical environment in which a pair of AR glasses may be used. The virtual duplicate of the environment may be, for example, a virtual auditorium that mirrors or represents a real auditorium in which a real pair of AR glasses may be used.

Figure 16A:
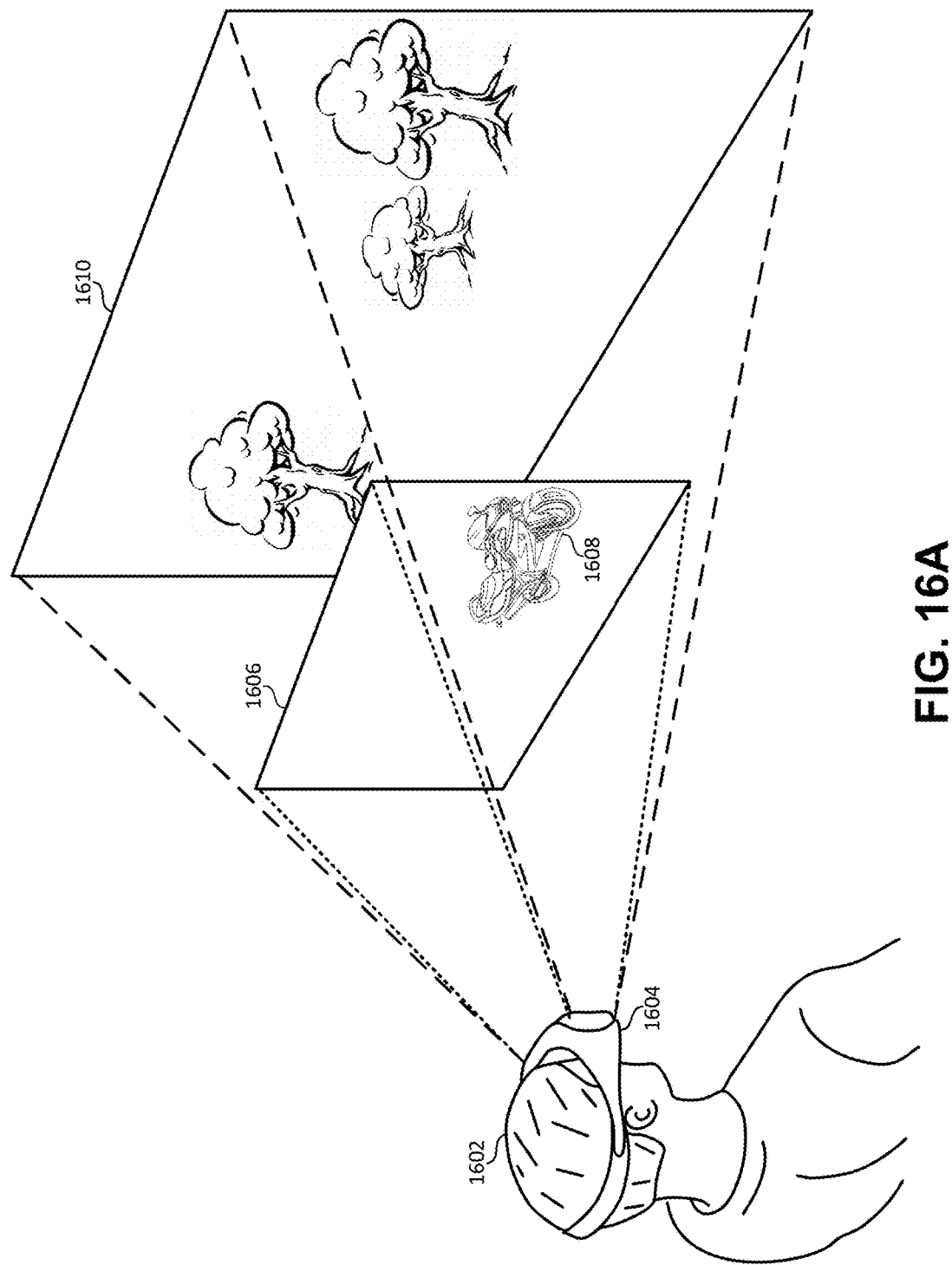
FIG. 16A illustrates an environment in which the augmented reality simulation system may be used.

FIG. 16A illustrates an environment in which the augmented reality simulation system may be used. In some embodiments, the augmented reality simulation can take place in an actual environment where the augmented reality glasses will be worn. For example, if augmented reality glasses are to be used in a theater environment where a motion picture will be displayed, the virtual-reality goggles 1604 can be worn by a user 1602 sitting in a scene in the actual theater environment. In this case, the same determining system and mobile content processor used to generate images for the augmented reality glasses can be used to generate the second layer 1606 displayed on the virtual-reality goggles 1604. The first layer 1610 can include a view of the screen in the theater environment as it is positioned on the physical walls of the theater. In other words, when the user 1602 orients the virtual-reality goggles 1604 towards the location of the physical screen in the theater, the virtual-reality goggles 1604 will display a rendering of the screen in the theater from the location of the user. This means that the first layer 1610 will be rendered from a virtual 3-D environment that is an approximate duplicate of the actual physical theater environment in which the user 1602 is located. The virtual-reality goggles 604 can interact with the mobile content processor in the same way that the augmented reality glasses would interact with the mobile content processor. Furthermore, the second layer 1606 can be substantially the same as what would otherwise be displayed on a pair of augmented reality glasses worn by the user 1602 in the same position.

In other embodiments, the user 1602 wearing the virtual-reality goggles 604 does not need to be located in an actual environment similar to the simulated environment. For example, a theater environment could be simulated with a user 1602 wearing virtual-reality goggles 1604 sitting in a different, non-theater environment. Because the viewer of the theater environment is rendered from a virtual 3-D environment, the actual environment outside of the virtual-reality goggles 1604 need not matter. A content creator can instead select a position for the user 1602 in the virtual 3-D environment for the simulation. The movement/orientation of the virtual goggles 1604 can then be determined relative to the starting position in the real-world environment to determine how images should be rendered in the simulation environment.

Figure 16B:
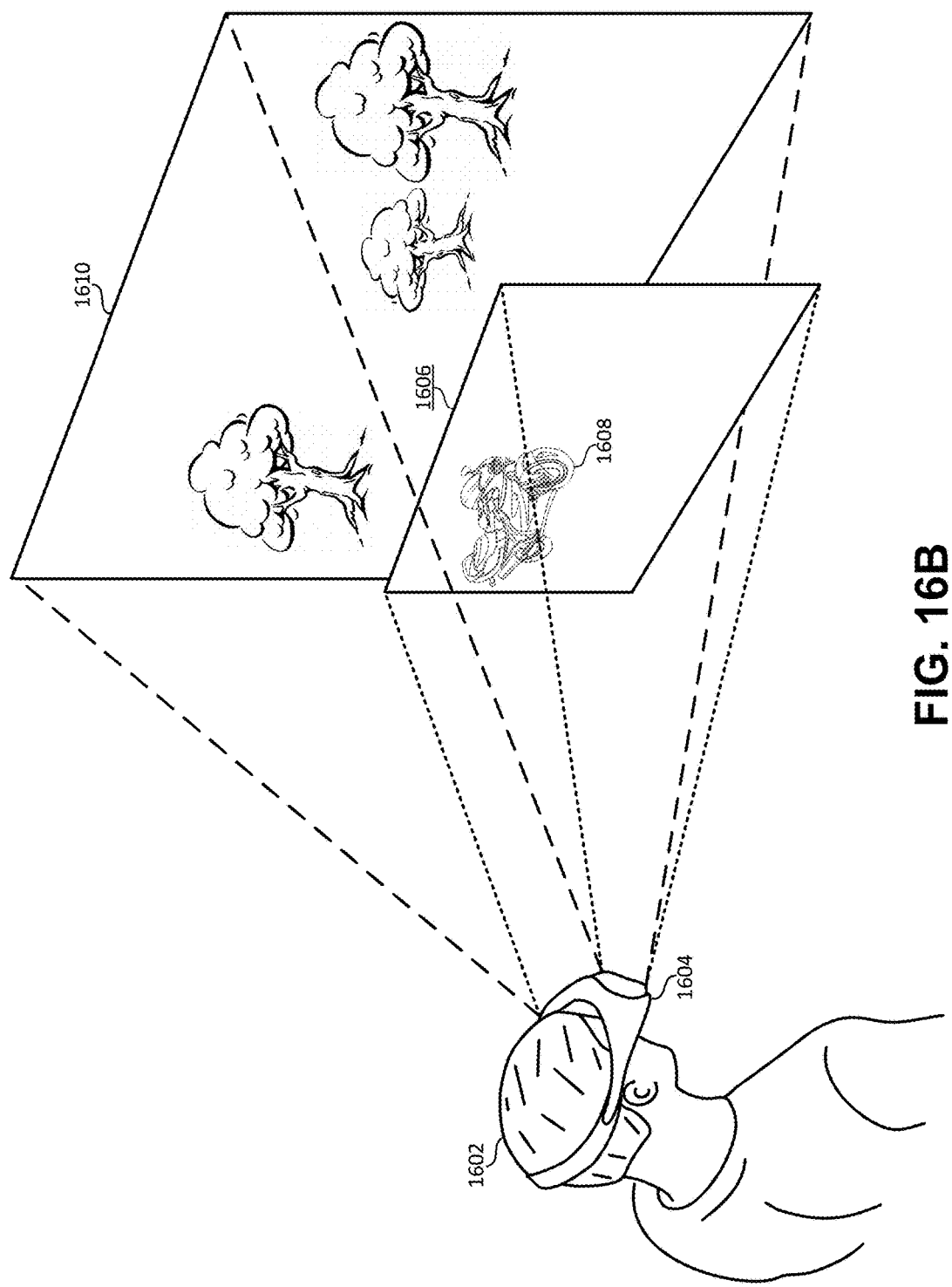
FIG. 16B illustrates how the view can change for the user when they move relative to a starting position, according to some embodiments.

FIG. 16B illustrates how the view can change for the user 1602 when they move relative to a starting position, according to some embodiments. Note that once the simulation begins, it need not matter whether the user 1602 is located in the actual environment being simulated or in a different environment than what is being simulated. In FIG. 16B, the user 1602 has moved his/her head to the right. The position of the first layer 1610 that includes, for example, a movie screen, does not move relative to the user's head. Instead, the first layer 1610 appears stationary, and will move to the left of the internal display of the virtual-reality goggles 1604. In contrast, the second layer 1606 will move with the movement of the head of the user 1602. Because the second layer 1606 simulates augmented reality glasses worn by the user 1604, the second layer 1606 will move with the user's head, just as actual augmented reality glasses would move. If the second layer 1606 included a visual representation of augmented reality glasses being worn by the user 1602, the user 1602 would see those augmented reality glasses move with his/her head. As described in detail above, content objects 1608 that are part of the second layer 1606 and displayed to blend in with the first layer 1610 need not move with the second layer 1606. For example, just as would be the case when using augmented reality glasses, the content object 1608 does not move relative to the user's head in FIG. 16A and FIG. 16B, but instead stays stationary in the 3-D virtual scene while the second layer 1606 moves. For example, the user would see the frames of the augmented reality glasses move while the motorcycle appears to stay stationary.

Figure 17A:
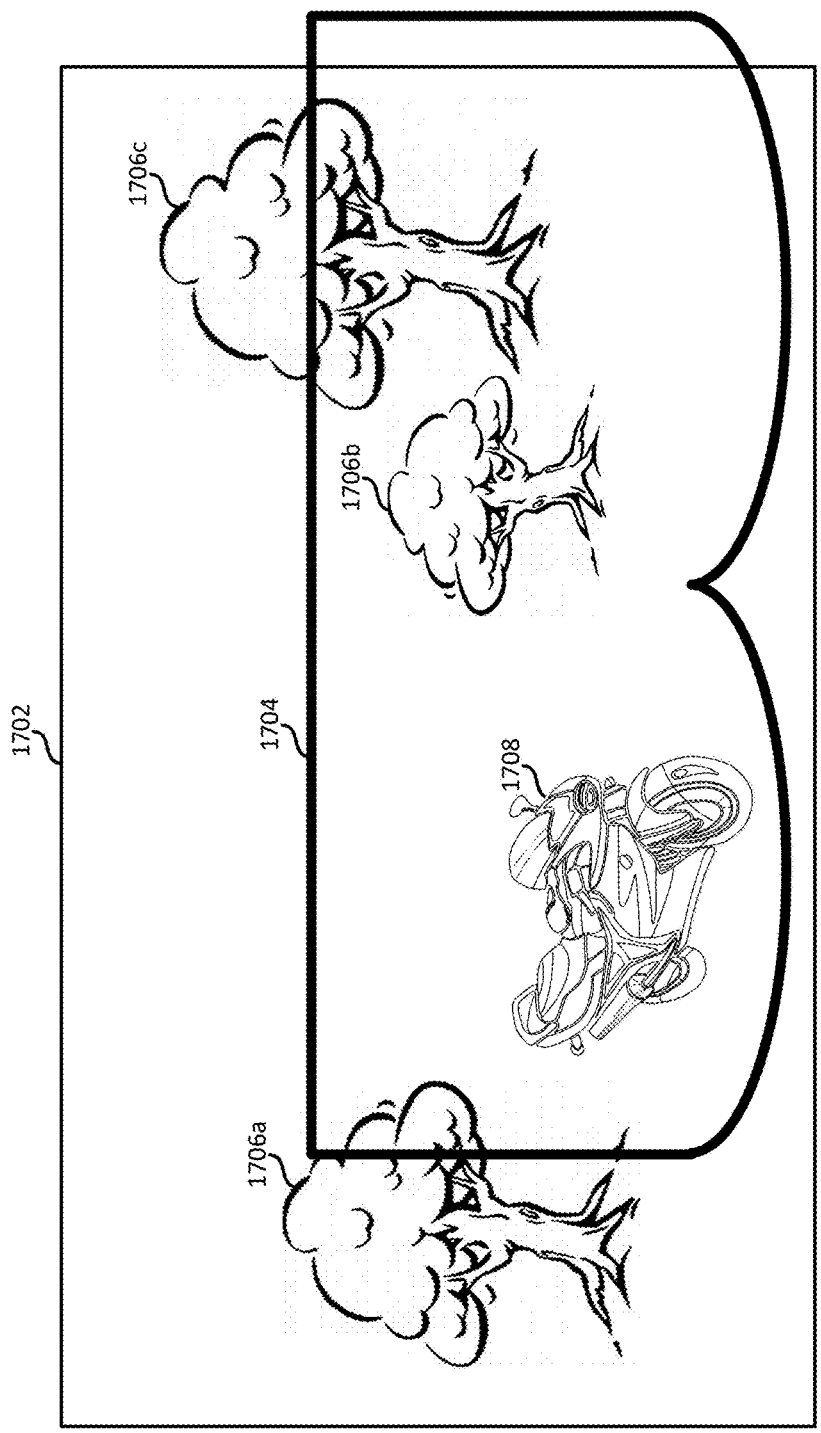
FIG. 17A illustrates a first view inside the virtual-reality goggles of the scene in FIGS. 16A-16B, according to some embodiments.

FIG. 17A illustrates a first view inside the virtual-reality goggles of the scene in FIGS. 16A-16B, according to some embodiments. As described above, the simulation system may load a pair of virtual augmented reality glasses 1704 that may mirror or represent a pair of real augmented reality glasses. As was the case with the layered content displayed with real augmented reality glasses, content objects 1706 and 1708 appear seamlessly as part of a continuous scene, even though content objects 1706 are part of the first layer and content object 1708 is part of the second layer. In addition to displaying the augmented reality glasses 1704, the first layer may also present a frame 1702 around the content representing a screen or other display device. This embodiment presents the most lifelike simulation of what a user would actually see in a theater environment wearing augmented reality glasses.

Figure 17B:
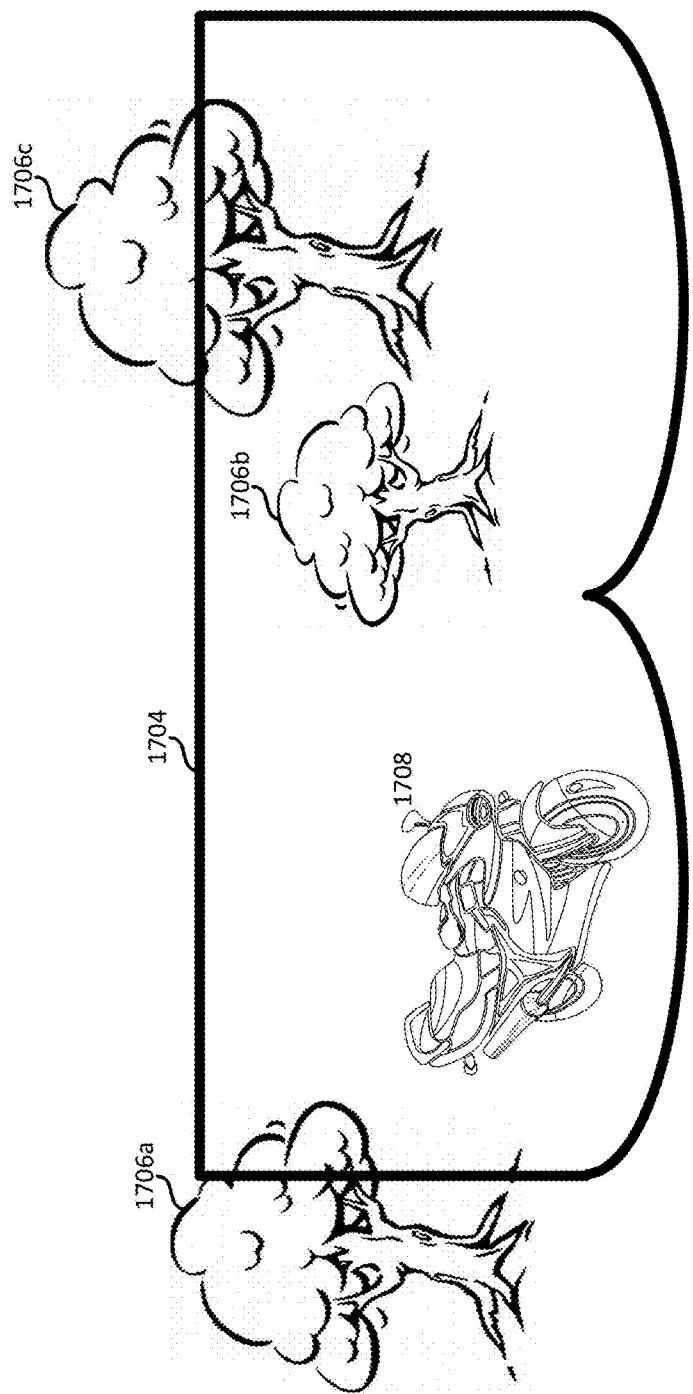
FIG. 17B illustrates a second view inside the virtual-reality goggles of the scene in FIGS. 16A-16B, according to some embodiments.

FIG. 17B illustrates a second view inside the virtual-reality goggles of the scene in FIGS. 16A-16B, according to some embodiments. In this embodiment, the frame 1702 around the content in the first layer has been removed. This embodiment can be used to simulate immersive reality experiences that do not necessarily involve a physical screen that is meant to be noticed by a user. For example, some immersive environments may include images displayed on walls, floors, and/or ceilings to give the user a feeling of being immersed in a virtual environment. Physical characteristics of the immersive environment itself are gradually ignored by a user as they become immersed in the environment. This embodiment similarly removes physical characteristics such as frames, floors, ceilings of the environment being simulated in order to present a more immersive experience.

Figure 17C:
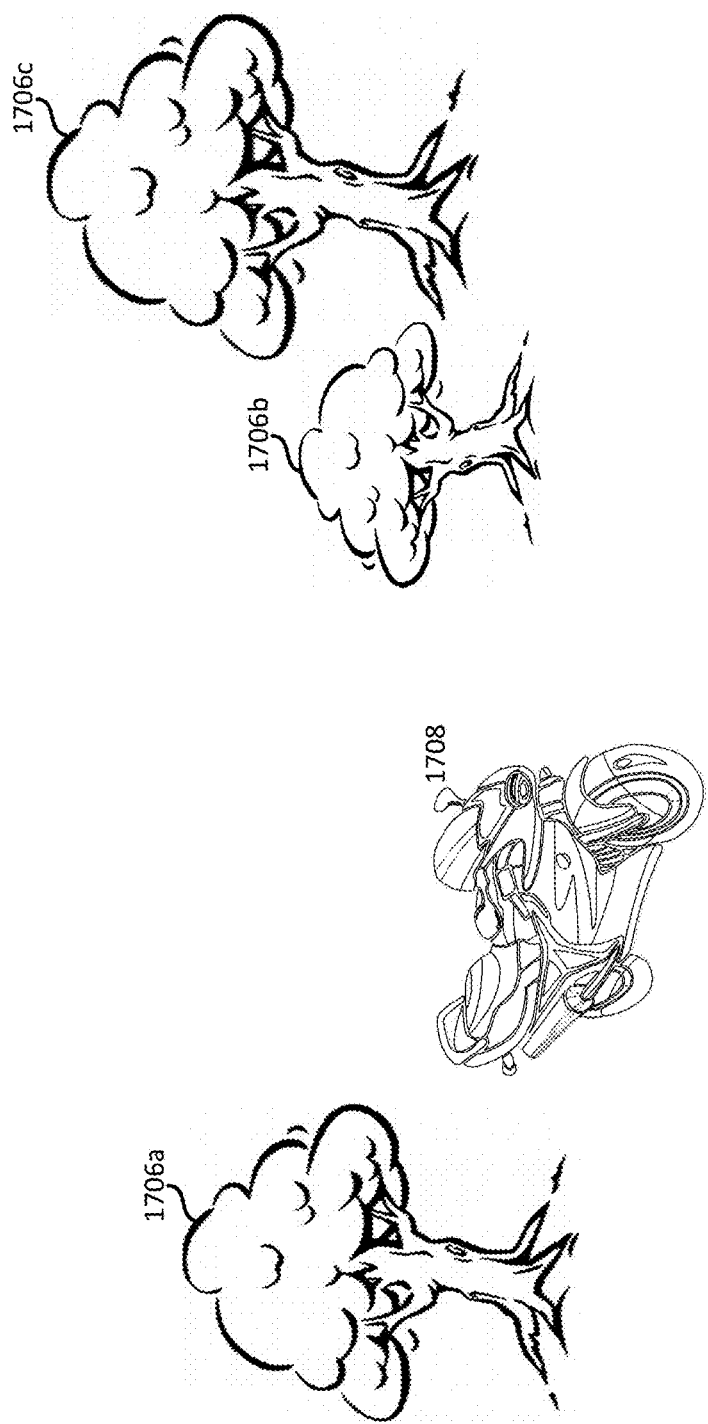
FIG. 17C illustrates a third view inside the virtual-reality goggles of the scene in FIGS. 16A-16B, according to some embodiments.

FIG. 17C illustrates a third view inside the virtual-reality goggles of the scene in FIGS. 16A-16B, according to some embodiments. In this embodiment, the frame 1702 around the content in the first layer has been removed, along with the augmented reality glasses 1704. The content objects 1706 and 1708 are presented as a single continuous scene and may not necessarily be distinguished by a viewer. This embodiment can be particularly useful for focusing on the interaction, timing, spacing, sizing, and/or depth of content objects relative to each other in the first and second layers. For example, a content creator can use this embodiment to determine whether the display of content object 1708 is positioned correctly relative to content objects 1706.

As described above, first content objects may be overlain, attached, or otherwise correspond to an object (e.g., a virtual movie screen) within the virtual environment. The first content objects may be, for example, a movie, a television show, a short film, or some other type of visual content displayed on the screen or display device. Thus, certain attributes (e.g., material type, lighting, etc.) of the object corresponding to the first content objects may influence the display of the content objects in the virtual environment. The second content objects may be content that is to be displayed over the real pair of augmented reality glasses. As such, the second content objects may be overlain, attached, or otherwise correspond to the virtual augmented reality glasses. In some embodiments, the first and/or second content objects may have been pre-rendered. Thus, the simulation system overlays the first and/or second content items after first rendering the virtual environment in real-time or at interactive frame rates. In other embodiments, the first and/or second content items are rendered along with the rest of the virtual environment in real-time or at interactive frame rates. In some embodiments, the first content objects, the second content objects, and the virtual environment are each generated from different sets of 3D scene data. Thus, each set of 3D scene data may be rendered separately in real-time/interactive frame rates and then composited together for presentation to the content creator over the virtual reality goggles.

In some embodiments, the first and second content objects may be synchronized. For example, the remote rendering system may cause the virtual reality goggles to display certain portions of the second content object only while certain portions of the first content object is being presented based on predefined synchronization information for the first content object and the second content object. In some embodiments, the first content object and/or the second content object may be stereo video/images that provide users with the impression of depth in the content objects. Interactive content objects to be displayed as described in relation to FIGS. 9A-9B and FIGS. 11A-11C above.

In some embodiments, the first content object and the second content object may be automatically adjusted, modified or otherwise altered in the virtual environment based on the virtual objects with which the content objects are associated and/or the location/orientation of the virtual reality goggles. For example, if a user interacts with the VR environment to remove or "turn-off" the virtual AR glasses, then the second content object may no longer be displayed. The first content object may continue to be displayed. As another example, if a user looks away from a virtual movie screen in the VR environment by moving his or her head (and in the process, the virtual reality goggles), both the first content object and the second content object may no longer be displayed. As yet another example, the physical location of the user may initially be mapped to an initial virtual location in the virtual environment. If the user physically moves as determined by the motion capture system or a determining mechanism associated with the virtual-reality goggles, an indication of such movement is provided to the simulation system. As a result, the user (or a virtual camera associated with the user) may be moved a distance within the virtual-reality environment corresponding to the user's physical movement in the physical environment. Because such movement may change the distance and/or angle of the user relative to the virtual object corresponding to the first content object, the first content object and/or the second content object may be adjusted to compensate for the aforementioned change. As a specific example, the first content object may be displayed at a smaller scaling if the user has moved further away in virtual terms from the virtual screen "displaying" or otherwise associated with the first content object.

In some embodiments, if the user has virtually moved relative to the virtual object projecting the first content object, the remote rendering system may automatically move or modify the second content item to compensate for such movement such that the second content item can appear "correct" relative to the first content item. For example, the first content object may show a pitcher throwing a baseball. The second content object displayed over the virtual augmented reality glasses may also display a baseball at a particular location on the virtual AR glasses and at a particular time. In doing so, it can seem as if the baseball has "popped" out of a virtual movie screen over which the first content item is displayed. In some embodiments, the location of the baseball at the time it "pops" out on the virtual AR glasses needs to be based on the virtual location of the user in the VR environment relative to the virtual movie screen. Otherwise, there may be misalignment between the baseball of the first content item and the baseball of the second content item. Thus, the simulation system may render an image of the baseball to be displayed on the virtual AR glasses based on the virtual location of the user in the VR environment relative to the virtual movie screen. In some embodiments, there may not be a first content object. Rather, the system may permit simulation of the second content item against a virtual duplicate of a physical environment.

FIGS. 18A-18B illustrates how objects can be synchronized between the first layer presented on a simulated screen and the second layer presented on the simulated augmented reality glasses, according to some embodiments. In some embodiments, the simulation system and/or the virtual-reality goggles may include a user interface 1808 that enables the user to adjust the location, size, synchronization, etc. of the second content item in real-time or at interactive frame rates in order to "correct" the second content item relative to the first content item. For example, the user may detect a misalignment between a character 1804 displayed in the first layer on the screen 1802 and the second character 1806 displayed on the simulated augmented reality glasses. The content creator may intend for the two characters 1804, 1806 to talk to each other face-to-face in the scene. However, FIG. 18A shows the characters 1804, 1806 misaligned, such that their conversation will not appear to be face-to-face. The user may, accordingly, correct the alignment by interacting with the virtual-reality goggles, motion capture system, and/or the simulation system using a user interface 1808. Correction of the alignment may include interacting with the user interface 1808 to virtually move the location of the second content item on the display of the virtual augmented reality glasses. In some embodiments, the remote rendering system may automatically save the information for the correction as synchronization information. The synchronization information may include (1) timing information, (2) event triggering information, (3) mappings between the virtual augmented reality glasses' location within the virtual environment and the location/scale/adjustment information for content objects, (4) mappings between the virtual augmented reality glasses' location relative to the object projecting the content in the virtual environment and the location/scale/adjustment information for the other content objects, etc. In some embodiments, the synchronization information can be exported from the remote rendering system to a physical pair of augmented reality glasses and/or a presentation system that is to be used with a physical pair of augmented reality glasses. The physical pair of augmented reality glasses and/or presentation system may use the synchronization information for presenting the content objects of the first/second layers to the user in a physical environment corresponding to the virtual environment. The synchronization information may be used without additional modification (or with trivial modifications) since the virtual augmented reality glasses and the virtual environment are substantial duplicates of the physical environment and the physical pair of augmented reality glasses. In this way, the physical augmented reality glasses can display a version of content objects that have been corrected using the simulation system comprising the simulation system and the virtual-reality goggles. Thus, a content creator does not have to physically visit a real world environment (e.g., an auditorium) in order to generate content that is to be layered over multiple devices.

FIG. 18B illustrates changes that can be made to synchronize the characters 1804, 1806 using a user interface, according to some embodiments. First, character 1806 has been moved in position relative to character 1804. In some cases, the entire scene displayed by the augmented reality glasses can be moved relative to the scene displayed by the simulated screen 1802. In other cases, only character 1806 can be shifted in location relative to the scene displayed by the virtual screen 1802. Additionally, a time control/user interface 1810 can be used to synchronize the timing between the display of the content presented on the virtual screen 1802 and the virtual augmented reality glasses 1812. It will be understood that the user interface 1808 and/or the time control/user interface 1810 are merely exemplary and not meant to be limiting. Many other user interface controls that are known in the art could be coupled with the virtual-reality goggles and/or the simulation system to ship the content displayed by either layer in time and/or position.

Figure 19A:
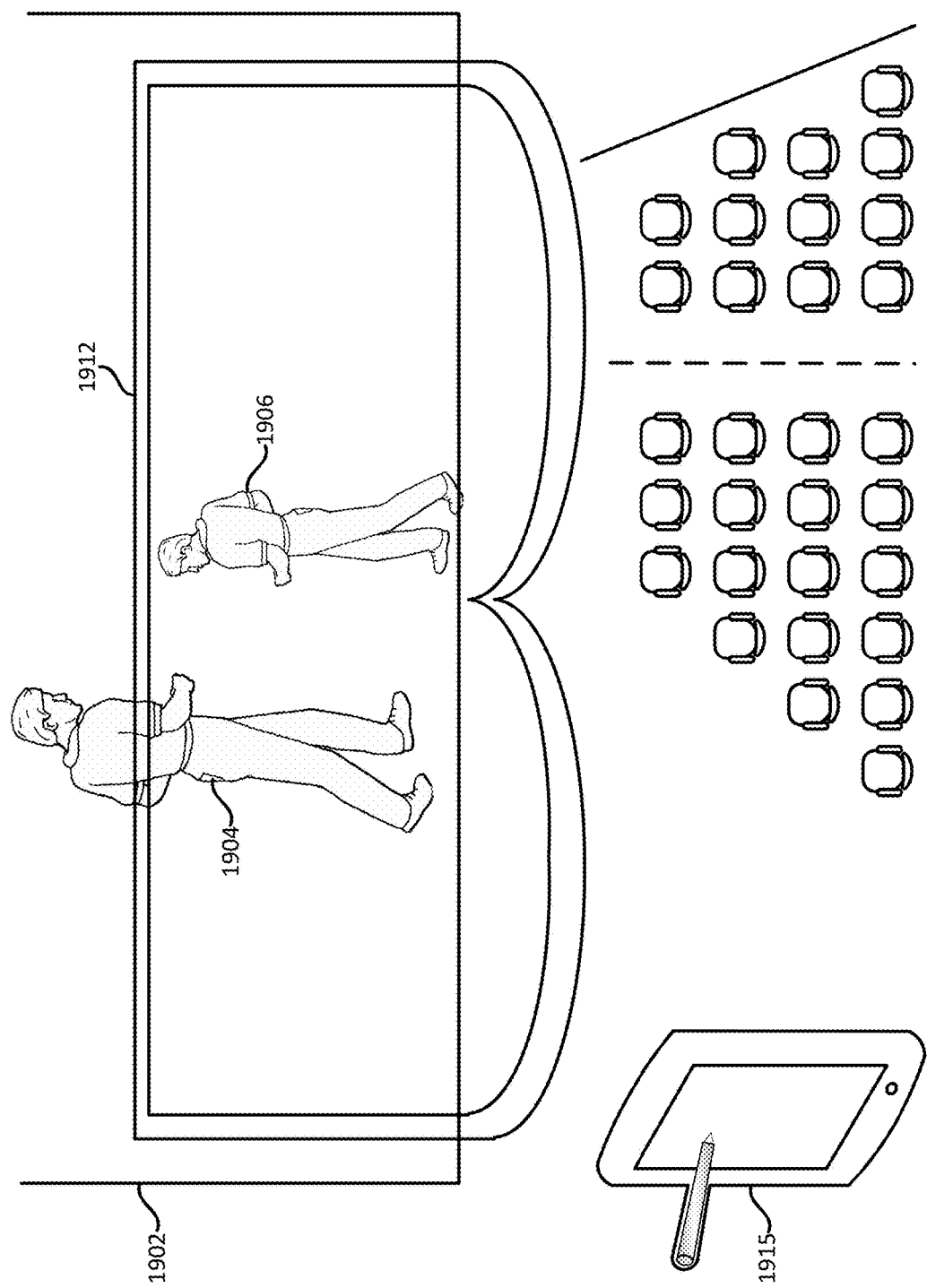

FIGS. 19A-B illustrate how content objects and be adjusted that are displayed on the first layer corresponding to the virtual screen, according to some embodiments. In some embodiments, the content creator may interact with a controller device 1915 to input changes to the content objects using the simulation system. The controller device 1915 may be, for example, a remote control, a tablet, a smartphone, etc. For example, a content creator may interact with the touchscreen of a tablet to increase or decrease the size of a character 1904 using a "pinch out" or "pinch in" gesture. FIG. 19B illustrates this operation. In some embodiments, the content creator may interact to input changes by moving his or her hands and fingers in the physical environment in which the content creator is currently standing. Specifically, the motion capture system may determine the hand/finger movements of the content creator in real-time and/or at interactive frame rates. The motion capture system may determine the hand/finger movements based on, for example, markers (or other sensors) attached to or otherwise associated with the user's fingers/hands. Certain finger/hand movements may correspond to certain input types or functions. For example, the content creator may move his or her index finger horizontally in the air to move the second content item horizontally within the virtual environment. Likewise, the content creator may move his or her index finger vertically in the air to move the second content item vertically within the virtual environment. As another example, the content creator may use a "thumbs up" motion in the air to increase the size of the second content item. The content creator may use a "thumbs down" motion in the air to decrease the size of the second content item.

Figure 20:
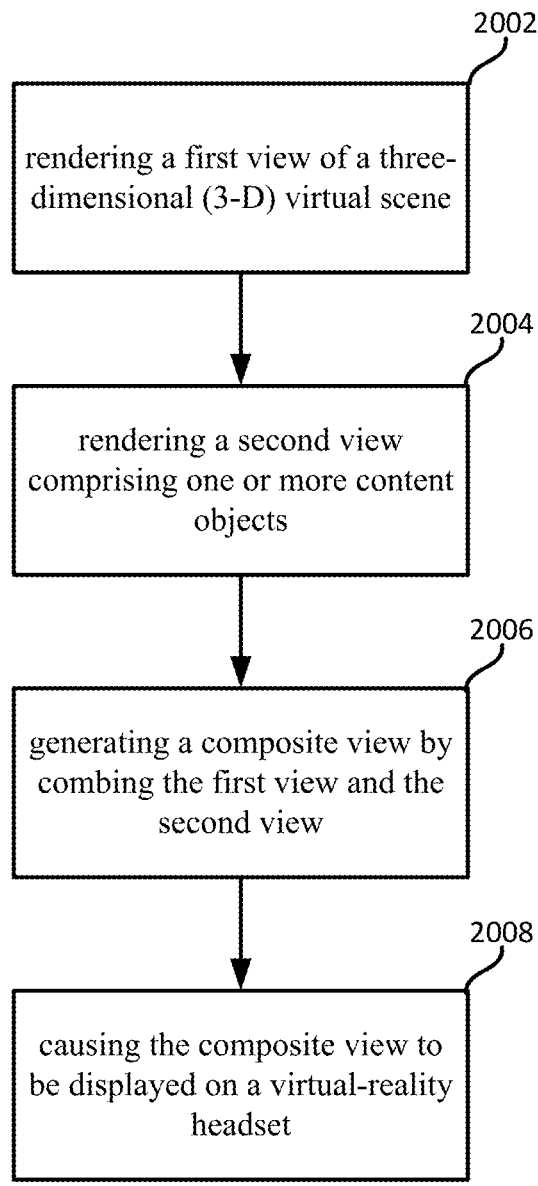
FIG. 20 illustrates a flowchart of a method for simulating augmented reality content, according to some embodiments.

FIG. 20 illustrates a flowchart of a method for simulating augmented reality content, according to some embodiments. The method may include rendering the first view of a 3-D virtual scene (2002). The 3-D virtual scene may include a view of first content being displayed on a virtual display device from a location in the 3-D virtual scene. In some embodiments, the 3-D virtual scene may include a virtual movie theater, the first content may include a movie generated at least in part from a rendered scene, and the virtual display device may include a virtual movie screen in the virtual movie theater displaying movie.

The method may also include rendering a second view comprising one or more content objects (2004). In some embodiments, the second view may be rendered from the location in the 3-D virtual scene. Additionally, the second scene may include a view of the display device as would be seen through a pair of augmented reality glasses that display the one or more content objects. The method may additionally include generating a composite view by combining the first view and the second view (2006). The first view and the second view may be embodied by the first layer and the second layer in the simulation system described above. The method may further include causing the composite view to be displayed on a virtual-reality headset (2008). The flowchart in FIG. 20 may include any of the processes, devices, algorithms, and/or displays described above for simulating an augmented reality environment in FIGS. 1-19.

In any embodiment, the simulation system may simulate the any of the augmented reality situations described in FIGS. 1-13 discussed above. In some embodiments, simulated video streams may be captured by one or more cameras and streamed directly (over a suitable network, such as the Internet) to the simulation system in real-time or substantial real-time. As such, the screen display and/or the augmented reality display may be "live feeds" being presented to a user via the virtual reality goggles. In certain embodiments, an actor may provide a performance in a performance area. The motion capture system may capture the performance based on markers and/or any other sensors worn or otherwise associated with the actor. The performance may be used to drive a digital double or virtual character within the virtual environment. In this way, a content creator can interact and/or determine how certain objects/characters may influence an augmented reality experience. For example, the actor may play the part of a movie theater patron looking for a seat in an auditorium that is displaying the first item of content in the virtual environment. A content creator (e.g., a director) can view this scene through the virtual reality goggles to determine how the second content item and/or view-ability of the first item of content may be impacted as, for example, the theater patron walks in between the virtual augmented reality glasses and the virtual movie screen displaying the first content item in the virtual environment.

Figure 21:
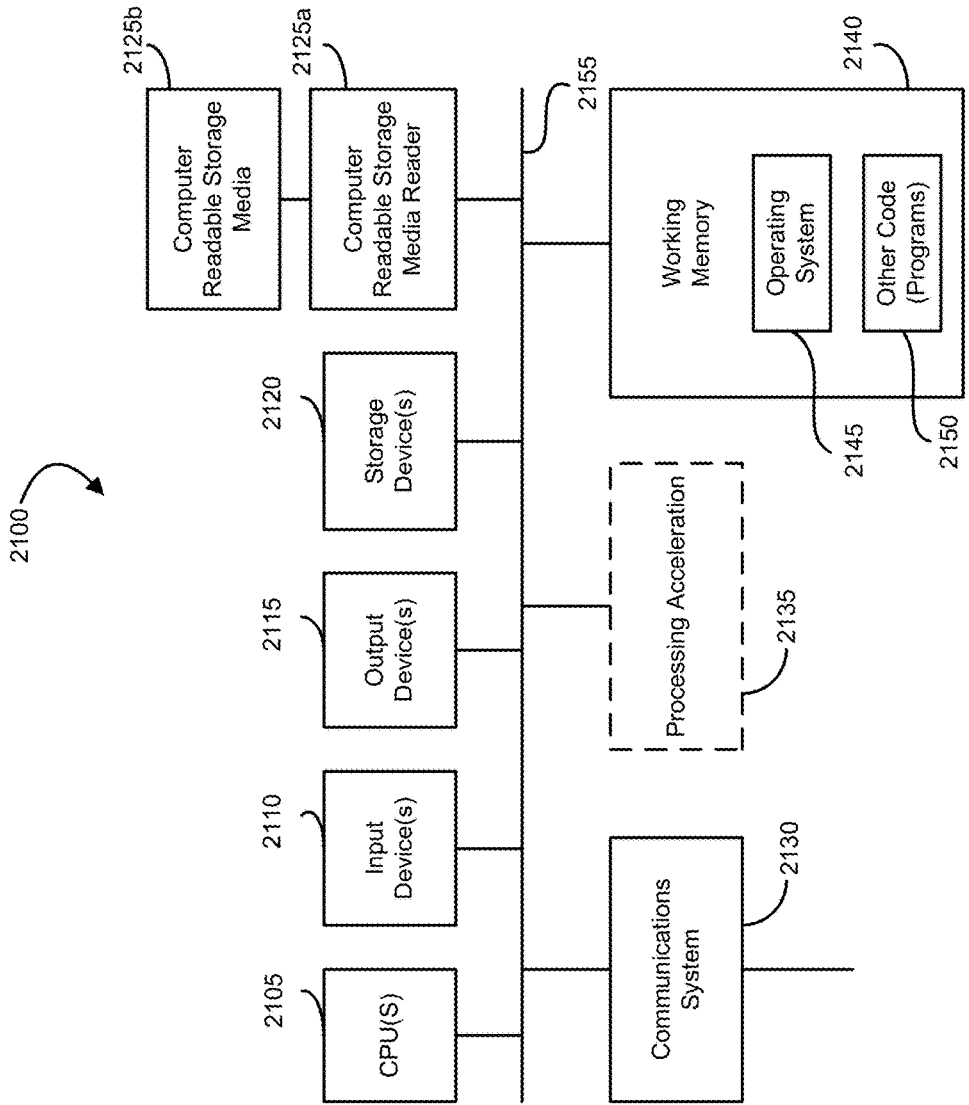
FIG. 21 illustrates an exemplary computer system, in which parts of various embodiments of the present invention may be implemented.

Each of the embodiments disclosed herein may be implemented in a special-purpose or a general-purpose computer system. FIG. 21 illustrates an exemplary computer system 2100, in which parts of various embodiments of the present invention may be implemented. The system 2100 may be used to implement any of the computer systems described above. The computer system 2100 is shown comprising hardware elements that may be electrically coupled via a bus 2155. The hardware elements may include one or more central processing units (CPUs) 2105, one or more input devices 2110 (e.g., a mouse, a keyboard, etc.), and one or more output devices 2115 (e.g., a display device, a printer, etc.). The computer system 2100 may also include one or more storage device 2120. By way of example, storage device(s) 2120 may be disk drives, optical storage devices, solid-state storage device such as a random access memory ("RAM") and/or a read-only memory ("ROM"), which can be programmable, flash-updateable and/or the like.

The computer system 2100 may additionally include a computer-readable storage media reader 2125a, a communications system 2130 (e.g., a modem, a network card (wireless or wired), an infra-red communication device, etc.), and working memory 2140, which may include RAM and ROM devices as described above. In some embodiments, the computer system 2100 may also include a processing acceleration unit 2135, which can include a DSP, a special-purpose processor, a Graphic Processing Unit (GPU), and/or the like.

The computer-readable storage media reader 2125a can further be connected to a computer-readable storage medium 2125b, together (and, optionally, in combination with storage device(s) 2120) comprehensively representing remote, local, fixed, and/or removable storage devices plus storage media for temporarily and/or more permanently containing computer-readable information. The communications system 2130 may permit data to be exchanged with the network 2120 and/or any other computer described above with respect to the system 2100.

The computer system 2100 may also comprise software elements, shown as being currently located within a working memory 2140, including an operating system 2145 and/or other code 2150, such as an application program (which may be a client application, web browser, mid-tier application, RDBMS, etc.). It should be appreciated that alternate embodiments of a computer system 2100 may have numerous variations from that described above. For example, customized hardware might also be used and/or particular elements might be implemented in hardware, software (including portable software, such as applets), or both. Further, connection to other computing devices such as network input/output devices may be employed. Software of computer system 2100 may include code 2150 for implementing embodiments of the present invention as described herein.

Each of the methods described herein may be implemented by a computer system, such as computer system 2100 in FIG. 21. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computer without human intervention. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A computer-implemented method comprising:
    rendering a first view of a three-dimensional (3-D) virtual scene from a point-of-view of a viewer in the 3-D virtual scene, the first view comprising a view of first content being displayed on a virtual display device;
    rendering a second view comprising one or more content objects, wherein:
        the second view is rendered from the same point-of-view of the viewer in the 3-D virtual scene; and
        the second view comprises a view of the virtual display device as would be seen through a pair of augmented-reality glasses worn by the viewer that display the one or more content objects;
    generating a composite view by combining the first view and the second view; and
    causing the composite view to be displayed on a virtual-reality headset in a real-world environment.

2. The computer-implemented method of claim 1, wherein:
    the 3-D virtual scene comprises a virtual movie theater;
    the first content comprises a movie generated at least in part from a rendered scene; and
    the virtual display device comprises a virtual movie screen in the virtual movie theater displaying the movie.

3. The computer-implemented method of claim 1, wherein:
    the virtual-reality headset is located in a physical environment; and
    the 3-D virtual scene is modeled after the physical environment.

4. The computer-implemented method of claim 3, wherein:
    the physical environment comprises a physical display device; and
    the virtual display device is modeled after the physical display device.

5. The computer-implemented method of claim 1, further comprising:
    determining a movement and orientation of the virtual-reality headset; and
    altering the first view and the second view based on the movement and orientation of the virtual-reality headset.

6. The computer-implemented method of claim 1, wherein the second view comprises a view of a virtual pair of augmented reality glasses.

7. The computer-implemented method of claim 1, wherein the one or more content objects interact with the first content being displayed on the virtual display device in the composite view.

8. A non-transitory, computer-readable medium comprising instructions that, when executed by one or more processors, cause the one or more processors to perform operations comprising:
    rendering a first view of a three-dimensional (3-D) virtual scene from a point-of-view of a viewer in the 3-D virtual scene, the first view comprising a view of first content being displayed on a virtual display device;
    rendering a second view comprising one or more content objects, wherein:
        the second view is rendered from the same point-of-view of the viewer in the 3-D virtual scene; and
        the second view comprises a view of the virtual display device as would be seen through a pair of augmented-reality glasses worn by the viewer that display the one or more content objects;

generating a composite view by combining the first view and the second view; and causing the composite view to be displayed on a virtual-reality headset in a real-world environment.

9. The non-transitory, computer-readable medium of claim 8, wherein:

the 3-D virtual scene comprises a virtual movie theater;

the first content comprises a movie generated at least in part from a rendered scene; and the virtual display device comprises a virtual movie screen in the virtual movie theater displaying the movie.

10. The non-transitory, computer-readable medium of claim 8, wherein:

the virtual-reality headset is located in a physical environment; and the 3-D virtual scene is modeled after the physical environment.

11. The non-transitory, computer-readable medium of claim 10, wherein:

the physical environment comprises a physical display device; and the virtual display device is modeled after the physical display device.

12. The non-transitory, computer-readable medium of claim 8, wherein the instructions cause the one or more processors to perform further operations comprising:

determining a movement and orientation of the virtual-reality headset; and altering the first view and the second view based on the movement and orientation of the virtual-reality headset.

13. The non-transitory, computer-readable medium of claim 8, wherein the second view comprises a view of a virtual pair of augmented reality glasses.

14. The non-transitory, computer-readable medium of claim 8, wherein the one or more content objects interact with the first content being displayed on the virtual display device in the composite view.

15. A system comprising:

one or more processors;

one or more memory devices comprising instructions that, when executed by the one or more processors, cause the one or more processors to perform operations comprising:

rendering a first view of a three-dimensional (3-D) virtual scene from a point-of-view of a viewer in the 3-D virtual scene, the first view comprising a view of first content being displayed on a virtual display device;

rendering a second view comprising one or more content objects, wherein:

the second view is rendered from the same point-of-view of the viewer in the 3-D virtual scene; and the second view comprises a view of the virtual display device as would be seen through a pair of augmented-reality glasses worn by the viewer that display the one or more content objects;

generating a composite view by combining the first view and the second view; and causing the composite view to be displayed on a virtual-reality headset in a real-world environment.

16. The system of claim 15, wherein:

the 3-D virtual scene comprises a virtual movie theater;

the first content comprises a movie generated at least in part from a rendered scene; and the virtual display device comprises a virtual movie screen in the virtual movie theater displaying the movie.

17. The system of claim 15, wherein:

the virtual-reality headset is located in a physical environment; and the 3-D virtual scene is modeled after the physical environment.

18. The system of claim 15, wherein the instructions cause the one or more processors to perform further operations comprising:

determining a movement and orientation of the virtual-reality headset; and altering the first view and the second view based on the movement and orientation of the virtual-reality headset.

19. The system of claim 15, wherein the second view comprises a view of a virtual pair of augmented reality glasses.

20. The system of claim 15, wherein the one or more content objects interact with the first content being displayed on the virtual display device in the composite view.

* * * * *